(12) United States Patent
Brown et al.

(10) Patent No.: US 10,533,892 B2
(45) Date of Patent: *Jan. 14, 2020

(54) MULTI-SENSOR DEVICE AND SYSTEM WITH A LIGHT DIFFUSING ELEMENT AROUND A PERIPHERY OF A RING OF PHOTOSENSORS AND AN INFRARED SENSOR

(71) Applicant: View, Inc., Milpitas, CA (US)

(72) Inventors: Stephen Clark Brown, San Mateo, CA (US); Dhairya Shrivastava, Los Altos, CA (US); Jason Zedlitz, Rancho Cordova, CA (US); Trevor Frank, San Jose, CA (US); Jue Wang, San Jose, CA (US); Alexander Rumer, Santa Clara, CA (US); Dennis Mullins, Sunnyvale, CA (US); Kevin Kazuo Kaneshiro, San Jose, CA (US)

(73) Assignee: VIEW, Inc., Milpitas, CA (US)

(*) Notice: Subject to any disclaimer, the term of this patent is extended or adjusted under 35 U.S.C. 154(b) by 149 days.

This patent is subject to a terminal disclaimer.

(21) Appl. No.: 15/287,646

(22) Filed: Oct. 6, 2016

(65) Prior Publication Data

US 2017/0122802 A1 May 4, 2017

Related U.S. Application Data

(63) Continuation-in-part of application No. 14/998,019, filed on Oct. 6, 2015.

(51) Int. Cl.
*G01J 1/42* (2006.01)
*G01J 5/10* (2006.01)
*E06B 9/24* (2006.01)

(52) U.S. Cl.
CPC .............. *G01J 1/4228* (2013.01); *E06B 9/24* (2013.01); *G01J 5/10* (2013.01); *E06B 2009/2464* (2013.01)

(58) Field of Classification Search
CPC .......... G01J 1/4228; G01J 1/0271; G01J 1/44; G01J 5/10; G01J 1/0407; G01J 1/0474;
(Continued)

(56) References Cited

U.S. PATENT DOCUMENTS 3,675,023 A 7/1972 Kunke et al.
4,171,911 A 10/1979 Aberle et al.
(Continued)

FOREIGN PATENT DOCUMENTS

CH 707305 A1 6/2014
CN 200966026 Y 10/2007
(Continued)

OTHER PUBLICATIONS

Preliminary Amendment dated Sep. 6, 2017 in U.S. Appl. No. 15/513,535.
(Continued)

*Primary Examiner* — Que Tan Le
*Assistant Examiner* — Jennifer D Bennett
(74) *Attorney, Agent, or Firm* — Brian D. Griedel; Weaver Austin Villeneuve & Sampson LLP

(57) ABSTRACT

Various implementations relate generally to multi-sensor devices. Some implementations more particularly relate to a multi-sensor device including a ring of radially-oriented photosensors. Some implementations more particularly relate to a multi-sensor device that is orientation-independent with respect to a central axis of the ring. Some implementations of the multi-sensor devices described herein further include one or more additional sensors. For example, some implementations include an axially-directed photosensor. Some implementations also can include one or more temperature sensors configured to sense an exterior temperature, for example, an ambient temperature of an outdoors environment around the multi-sensor. Additionally or alternatively, some implementations include one or more of an infrared sensor or infrared sensors, a cellular communication circuit, and a GPS module.

28 Claims, 25 Drawing Sheets

(58) Field of Classification Search
CPC .... G01J 2001/4266; G01K 1/14; G02F 1/163; G02F 2201/58; G02F 1/523; G02F 1/155; G02F 2001/1555; E06B 9/24; E06B 2009/2476; E06B 2009/2464; E06B 3/6715; E06B 2009/6827; B32B 17/10513
See application file for complete search history.

(56) References Cited

U.S. PATENT DOCUMENTS

| | | | |
|---|---|---|---|
| D256,787 S | 9/1980 | Petersen | |
| D258,871 S | 4/1981 | Rajotte, Jr. et al. | |
| 4,355,896 A * | 10/1982 | Frosch | G01W 1/00 250/203.4 |
| 4,491,727 A | 1/1985 | Appelbaum et al. | |
| D278,132 S | 3/1985 | Powell | |
| 5,606,393 A | 2/1997 | Schoenherr et al. | |
| 5,621,526 A | 4/1997 | Kuze | |
| 5,656,807 A | 8/1997 | Packard | |
| 5,670,774 A | 9/1997 | Hill | |
| 5,838,432 A | 11/1998 | Tokuhashi et al. | |
| 6,104,513 A | 8/2000 | Bloom | |
| D439,532 S | 3/2001 | Off et al. | |
| 6,269,763 B1 | 8/2001 | Woodland | |
| 6,466,312 B1 * | 10/2002 | Li | G01J 1/04 356/218 |
| 7,049,602 B2 | 5/2006 | Tokhtuev et al. | |
| 7,079,944 B2 | 7/2006 | Litchfield et al. | |
| 7,472,590 B2 | 1/2009 | Solheim et al. | |
| 7,587,289 B1 | 9/2009 | Sivertsen | |
| 7,873,490 B2 | 1/2011 | MacDonald | |
| 8,102,586 B2 | 1/2012 | Albahri | |
| 8,254,013 B2 | 8/2012 | Mehtani et al. | |
| 8,270,059 B2 | 9/2012 | Friedman et al. | |
| 8,300,298 B2 | 10/2012 | Wang et al. | |
| 8,432,603 B2 | 4/2013 | Wang et al. | |
| 8,456,729 B2 | 6/2013 | Brown et al. | |
| 8,582,193 B2 | 11/2013 | Wang et al. | |
| 8,705,162 B2 | 4/2014 | Brown et al. | |
| 8,764,950 B2 | 7/2014 | Wang et al. | |
| 8,764,951 B2 | 7/2014 | Wang et al. | |
| D712,759 S | 9/2014 | Forsberg et al. | |
| D723,600 S | 3/2015 | Nauli et al. | |
| D725,284 S | 3/2015 | Karlsson et al. | |
| D727,467 S | 4/2015 | Batiste | |
| 9,164,002 B2 * | 10/2015 | Anderson | G01K 17/00 |
| D747,988 S | 1/2016 | Matsumiya et al. | |
| D748,508 S | 2/2016 | Park et al. | |
| 9,261,751 B2 | 2/2016 | Pradhan et al. | |
| D761,135 S | 7/2016 | Allen, Sr. et al. | |
| 9,406,028 B2 | 8/2016 | Humann | |
| 9,506,802 B2 * | 11/2016 | Chu | A61B 5/14552 |
| D780,612 S | 3/2017 | Alexander et al. | |
| 9,638,978 B2 | 5/2017 | Brown et al. | |
| 9,664,974 B2 | 5/2017 | Kozlowski et al. | |
| D816,518 S | 5/2018 | Brown et al. | |
| 10,063,815 B1 | 8/2018 | Spivey et al. | |
| 10,234,596 B2 | 3/2019 | Frank et al. | |
| 2002/0075472 A1 | 6/2002 | Holton | |
| 2003/0076480 A1 | 4/2003 | Burbulla | |
| 2004/0108191 A1 | 6/2004 | Su et al. | |
| 2004/0135989 A1 | 7/2004 | Klebe | |
| 2006/0038983 A1 | 2/2006 | Bickel et al. | |
| 2006/0207730 A1 | 9/2006 | Berman et al. | |
| 2007/0012349 A1 | 1/2007 | Gaudiana et al. | |
| 2007/0145252 A1 | 6/2007 | Litchfield et al. | |
| 2009/0027759 A1 * | 1/2009 | Albahri | B60J 3/04 359/277 |
| 2009/0079349 A1 | 3/2009 | Sibalich et al. | |
| 2009/0281820 A1 | 11/2009 | Sarkar et al. | |
| 2009/0326709 A1 | 12/2009 | Hooper et al. | |
| 2010/0100324 A1 | 4/2010 | Caminiti et al. | |
| 2010/0235206 A1 | 9/2010 | Miller et al. | |
| 2011/0308318 A1 | 12/2011 | Magnussen | |
| 2012/0006110 A1 | 1/2012 | Niemann et al. | |
| 2012/0007507 A1 * | 1/2012 | Niemann | G01D 21/02 315/82 |
| 2012/0070071 A1 | 3/2012 | Rankin et al. | |
| 2012/0133315 A1 | 5/2012 | Berman et al. | |
| 2013/0021659 A1 | 1/2013 | Friedman et al. | |
| 2013/0057937 A1 | 3/2013 | Berman et al. | |
| 2013/0271812 A1 | 10/2013 | Brown et al. | |
| 2013/0271813 A1 | 10/2013 | Brown | |
| 2013/0271814 A1 | 10/2013 | Brown | |
| 2013/0271815 A1 | 10/2013 | Brown | |
| 2014/0055014 A1 | 2/2014 | Pan | |
| 2014/0067733 A1 | 3/2014 | Humann | |
| 2014/0117852 A1 * | 5/2014 | Zhai | H05B 37/0245 315/86 |
| 2014/0236323 A1 | 8/2014 | Brown et al. | |
| 2014/0268287 A1 | 9/2014 | Brown et al. | |
| 2015/0070190 A1 | 3/2015 | Wai Fong et al. | |
| 2015/0161515 A1 * | 6/2015 | Matsuoka | G05B 13/027 706/17 |
| 2015/0177415 A1 | 6/2015 | Bing | |
| 2016/0127642 A1 | 5/2016 | Schechner et al. | |
| 2016/0277688 A1 * | 9/2016 | Gaskamp | H04N 5/332 |
| 2016/0283774 A1 | 9/2016 | Buchanan et al. | |
| 2017/0031056 A1 | 2/2017 | Vega-Avila et al. | |
| 2017/0097259 A1 | 4/2017 | Brown et al. | |
| 2017/0276542 A1 | 9/2017 | Klawuhn et al. | |
| 2017/0293049 A1 | 10/2017 | Frank et al. | |
| 2019/0171081 A1 | 6/2019 | Zedlitz et al. | |
| 2019/0250029 A1 | 8/2019 | Zedlitz et al. | |

FOREIGN PATENT DOCUMENTS

| | | | |
|---|---|---|---|
| CN | 101969207 A | | 2/2011 |
| CN | 102183237 A | * | 9/2011 |
| EP | 2357544 A2 | | 8/2011 |
| EP | 2518254 A1 | | 10/2012 |
| ES | 2308936 A1 | | 12/2008 |
| JP | 2014-062801 A | | 4/2014 |
| WO | WO2011/124720 | | 10/2011 |
| WO | WO2013/105244 | | 7/2013 |
| WO | WO2013/181408 A2 | | 12/2013 |
| WO | WO2014/121863 | | 8/2014 |
| WO | WO2015/095615 A1 | | 6/2015 |
| WO | WO2015/171886 | | 11/2015 |
| WO | WO2017/007942 | | 1/2017 |
| WO | WO2017/062592 | | 4/2017 |
| WO | WO2017/189437 | | 11/2017 |
| WO | WO2018/067996 | | 4/2018 |
| WO | WO2019/183232 | | 9/2019 |

OTHER PUBLICATIONS

U.S. Office Action dated May 5, 2017 in Design U.S. Appl. No. 29/560,076.
U.S. Notice of Allowance dated Dec. 12, 2017 in Design U.S. Appl. No. 29/560,076.
Office Action dated Aug. 2, 2017 in U.S. Appl. No. 14/998,019.
Office Action dated Jun. 8, 2018 in U.S. Appl. No. 14/998,019.
Office Action dated Jan. 22, 2018 in U.S. Appl. No. 15/514,480.
Chinese Office Action dated Apr. 3, 2018 in CN Application No. 201580059148.5.
International Search Report and Written Opinion dated Jan. 14, 2016 in PCT/US2015/052822.
International Preliminary Report on Patentability dated Apr. 13, 2017 in PCT/US2015/052822.
Extended European Search Report dated May 3, 2018 in EP Application No. 15848030.1.
Extended European Search Report dated Apr. 26, 2018 in EP Application No. 15845648.3.
International Search Report and Written Opinion dated Dec. 18, 2015 in PCT/US2015/053041.
International Search Report and Written Opinion dated Dec. 15, 2016 in PCT/US2016/055709.
International Preliminary Report on Patentability dated Apr. 19, 2018 in PCT/US2016/055709.

(56) References Cited

OTHER PUBLICATIONS

International Preliminary Report on Patentability dated Apr. 13, 2017 in PCT/US2015/053041.
Canadian Office Action dated Apr. 11, 2017 in CA Design Application No. 170770.
Canadian Office Action dated Nov. 15, 2017 in CA Design Application No. 170770.
Chinese Office Action dated Apr. 27, 2017 in CN Design Application No. 201630492174.4.
International Search Report and Written Opinion dated Jan. 25, 2018 in PCT/US17/55631.
Hoosier Energy, "How do they do that? Measuring Real-Time Cloud Activity" Hoosier Energy Current Connections, undated. (http://members.questline.com/Article.aspx?articleID=18550&accountID=196000&nl=11774).
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.
Haby, Jeff, "Cloud Detection (IR v. VIS)," (undated) [http://theweatherprediction.com/habyhints2/512/].
Graham, Steve, "Clouds & Radiation," Mar. 1, 1999. [http://earthobservatory.nasa.gov/Features/Clouds/].
National Aeronautics & Space Administration, "Cloud Radar System (CRS)," (undated) [http://har.gsfc.nasa.gov/index.php?section=12].
Science and Technology Facilities Council, "Cloud Radar: Predicting the Weather More Accurately," ScienceDaily.com, Oct. 1, 2008, pp. 2. [webpage] [retrieved Sep. 17, 2014] <URL:http://www.sciencedaily.com/releases/2008/09/080924085200.htm>.
"Remote Sensing: Clouds," Department of Atmospheric and Ocean Science, University of Maryland, (undated) [http://www.atmos.umd.edu/~pinker/remote_sensing_clouds.htm].
National Aeronautics & Space Administration (NASA), "Cloud Remote Sensing and Modeling," [webpage] [retrieved Sep. 17, 2014] <URL: http://atmospheres.gsfc.nasa.gov/climate/index.php?section=134>.
Kipp & Zonen, "Solar Radiation" (undated) [http://www.kippzonen.com/Knowledge-Center/Theoretical-info/Solar-Radiation].
Duchon, Claude E. et al., "Estimating Cloud Type from Pyranometer Observations," Journal of Applied Meteorology, vol. 38, Jan. 1999, pp. 132-141.
Clay, R.W., et al., "A cloud monitoring system for remote sites," Publications of the Astronomical Society of Australia, vol. 15, No. 3, Jan. 1998, pp. 332-335.
Idso, Sherwood B., "Humidity measurement by infrared thermometry," Remote Sensing of Environment, vol. 12, 1982, pp. 87-91.
Maghrabi, A., et al., "Design and development of a simple infrared monitor for cloud detection," Energy Conversion and Management, vol. 50, 2009, pp. 2732-2737.
Maghrabi, A., et al., "Precipitable water vapour estimation on the basis of sky temperatures measured by a single-pixel IR detector and screen temperatures under clear skies," Meteorological Applications, vol. 17, 2010, pp. 279-286.
Morris, V.R. et al., "Deployment of an infrared thermometer network at the atmospheric radiation measurement program southern great plains climate research facility," Sixteenth ARM Science Team Meeting Proceedings, Albuquerque, NM, Mar. 27-31, 2006, 11 pp.
Thompson, Marcus, "Boltwood cloud sensor," Cloudynights.com, Nov. 25, 2005, 6 pp. [online], [retrieved Dec. 15, 2016]. Retrieved from the internet <URL http://www.cloudynights.com/page/articles/cat/user-reviews/photography/photography-accessories/boltwood-cloud-sensor-r1222>.
Werner, Christian, "Automatic cloud cover indicator system," Journal of Applied Meteorology, vol. 12, Dec. 1973, pp. 1394-1400.
Boltwood Cloud Sensor II by Diffraction Limited, 2016, [online], [retrieved Dec. 15, 2016]. Retrieved from the internet <URL http://diffractionlimited.com/product/boltwood-cloud-sensor-ii/>.
Mims III, Forrest M., et al., "Measuring total column water vapor by pointing an infrared thermometer at the sky," Bulletin of the American Meteorological Society, Oct. 2011, pp. 1311-1320.
Sloan, Raymond, et al., "Infrared Emission Spectrum of the Atmosphere," Journal of the Optical Society of America, vol. 45, No. 6, Jun. 1955, pp. 455-460.
SurroundVideo Series, "Pioneering Multi-Sensor IP Megapixel Cameras," [webpage] 10 pp. [retrieved Jul. 24, 2015] <URL:http://web.archive.org/web/20150724235343/http://www.arecontvision.com/landing-pages/surround-video/overview.php>.
Melexis "MLX90614 family Datasheet" (3901090614, Rev. 004), Jul. 30, 2008, 42 pp.
C-Bus Multi-Sensors, posted on clipsal.com. [online] <URL: https://www.clipsal.com/Trade/Products/Integrated-Systems/C-Bus-Control-and-Management-System/C-Bus-1 nput -Units/Sensors-and- Detectors#. WOfl LvkrlmE>.
Gen5 Z-Wave Plus 6-in-1 Multisensor, posted on thesmartesthouse.com, Earliest review on Aug. 27, 2015. [online] <URL:https://www.thesmartesthouse.com/products/aeotec-by-aeon-Iabs-z-wave-5-in-1-multisensor#shopify-product-reviews>.
U.S. Final Office Action dated Sep. 26, 2018 in U.S. Appl. No. 15/514,480.
U.S. Office Action dated Jun. 29, 2018 in U.S. Appl. No. 15/513,535.
U.S. Final Office Action dated Jan. 17, 2019 in U.S. Appl. No. 14/998,019.
U.S. Office Action dated Jun. 14, 2019 in U.S. Appl. No. 14/998,019.
U.S. Notice of Allowance dated Jan. 24, 2019 in U.S. Appl. No. 15/514,480.
U.S. Notice of Allowance dated May 23, 2019 in U.S. Appl. No. 15/514,480.
U.S. Notice of Allowance dated Nov. 1, 2018 in U.S. Appl. No. 15/513,535.
Chinese Office Action dated Feb. 2, 2019 in CN Application No. 201580059148.5.
Russian Office Action & Search Report dated Apr. 1, 2019 in RU Application No. 2017114996.
Chinese Office Action dated Mar. 25, 2019 in CN Application No. 201580052861.7.
European Office Action dated Feb. 21, 2019 in EP Application No. 15845648.3.
Australian Examination Report dated May 31, 2019 in AU Application No. 2016334038.
European Examination Report dated Jul. 11, 2019 in EP Application No. 16854302.3.
International Preliminary Report on Patentability dated Apr. 18, 2019 in PCT/US17/55631.
International Preliminary Report on Patentability dated Dec. 12, 2018 in PCT/US17/35290.
International Search Report and Written Opinion dated Sep. 8, 2017, issued in PCT/US17/35290.
"Sky temperature" in Designing Buildings Wiki, Apr. 26, 2015, <https://www.designingbuildings.co.uk/wiki/Sky_temperature> [retrieved Jul. 19, 2019].
U.S. Appl. No. 16/262,775, filed Jan. 30, 2019, Frank et al.
U.S. Appl. No. 16/335,222, filed Mar. 20, 2019, Zedlitz et al.
Preliminary Amendment dated Apr. 19, 2019 for U.S. Appl. No. 16/262,775.
U.S. Notice of Allowance dated Sep. 6, 2019 in U.S. Appl. No. 15/514,480.
European Office Action dated Aug. 27, 2019 in EP Application No. 15848030.1.
Taiwanese Decision of Rejection dated Nov. 1, 2019 in TW Application No. 104131932

\* cited by examiner

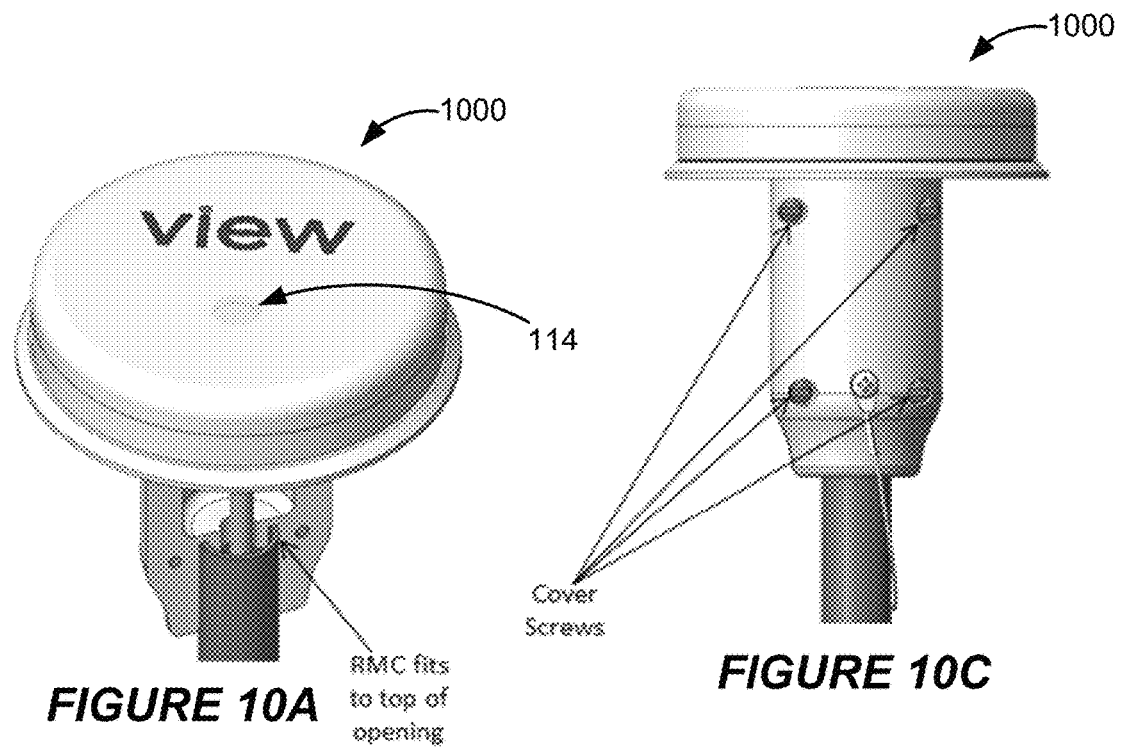
FIGURE 10A
FIGURE 10C
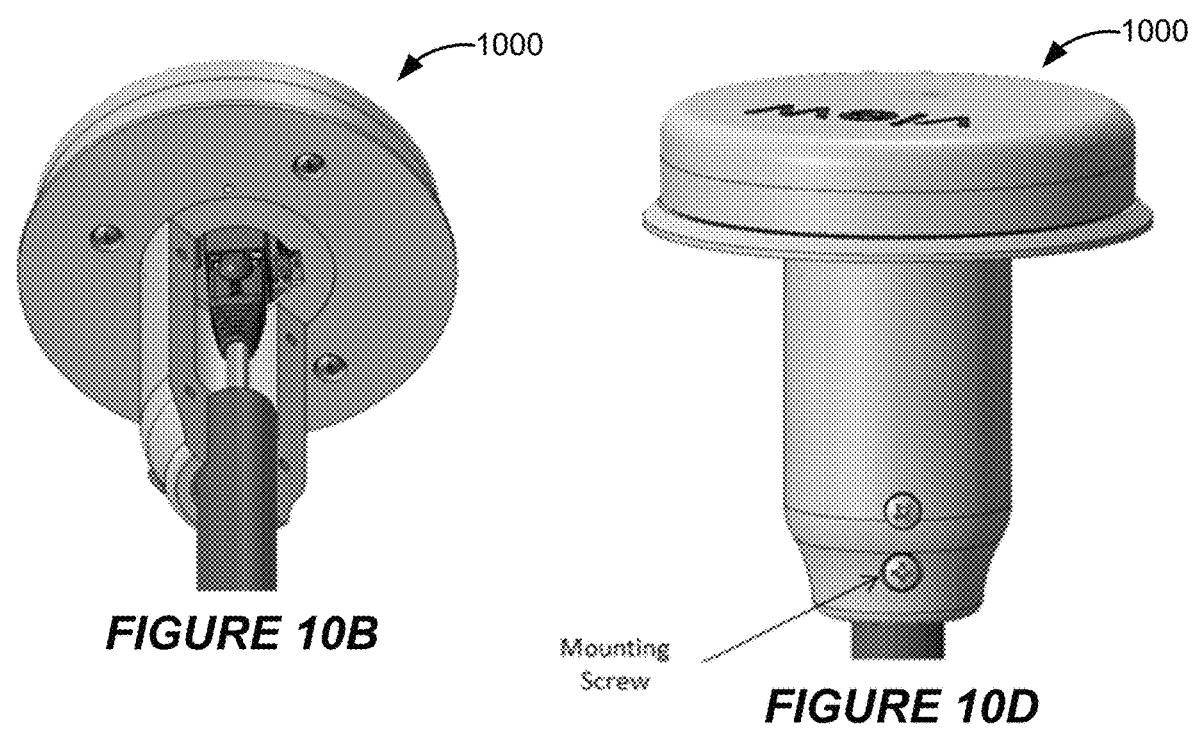
FIGURE 10B
FIGURE 10D

MULTI-SENSOR DEVICE AND SYSTEM WITH A LIGHT DIFFUSING ELEMENT AROUND A PERIPHERY OF A RING OF PHOTOSENSORS AND AN INFRARED SENSOR

CROSS REFERENCE TO RELATED APPLICATIONS

This application is a continuation-in-part of U.S. patent application Ser. No. 14/998,019, filed on Oct. 6, 2015 and titled "MULTI-SENSOR," which is hereby incorporated by reference in its entirety and for all purposes.

FIELD

This disclosure relates generally to sensor devices, and more particularly, to orientation-independent multi-sensor devices.

BACKGROUND

The development and deployment of smart technology have increased as considerations of energy efficiency and system integration gain momentum. Optically-switchable windows, such as electrochromic windows, are a promising field of smart technology. Electrochromism is a phenomenon in which a material exhibits a reversible electrochemically-mediated change in one or more optical properties when stimulated to a different electronic state. Electrochromic materials and the devices made from them may be incorporated into, for example, windows for home, commercial, or other use. The color, tint, transmittance, absorbance, or reflectance of electrochromic windows can be changed by inducing a change in the electrochromic material, for example, by applying a voltage across the electrochromic material. Such capabilities can allow for control over the intensities of various wavelengths of light that may pass through the window. One area of relatively recent interest is in intelligent control systems and algorithms for driving optical transitions in optically-switchable windows to provide desirable lighting conditions while reducing the power consumption of such devices and improving the efficiency of systems with which they are integrated.

BRIEF DESCRIPTION OF THE DRAWINGS

FIGS. 10A-10D show various respective views of a diagrammatic representation of an example multi-sensor device according to some implementations.

Like reference numbers and designations in the various drawings indicate like elements.

DETAILED DESCRIPTION

The following detailed description is directed to specific example implementations for purposes of disclosing the subject matter. Although the disclosed implementations are described in sufficient detail to enable those of ordinary skill in the art to practice the disclosed subject matter, this disclosure is not limited to particular features of the specific example implementations described herein. On the contrary, the concepts and teachings disclosed herein can be implemented and applied in a multitude of different forms and ways without departing from their spirit and scope. For example, while the disclosed implementations focus on electrochromic windows (also referred to as smart windows), some of the systems, devices and methods disclosed herein can be made, applied or used without undue experimentation to incorporate, or while incorporating, other types of optically-switchable devices. Some other types of optically-switchable devices include liquid crystal devices, suspended particle devices, and even micro-blinds, among others. For example, some or all of such other optically-switchable devices can be powered, driven or otherwise controlled or integrated with one or more of the disclosed implementations of controllers described herein. Additionally, in the following description, the phrases "operable to," "adapted to," "configured to," "designed to," "programmed to," or "capable of" may be used interchangeably where appropriate.

Introduction to Multi-Sensor

Various implementations relate generally to a multi-sensor device. Some implementations more particularly relate to a multi-sensor device including a ring or other suitable geometrical (for example, polygonal) configuration of radially-oriented or otherwise outwardly-oriented photosensors. Some implementations more particularly relate to a multi-sensor device that is orientation-independent with respect to a central axis of the ring. Some implementations of the multi-sensor devices described herein also include one or more additional sensors. For example, some implementations include an axially-directed photosensor. Some implementations also can include one or more temperature sensors configured to sense an exterior temperature, for example, an ambient temperature of an outdoors environment around the multi-sensor. Additionally or alternatively, some implementations can include a temperature sensor configured to sense an interior temperature within the multi-sensor device. Particular implementations provide, characterize, or enable a compact form factor. Particular implementations provide, characterize, or enable a multi-sensor device requiring little or no wiring, and in some such instances, little or no invasion, perforation or reconstruction of a building or other structure on which the multi-sensor device may be mounted.

Figure 1:
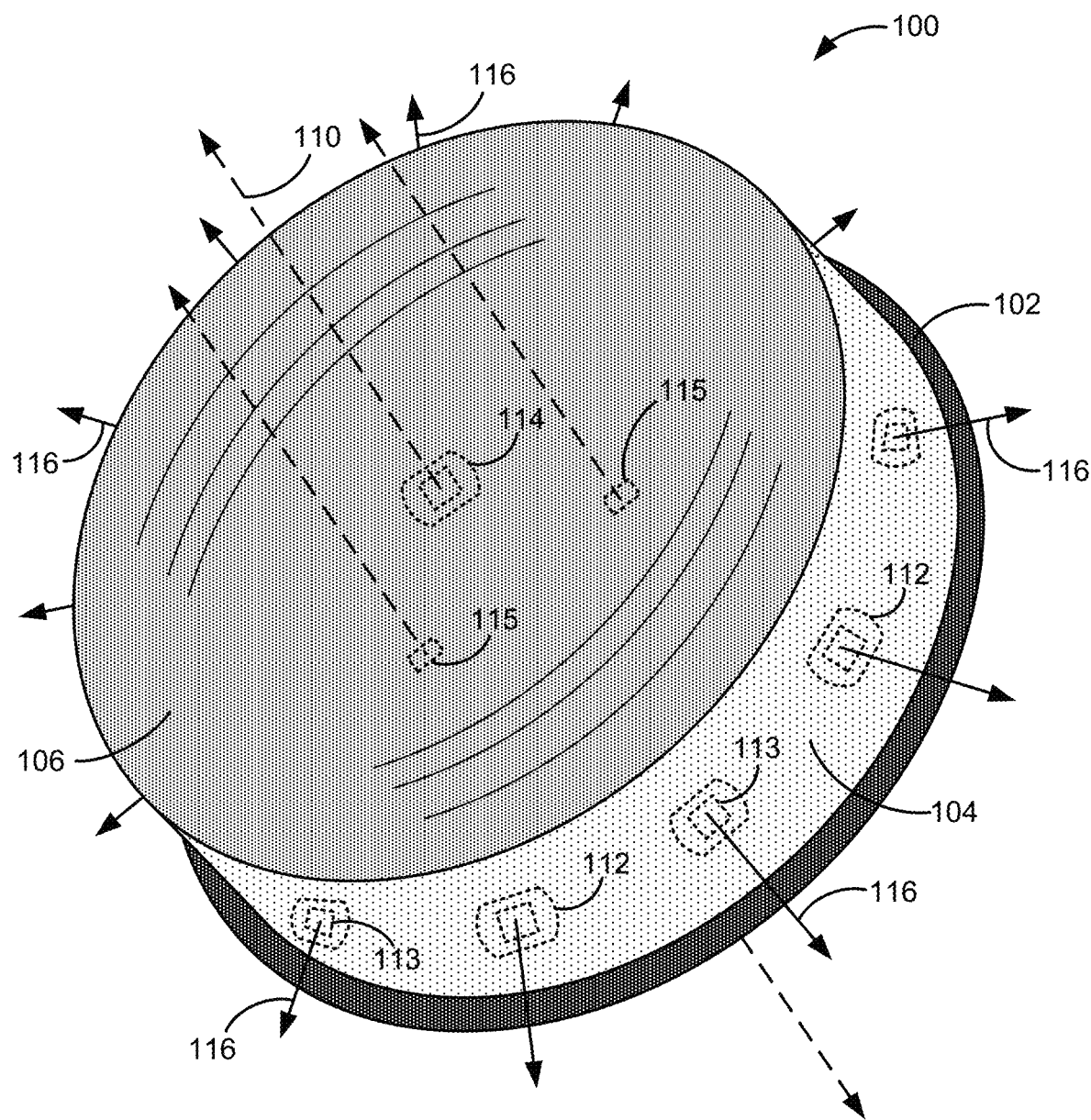
FIG. 1 shows a diagrammatic representation of an example multi-sensor device according to some implementations.

FIG. 1 shows a diagrammatic representation of an example multi-sensor device 100 according to some implementations. The multi-sensor device 100 generally includes a housing 102, at least one light-diffusing element (or "diffuser") 104 and a cover housing (or "cover" or "lid") 106. As shown, in some implementations the housing 102, the diffuser 104 and the cover 106 are rotationally symmetric about an imaginary axis 110 that passes through a center of the multi-sensor device 100. The multi-sensor device 100 also includes multiple light sensors 112. In some specific implementations, the light sensors 112 are positioned annularly along a ring (for example, the ring can have a center coincident with the axis 110 and can define a plane orthogonal to the axis 110). In such implementations, the light sensors 112 can more specifically be positioned equidistantly along a circumference of the ring. In some implementations, the multi-sensor device 100 further includes at least one light sensor 114 having an axis of orientation parallel with and in some instances directed along and concentric with the axis 110.

In certain implementations, the multi-sensor device 100 may also include one or more infrared sensors typically located on top of the multi-sensor device 100 with a view of the sky. An infrared (IR) sensor detects radiation in the infrared spectrum that is radiated from any objects or medium within its field-of-view. IR sensors generally have a field-of-view that ranges from about 50 to about 80 degrees. In one particular example, an IR sensor has a field-of-view of about 70. The amount of IR radiation that is emitted by medium/objects and captured by the IR sensor varies depending on the temperature of the medium/objects, the surface and other physical characteristics of the medium/objects, and the distance from the from the IR sensor. The IR sensor converts IR radiation it receives within its field-of-view to an output voltage/current, which is a measurement of the amount of IR radiation received and the corresponding temperature of the objects/medium within its field-of-view. Typically the IR sensor provides digital temperature readings. For example, an IR sensor oriented to face toward the sky outputs readings of temperature of the region of the sky within its field-of-view. The IR sensor can be oriented in particular geographical direction (North, South, East, West, Northeast, Northwest, etc.) to preferentially capture IR radiation in that particular geographical region of the sky.

In one implementation, a multi-sensor (e.g., multi-sensor 100 shown in FIG. 1 and the multi-sensor 500 shown in FIG. 6B with infrared sensors 115A and 115B) can be used to measure sky temperature using an IR sensor(s) or weather feed data from communications with a weather service to determine whether there is cloud cover or another weather condition. For example, the IR sensor readings can be used to determine a "clear sky" condition, a "cloudy" condition with intermittent clouds, or an "overcast" condition. Communications with the weather service may be received via a cellular communication circuit that may also be included in the multi-sensor 100 as described further with reference to FIG. 6B. Details of methods for using output from an infrared sensor to determine a weather condition are described in PCT application PCT/US15/53041, titled "SUNLIGHT INTENSITY OR CLOUD DETECTION WITH VARIABLE DISTANCE SENSING" and filed on Sep. 29, 2015, which is hereby incorporated by reference in its entirety.

Although a single infrared sensor can be used, two or more infrared sensors are typically used for redundancy in case one malfunctions and/or is obscured such as by bird droppings or other environmental agent. In one case, two or more infrared sensors are used to face different orientations to capture IR radiation from different fields of view and/or at different distances from the building/structure. If two or more IR sensors are located on a multi-sensor, the IR sensors are offset from one another by a distance sufficient to reduce the likelihood that an obscuring agent would affect all the IR sensors. For example, IR sensors may be separated by at least about one inch or at least about two inches.

Some examples of types of infrared sensors that can be used are a thermopile, an infrared radiometer, an infrared pyrgometer, and an infrared pyrometer. Some examples of IR sensors that can be used include semiconductor resistors or diodes such as a long wave IR diode. One example of an IR sensor that can be used is the Melixis® IR sensor, which is a silicon-machined thermopile with digital temperature measurement output. Each IR sensor is typically devised to measure IR radiation within a specific wavelength range of the IR spectrum such as, in one case, in a range between about 8 μm and about 14 μm in one case, in a range between about 10.6 μm and about 12.5 μm, in one case, in a range of about 6.6 μm and about 20 μm. In one example, an IR sensor is a thermistor bolometer responsive to infrared radiation in the wavelength range of 9.5 μm to 11.5 μm. In one example, the IR sensor is responsive to infrared radiation in the wavelength range of 8 μm to 14 μm. In one example, the IR sensor is responsive to infrared radiation in the wavelength range of 10.5 µm to 12.5 µm. In one example, the IR sensor is responsive to infrared radiation in the wavelength range of 6.6 µm to 20 µm.

In the illustrated example shown in FIG. 1, the multi-sensor device 100 further includes a first infrared sensor 115A and a second infrared sensor 115B located on an upper portion of the multi-sensor device 100 positioned behind a diffusor 104. The first infrared sensor 115A and second infrared sensor 115B may or may not be visible to the human eye from outside the multi-sensor device 100. Each of the infrared sensors 115A, 115B has an axis of orientation that is parallel with the axis 110 and faces outward from the top portion of the multi-sensor device 100 to measure temperature readings based on IR radiation captured from above the multi-sensor device 100. The first infrared sensor 115A is separated from the second infrared sensor 115B by at least about one inch. In certain implementations, the multi-sensor device 100 is installed on the outside a building or other structure such that both the first infrared sensor 115A and second infrared sensor 115B are oriented toward the sky. When directed toward the sky, the first infrared sensor 115A and the second infrared sensor 115B can output sky temperature readings. In one implementation, the multi-sensor device 100 can execute instructions that determine cloud cover or another weather condition from the measured sky temperature and/or based on weather feed data from a weather service through communication established by a cellular communication circuit that also may be included in the multi-sensor 100 according to a particular implementation. The determined weather condition may be communicated to other buildings in the general vicinity via the cellular communication circuit or another communication device. In another implementation, the readings taken by the sensors of the multi-sensor device 100 may be supplied to a building management system or to other buildings in the general vicinity to facilitate prediction of weather changes such a cloud cover changes.

In one implementation of the illustrated example shown in FIG. 1, the multi-sensor device 100 is installed outside a building or other structure with its axis 110 oriented vertically upward. In this case, each of the first infrared sensor 115A and the second infrared sensor 115B is oriented vertically upward and the azimuthal orientation of the installed multi-sensor device 100 is zero and has no impact on the temperature readings from the infrared sensors 115A, 115B reflecting the sky temperature above the building/structure. The azimuthal orientation of the multi-sensor device 100 refers to the angle formed between a line directed due North from the installed multi-sensor 100 and line along the axis 110.

In another embodiment, the multi-sensor device 100 has one or more infrared sensors similar to the IR sensors 115A and 115B describe with reference to FIG. 1, where at least one of the sensors is oriented to face a direction that is not vertically upward. In this case, the azimuthal orientation of the infrared sensor determines a geographic direction (North, South, East, West, North-East, North-West, etc.) from which IR radiation is preferentially captured by the IR sensor. For example, the first infrared sensor 115A and the second infrared sensor 115B may be positioned on the multi-sensor device 100 at an angle offset from the axis 110. In one particular instance, an infrared sensor may be mounted to a face in a direction that is about 11 degrees offset from the axis 110 which is typically at a normal to the top surface of the multi-sensor device 100. In addition or alternatively, the multi-sensor device 100 may be installed on the outside a building or other structure with its axis 110 in a direction that is not vertically upward. For example, the installer may have directed the multi-sensor device 100 at an angle due to any number of reasons such as, for example, to avoid an obstruction of the IR sensor from a clear view of the sky, for ease of installation on an angled surface of an existing fixture, etc. In this example, the azimuthal orientation of the multi-sensor device 100 along with any angle offset of the IR sensor from the axis 110 determines a geographic direction (North, South, East, West, Northeast, Northwest, etc.) of the region of sky from which IR radiation is preferentially captured by the IR sensor(s). According to one implementation, an example of which is described in detail with respect to FIG. 6B below, a GPS module and associated logic may also be included in the multi-sensor device to determine latitude and longitude of the location of the multi-sensor device and also the direction that each IR sensor is oriented to determine the region of sky from which each IR sensor preferentially captures IR radiation. In this case, the multisensor device may adjust the readings from the IR sensor to estimate a reading above the building/structure. In addition or alternatively, the multi-sensor device can use the readings from regions of the sky away from the building to estimate approaching weather conditions/patterns. Returning to FIG. 1, also shown is a plurality of radially-extending arrows 116. Each of the arrows 116 represents an axis of orientation of a corresponding one of the light sensors 112. Each of the light sensors 112 is depicted in dotted line indicating that the light sensor 112 itself may or may not be visible to the naked human eye from the exterior of the multi-sensor device 100 in all implementations (As described in more detail below, the light sensors 112 are positioned behind a diffuser 104). Each of the light sensors 112 is oriented along a respective axis of orientation extending radially outward from the center of the ring (along the direction of a corresponding one of the arrows 116). In some implementations, the angle of detection of each light sensor 112 is symmetric about the axis of orientation of the light sensor defining a symmetric "viewing cone." In some implementations, the angle of detection of each light sensor 112 is approximately 180 degrees (implying a nearly hemispheric angle of detection). In some implementations, each of the light sensors 112 has an angle of view (distinct from the angle of detection) that overlaps the angle of view of each of the two respective immediately adjacent neighboring light sensors 112. As used herein, the angle of view of a light sensor is defined as the angle defining a viewing cone within which half of the power spectral density in the wavelengths of interest is captured by the light sensor. Generally then, the angle of view is twice the angle from the axis of orientation to an outer surface of the viewing cone. In some implementations, each of the light sensors 112 is the same as the other ones of the light sensors 112, and thus, the angles of view of each of the light sensors 112 are generally the same. In some implementations, the axially-directed light sensor 114 is of the same type as the light sensors 112. In some other implementations, the angle of view of the axially-directed light sensor 114 can be narrower than, the same as, or wider than the angle of view of each of the light sensors 112.

Each of the light sensors 112 (also referred to as light detectors, photosensors or photodetectors) includes a light sensitive area 113. In some implementations, the light sensitive area 113 of each light sensor 112 includes one or more photodiodes or arrays of one or more photodiodes (for example, each of the light sensors 112 can include silicon (Si) photodiodes). In some implementations, each of the light sensors 112 includes a lens over the light sensitive area 113 of the light sensor. In some implementations, the angle of view of each of the light sensors 112 is in the range of approximately 30 degrees to approximately 120 degrees. For example, in one specific application, the angle of view is approximately 100 degrees. In some implementations, the distribution of incident light detectable by each of the light sensors 112 approximates a Gaussian (or "normal") distribution. Assuming the light detected by each of the light sensors 112 is associated with a Gaussian distribution, half of the power (the −3 dB point) detected by each of the light sensors is found within a viewing cone defined by the angle of view.

However, the light signal detected by each of the light sensors 112 can in some implementations be effectively or approximately flat for practical purposes within a 30 degree angle. Thus, the use of twelve (360/30=12) light sensors 112 results in an approximately flat signal around the entirety of the ring of sensors as a whole (assuming the incident light was uniform all around the ring of sensors as well). In other words, the combination of all of the light sensors 112 provides an aggregate angle of view of 360 degrees. Thus, the use of twelve equidistantly-separated light sensors 112 provides substantial orientational independence. That is, the multi-sensor device 100 can be positioned atop a roof of a building or other structure without having to adjust an orientation of the device 100 with respect to North or East axes of a North East Down (NED) coordinate system.

Figure 12A:
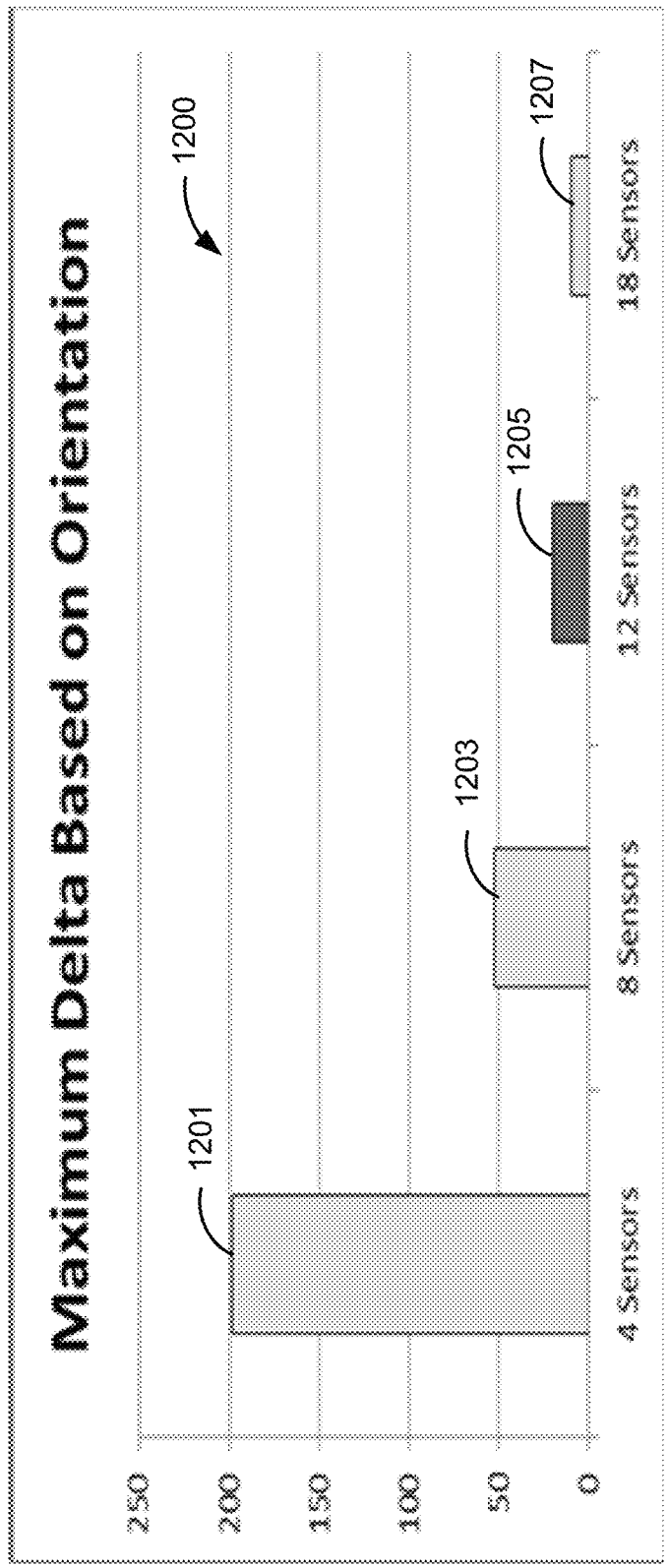
FIG. 12A shows a bar graph including bars each indicating a maximum delta based on orientation for a respective multi-sensor device.
Figure 12B:
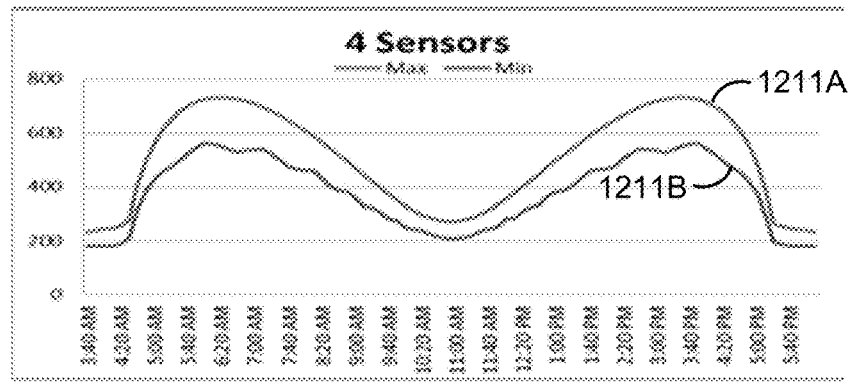
FIGS. 12B-12E each show plots of sensor data over time based on orientation for a respective multi-sensor device.
Figure 12C:
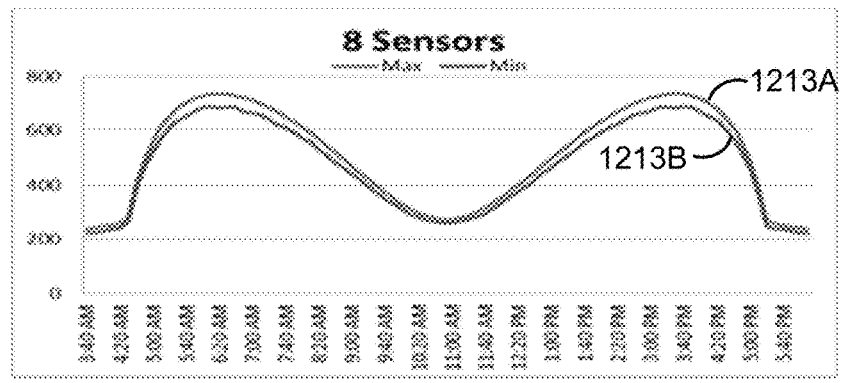
Figure 12D:
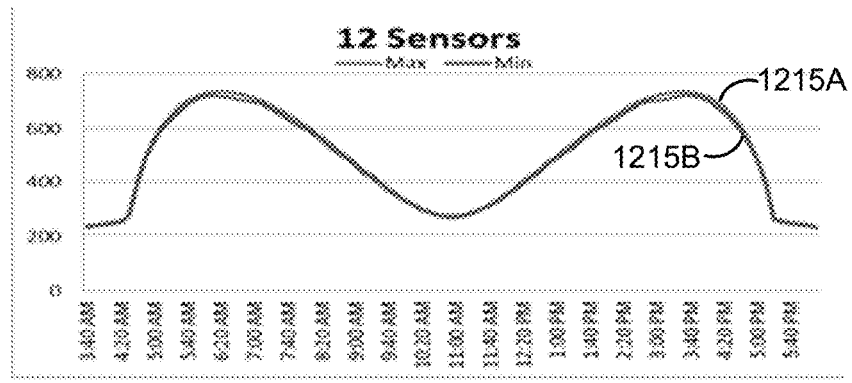
Figure 12E:
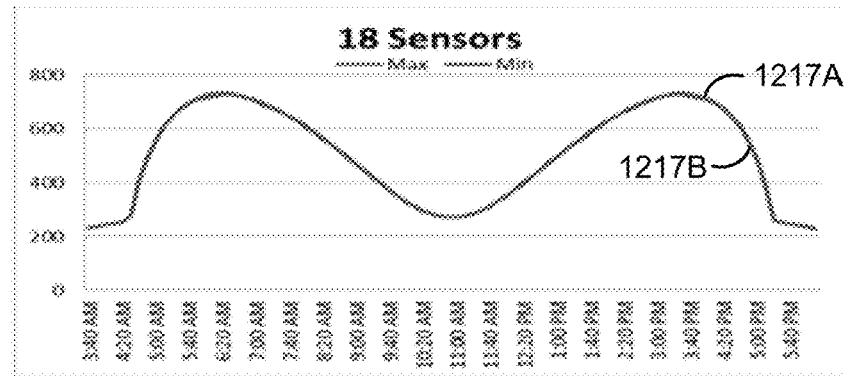

The inventors have also discovered that the use of any more than twelve light sensors does not significantly increase the uniformity in the detection of light around the ring, especially with the use of the diffuser 104 mentioned above and described in more detail below. FIG. 12A shows a bar graph 1200 including bars each indicating a maximum delta based on optimal orientation and anti-optimal orientation (with respect to the axis 110) for a respective multi-sensor device. For example, a first bar 1201 is associated with a multi-sensor device having four equidistantly positioned light sensors; a second bar 1203 is associated with a multi-sensor device having eight equidistantly positioned light sensors; a third bar 1205 is associated with a multi-sensor device having twelve equidistantly positioned light sensors; and a fourth bar 1207 is associated with a multi-sensor device having eighteen equidistantly positioned light sensors. FIGS. 12B-12E each show plots of sensor data over time based on orientation for a respective multi-sensor device. For example, a first plot (the higher of the two) shows sensor data obtained when optimally oriented (with respect to the axis 110) while a second plot (the lower of the two) shows sensor data obtained when anti-optimally oriented. For example, FIG. 12B shows a first plot 1211A and a second plot 1211B associated with a multi-sensor device having four equidistantly positioned light sensors; FIG. 12C shows a first plot 1213A and a second plot 1213B associated with a multi-sensor device having eight equidistantly positioned light sensors; FIG. 12D shows a first plot 1215A and a second plot 1215B associated with a multi-sensor device having twelve equidistantly positioned light sensors; and FIG. 12E shows a first plot 1217A and a second plot 1217B associated with a multi-sensor device having eighteen equidistantly positioned light sensors.

Figure 21:
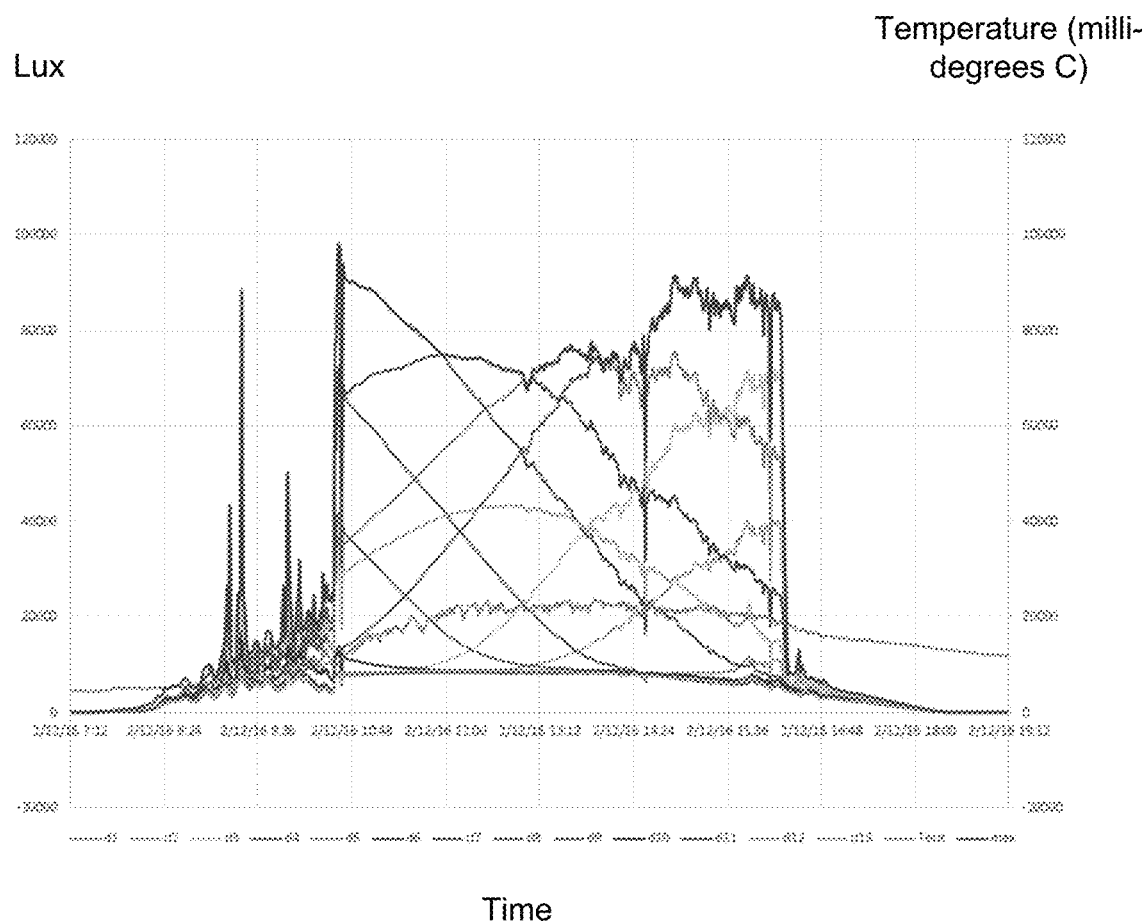
FIG. 21 shows a graph of multiple plots of lux/temperature data taken over time by the peripheral photosensors of a multi-sensor device of an embodiment.

FIG. 21 shows a graph of multiple plots of lux/temperature data taken over time by the peripheral photosensors of a multi-sensor device of an embodiment. The left hand vertical axis is light intensity in lux. The right hand vertical axis is temperature in milli-degrees C. The red trace is an example of a maximum delta function based on all sensors for a respective multi-sensor device.

In some implementations, each light sensor 112 also includes one or more filters. For example, each light sensor 112 can include a hardware (physical) filter that filters the light incident on the light sensor 112 before it is sensed by the light sensitive area 113. In some implementations, the incident light can be filtered such that the resultant sensor signal output from each of the light sensors 112 mimics, characterizes, or is representative of a human eye response. In some implementations, each of the light sensors 112 is photopic in its response to incident light. In some other implementations, the sensor signal output from each of the light sensors 112 can be electrically filtered, for example, using digital filtering techniques. For example, the multi-sensor device 100 can include a circuit board including one or more general purpose processors or controllers including digital signal processing blocks or functionality, and/or one or more specialized processors such as a digital signal processor (DSP).

Figure 2:
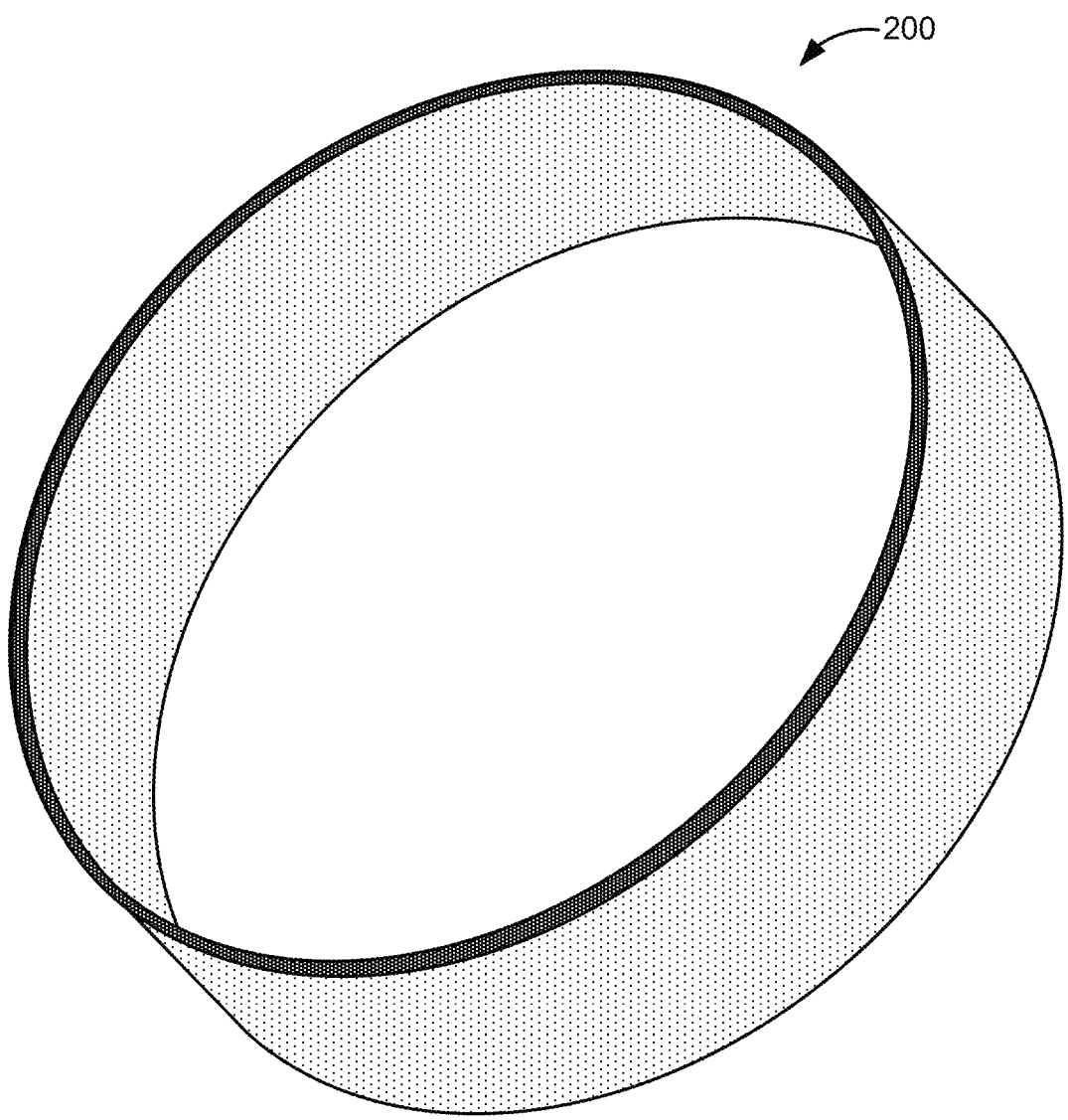
FIG. 2 shows a diagrammatic representation of an example diffuser capable of use in the multi-sensor device of FIG. 1 according to some implementations.

Diffuser 104 is positioned around a periphery of the ring of light sensors 112 to diffuse light incident on the device prior to the light being sensed by the light sensors. For example, the diffuser 104 can effectively function as a light integrator that spreads or distributes incident light more uniformly. Such a configuration reduces the likelihood of any one light sensor 112 receiving the full intensity of a pinpoint reflection or glare (such as off a car windshield, metal surface or mirror). The diffuser 200 also can increase the detection of light incident at oblique angles. FIG. 2 shows a diagrammatic representation of an example diffuser 200 capable of use in the multi-sensor device 100 of FIG. 1 according to some implementations. In some implementations, the diffuser 200 is a single integral structure having a ring shape. For example, the diffuser 200 can have a hollow cylindrical shape having an inner diameter, an outer diameter, and a thickness defined by the inner diameter and the outer diameter. In some implementations, the diffuser 200 has a height that encompasses the field of view of each of the light sensors 112 (the field of view being defined by the angle of view and the distance or spacing between the outer surface of the light sensitive area 113 of the light sensor 112 and an inner surface of the diffuser 200.

In some other implementations, the diffuser 200 can include two or more light-diffusing elements connected with one another with an adhesive, with some mechanical coupling mechanism, or supported in proper position and alignment via the housing 300. For example, the diffuser 200 can implement the diffuser 104. In various implementations, the diffuser 200 is formed of a semi-transparent or semi-opaque material that is designed or selected to scatter light incident on the diffuser 200 while also allowing a substantial portion of the scattered light to enter through the diffuser 200. The light entering through the diffuser 200 can then be sensed by the light sensors 112 within the multi-sensor device 100. As described above, in some implementations each of the light sensors 112 is depicted in dotted line indicating that the light sensor 112 itself may or may not be visible to the naked human eye from the exterior of the multi-sensor device 100 in all implementations. In some implementations, the light sensors 112 are not viewable from outside of the multi-sensor device 100 because their view is entirely blocked by the diffuser 200. In some other implementations, the light sensors 112 are partially visible through the light sensors 112. In some implementations, the diffuser 200 is formed from a plastic or thermoplastic such as nylon or polyamide, among other suitable materials. In some other implementations, the diffuser 200 can be formed from a metallic material such as aluminum, cobalt or titanium, or a semi-metallic material such as alumide. Depending on the material, the diffuser 200 can be 3D-printed, injection molded or formed via other suitable processes.

Figure 3:
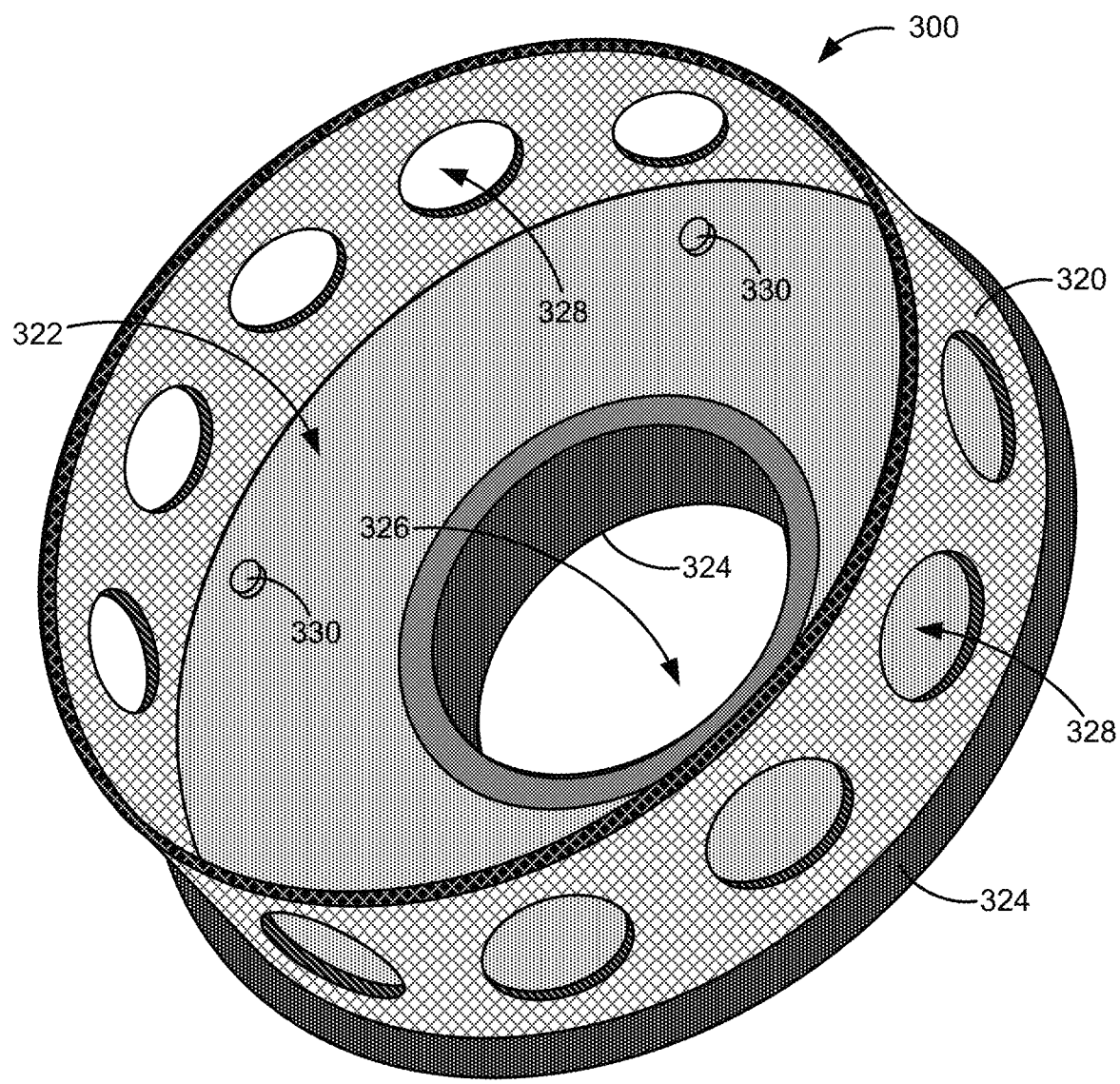
FIG. 3 shows a diagrammatic representation of an example housing capable of use in the multi-sensor device of FIG. 1 according to some implementations.

FIG. 3 shows a diagrammatic representation of an example housing 300 capable of use in the multi-sensor device 100 of FIG. 1 according to some implementations. For example, the housing 300 can implement the housing 102. In some implementations, the diffuser 300 is a single integral structure including an annular portion 320, a hollow cavity portion 322 defined by an inner surface of the annular portion 320, a base portion 324 and a conduit 326 through the base portion 324. In some other implementations, the annular portion 320 and the base portion 324 (or other portions of the housing 300) can be separate portions that are physically connected with one another with an adhesive or with some mechanical coupling mechanism such as through the use of threads and threading or via a pressure gasket. In some implementations, the housing 300 is formed from a plastic or thermoplastic such as nylon or polyamide, among other suitable materials. In some other implementations, the housing 300 can be formed from a metallic material such as aluminum, cobalt or titanium, or a semi-metallic material such as alumide. Depending on the material, the housing 300 can be 3D-printed, injection molded or formed via other suitable processes.

In some implementations, the annular portion 320 includes a number of through-holes (also referred to as "apertures" 328). For example, in implementations in which the annular portion 320 is opaque, the through-holes 328 enable the light sensors 112 to receive and sense incident light. In some implementations, the annular portion 320 and the base portion 324 also have circular cross-sections when viewed along the axis 110. In some implementations, the base portion 324 may extend diametrically outward beyond an outer circumference of the annular portion 320. Such an arrangement can be desirable so that the base portion 324 can support a diffuser such as the diffusers 104 and 200 shown and described with reference to FIGS. 1 and 2, respectively. The base portion 324 also can include post structures 330 that register with the electrical substrate 500 described in more detail below. More specifically, the post structures 330 of the base portion 324 protrude through and align the electrical substrate.

Figure 4:
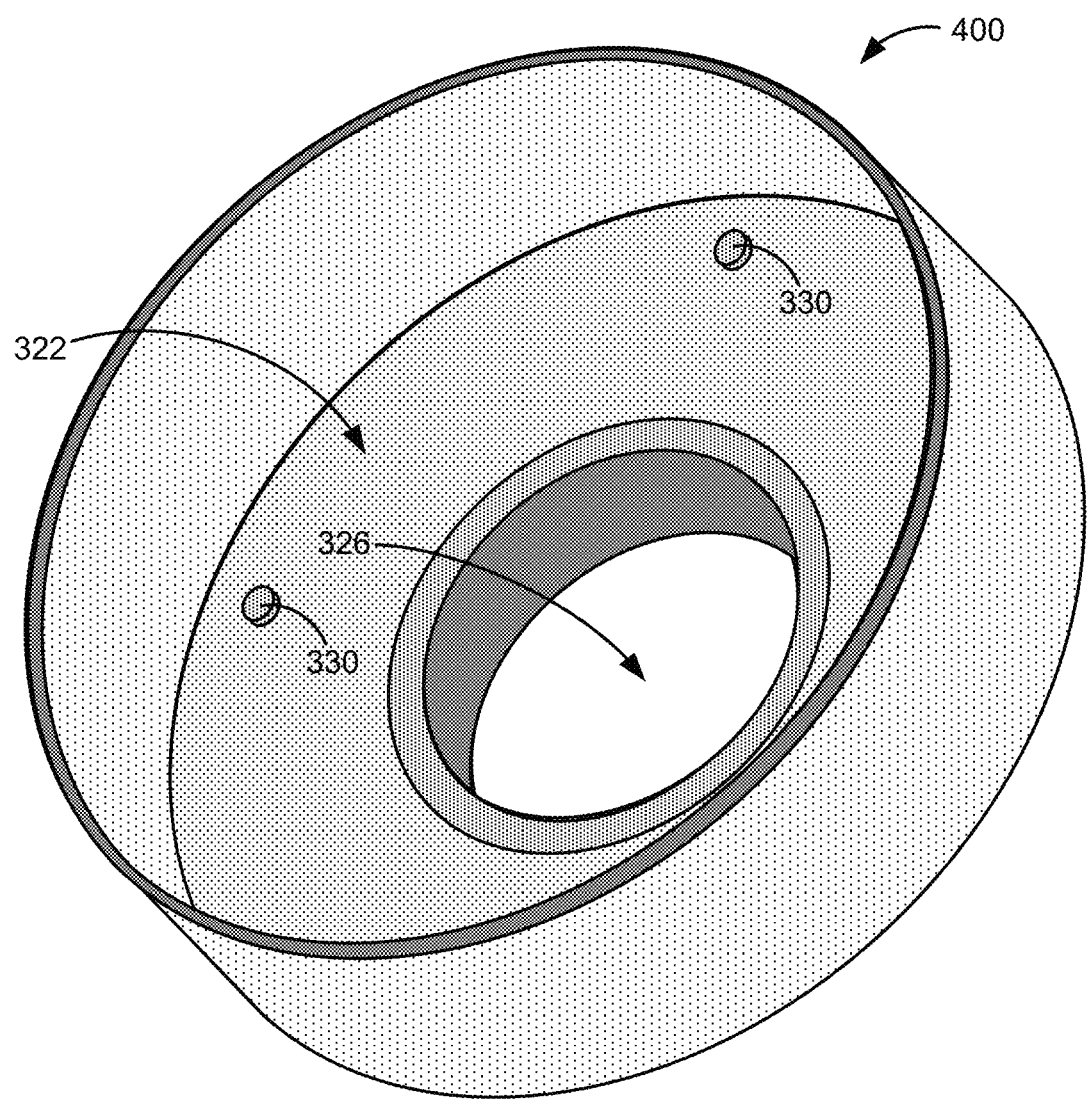
FIG. 4 shows a diagrammatic representation of an example housing formed of a light-diffusing material and capable of use in the multi-sensor device of FIG. 1 according to some implementations.

In some other implementations, the base portion 324 may seamlessly extend radially inward and downward from a bottom edge of the annular portion 320 towards a coupling portion (not shown) of the base portion 324. For example, in some such implementations, the diffuser 104 (200) and the base portion 324 are integrally formed together as one solid integral structure. In such implementations, the entire integral structure is formed of a light-diffusing material such as that described above for use in forming the diffuser 200. FIG. 4 shows a diagrammatic representation of an example housing 400 formed of a light-diffusing material and capable of use in the multi-sensor device of FIG. 1 according to some implementations. In such a housing 400 formed of a light-diffusing material, a separate diffuser 104 (or 200) is not needed. In such a housing 400, through-holes 328 also are not needed.

Figure 5:
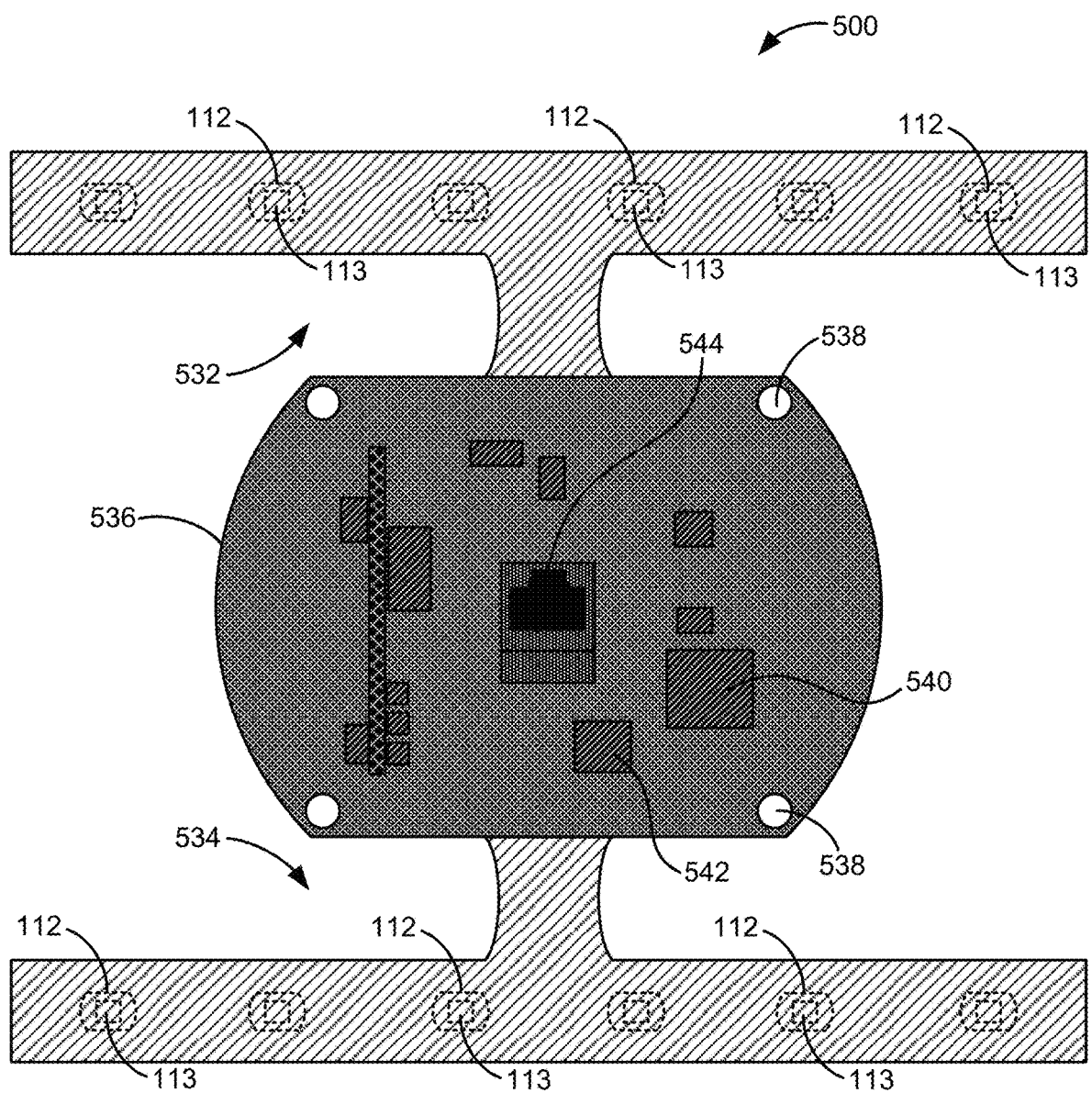
FIG. 5 shows a diagrammatic representation of an example electrical substrate capable of use in the multi-sensor device of FIG. 1 according to some implementations.

FIG. 5 shows a diagrammatic representation of an example electrical substrate 500 capable of use in the multi-sensor device 100 of FIG. 1 according to some implementations. The electrical substrate 500 includes two T-shaped portions 532 and 534 and a central portion 536. The central portion 536 can include four through-holes 538, for example, for registering with the post structures 330 of the housing 102 (or 300 or 400). Shown in FIG. 5 is a bottom surface of the electrical substrate 500. In some implementations, the two T-shaped portions 532 and 534 are formed from a flexible material. Copper or other metallic or other conductive traces (not shown) can be printed or otherwise deposited on the T-shaped portions 532 and 534 to couple to traces or other electrical connections on the central portion 536. The light sensors 112 can be soldered or otherwise physically and electrically connected with the T-shaped portions 532 and 534. In some implementations, the central portion 536 is formed of a rigid material such as FR-4 glass epoxy. In some implementations the central portion 536 forms a printed circuit board (PCB). For example, the central portion 536 can include two substrates laminated over the material that forms the T-shaped portions 532 and 534. For example, the material that forms the T-shaped portions 532 and 534 can be sandwiched between the two substrates to form the central portion 536 having a laminate structure. In that way the conductive traces on the T-shaped portions 532 and 534 can electrically couple the light sensors 112 to traces or other electrical interconnects on interior surfaces of the central portion 536. Such traces or other electrical interconnects on the interior surfaces of the central portion 536 can then be coupled to components such as a microcontroller 540, a digital signal processor (DSP) 542, and a network interface 544 such as an Ethernet port.

In some implementations, the multi-sensor device 100 further includes one or more temperature sensors electrically connected to the central portion 536, and in some instances, also physically connected with the central portion 536. In some implementations, the multi-sensor device 100 includes a first temperature sensor having a thermocouple or portion that is at least partially external to the housing 300 to sense an external temperature external to the housing 300. In some implementations, the multi-sensor device 100 additionally or alternatively includes a second of the temperature sensors being at least partially internal to the housing 300 to sense an internal temperature within the housing 300.

Figure 6A:
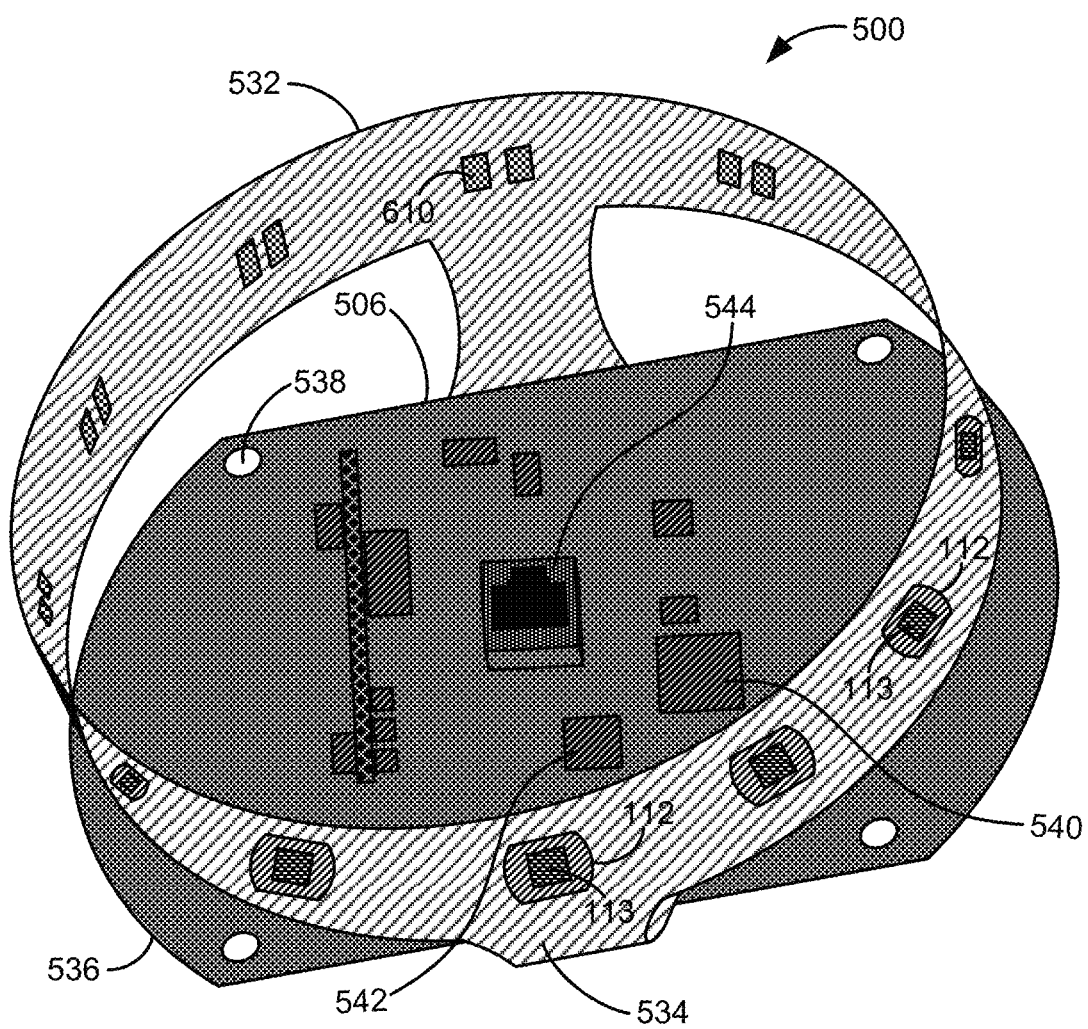
FIG. 6A shows a diagrammatic representation of a second configuration of the example electrical substrate of FIG. 5 according to some implementations.
Figure 6B:
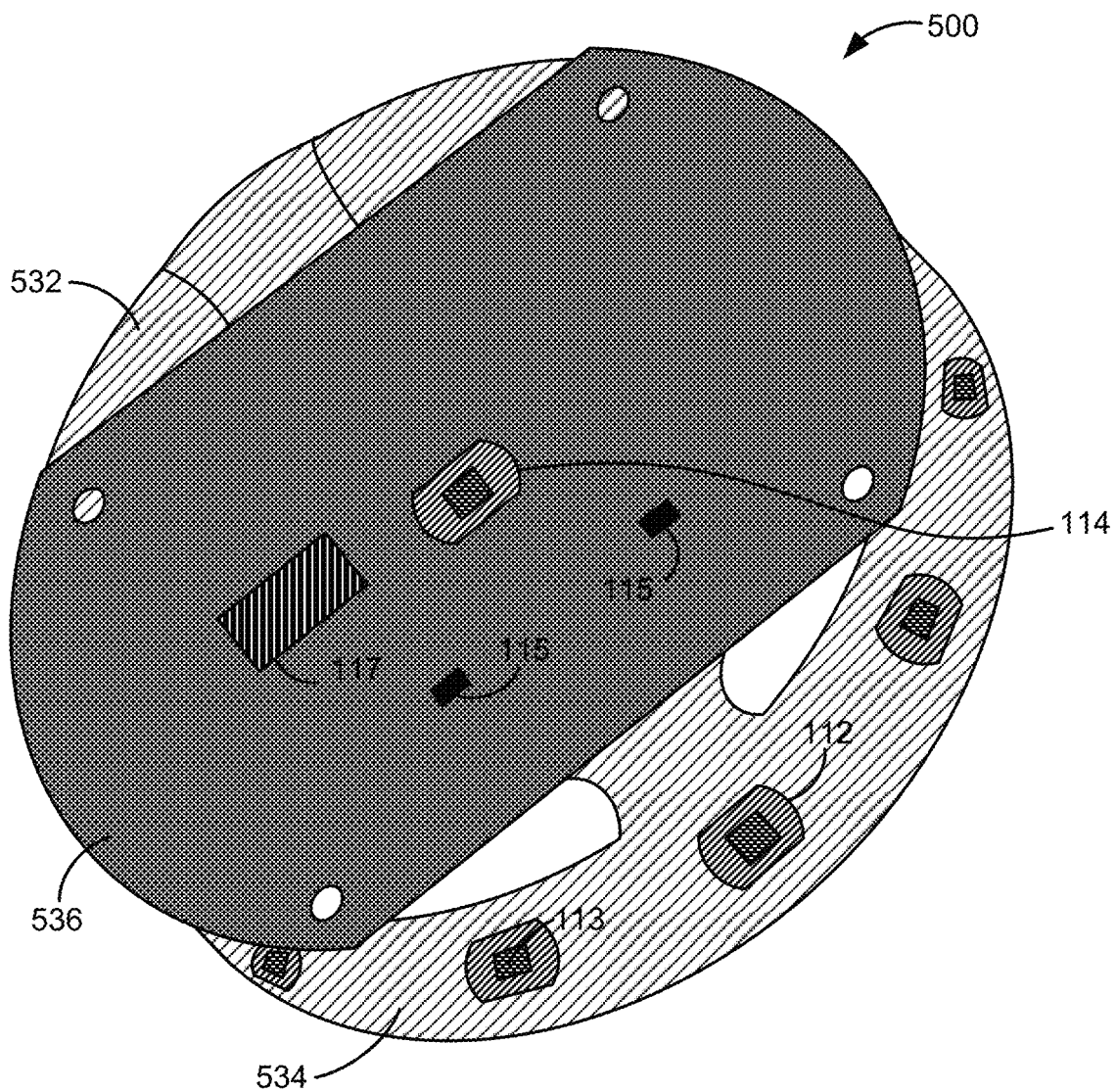
FIG. 6B shows a second view of a diagrammatic representation of the second configuration of the example electrical substrate of FIGS. 5 and 6A according to some implementations.

FIG. 6A shows a diagrammatic representation of a second configuration of the example electrical substrate 500 of FIG. 5 according to some implementations. More specifically, the electrical substrate 500 is in a rolled-up-and-around configuration for assembly. That is, T-shaped portions 532 and 534 may be bent upward, e.g. perpendicular to the (more rigid) central portion 536. The arm portions of the T-shaped portions 532 and 534 may then be curled so as to, collectively, go into a ring-like conformation so as to fit into the housing 300 or 400. FIG. 6B shows a second view of a diagrammatic representation of the second configuration of the example electrical substrate 500 of FIGS. 5 and 6A according to some implementations. For example, FIG. 6A shows a first surface of the central portion 536 (the side including the circuit components and network interface). FIG. 6B shows a second surface of the central portion 536 (the side including the axially-oriented light sensor 114). The view in FIG. 6B also shows that the multi-sensor device 100 further includes a first infrared sensor 515, a second infrared sensor 516, and a GPS module 517 located on the second surface of the electrical substrate 500. The second surface faces toward the upper surface of the housing 300. Each of the first infrared sensor 515 and second infrared sensor 506 is oriented upward with respect to the upper surface of the multi-sensor device. If the multi-sensor device is located outside a building/structure so that the second surface is facing the sky, the first infrared sensor 515 and second infrared sensor 516 take temperature measurements of a region or regions of the sky. The first infrared sensor 515 is separated from the second infrared sensor 516 by at least about one inch.

In certain implementations, a multi-sensor device further includes a GPS module such as shown in FIG. 6B. The GPS module either includes an integrated antenna or an external antenna separate from the GPS module is included elsewhere in the multi-sensor device. The GPS module can output a signal with latitude and longitude coordinates of the location of the multi-sensor device to provide geographical context for the readings taken by sensors. For example, clear sky values of irradiance at the location of the multi-sensor can be determined using the latitude and longitude coordinates and the time/date using, for example, open source Radiance. A comparison of the clear sky irradiance values to values taken by photosensors of the multi-sensor device can be used to determine weather conditions. In addition or alternatively, the GPS module of these implementations can output a signal with an orientation of the GPS module, which can be used to determine the orientation of the sensors. The orientation of an IR sensor can be used to determine the region of the sky associated with the temperature readings. An example of a commercially-available GPS module is the AirPrime® XM0100 GPS module provided by Sierra Wireless® corporation of Richmond, British Columbia. The AirPrime® XM0100 GPS module is adapted for use with a separate wireless module and for electrical connection to (directly or indirectly) to an interface of the separate wireless module. Another example of a commercially-available GPS module is the L26 GNSS Module module provided by the Quectel Wireless Solutions Co., Ltd of Shanghai, China. Certain commercially-available GPS modules have dimensions of about 12.2 mm by about 2.4 mm. The GPS module is electrically connected to one or more power sources available at the multi-sensor device.

In certain implementations, the multi-sensor device includes both a GPS module and a cellular communication circuit. In some cases, the GPS module and cellular communication circuit are commercially available as a single small device. An example of a commercially-available small device with both a GPS module and cellular communication circuit is FONA 808 Shield—Mini Cellular GSM+GPS by Adafruit Industries LLC of New York, N.Y., which has dimensions of 69.0 mm×54.0 mm×4.0 mm.

In other implementations, the multi-sensor device includes both a GPS module and a beacon source. In these implementations, the multi-sensor device may or may not also include a cellular communication circuit. A beacon source emits a beacon signal in the form of, for example, a wi-fi beacon, a Bluetooth Low Energy (BLE) beacon, a UWB beacon, etc. One example of a beacon source is an antenna such as, for example, a monopole antenna with a parallel ground plane that produces a Bluetooth beacon (IEEE 802.15.1; 2.4-2.485 GHz). The beacon source can be used for commissioning and/or geolocation. Methods for commissioning that include using a beacon are described in detail in U.S. Provisional Patent Application 62/305,892, titled "METHOD OF COMMISSIONING ELECTOCHROMIC WINDOWS" and filed on Mar. 9, 2016, which is hereby incorporated by reference in its entirety. Methods of using a beacon for geolocation are described in detail in U.S. Provisional Patent Application 62/379,163, titled "WINDOW ANTENNAS" and filed on Aug. 24, 2016, which is hereby incorporated by reference in its entirety.

In one implementation, a multi-sensor device has a GPS module and a beacon source that transmits a beacon with information related to the multi-sensor device, for example, an identification number for the multi-sensor device or other information about the multi-sensor device. An installer of the multi-sensor device may have a receiver that allows them to read the beacon. Phones and other electronic devices commonly have Bluetooth receivers that could be used to read the beacon from a BLE beacon, for example. An installer may use the electronic device to read the information on the beacon to associate the identification number for the multi-sensor device with geographical coordinates for a physical location for installing this identified multi-sensor device. A map or directory may be used to accomplish this association. The computing device can then use the electronic device to receive the geographical coordinates of the current location of the multi-sensor device communicated from the GPS module. The computing device can then be used to provide directions to the installer by comparing the current location of the multi-sensor device from the GPS module with the installation location and/or signal when the multi-sensor device is in at the installation location.

In one implementation, a multi-sensor device has a beacon source and no GPS module. In this implementation, the beacon source transmits a beacon with the geographical coordinates for the installation of the multi-sensor device. The installer may use the electronic device to read the geographical coordinates for the installation from the beacon and the geographical coordinates of the current location of the multi-sensor device communicated from the GPS module. The computing device can then be used to provide directions to the installer by comparing the current location of the multi-sensor device from the GPS module with the installation location and/or signal when the multi-sensor device is in at the installation location.

In another implementation, a multi-sensor device has a beacon source that transmits a beacon that can be used to determine the geographical coordinates of the current location of the multi-sensor device. The geographical location of the device can be determined, for example, using the strength of the beacon signal received and/or triangulation calculations. For example, a beacon can be used to locate a multi-sensor device installed on a building, in a storage facility, etc. In one case, maintenance personnel can use an electronic device with a receiver to receive the beacon signal and locate the installed multi-sensor device in order to repair or replace it. In certain implementations, the multi-sensor device further includes an optional cooling and/or heating device. An example of such a device is a Peltier device which can operate for either cooling or heating. A Peltier device is a solid-state active heat pump which transfers heat from one side of the device to the other, with consumption of electrical energy, depending on the direction of the current. When cooling is needed such as on a hot day, the Peltier device can be operated in the cooling mode to cool the communication circuitry and/or beacon circuitry to maintain effective operation. On a cold day such as when snow or sleet might be present and could obscure an IR sensor or photosensor of the multi-sensor device, the Peltier device can be operated in the heating mode to melt the snow or ice. A commercially-available Peltier device is the CP60233 made by Digi-Key Electronics of Thief River Falls, Minn.

Figure 7A:
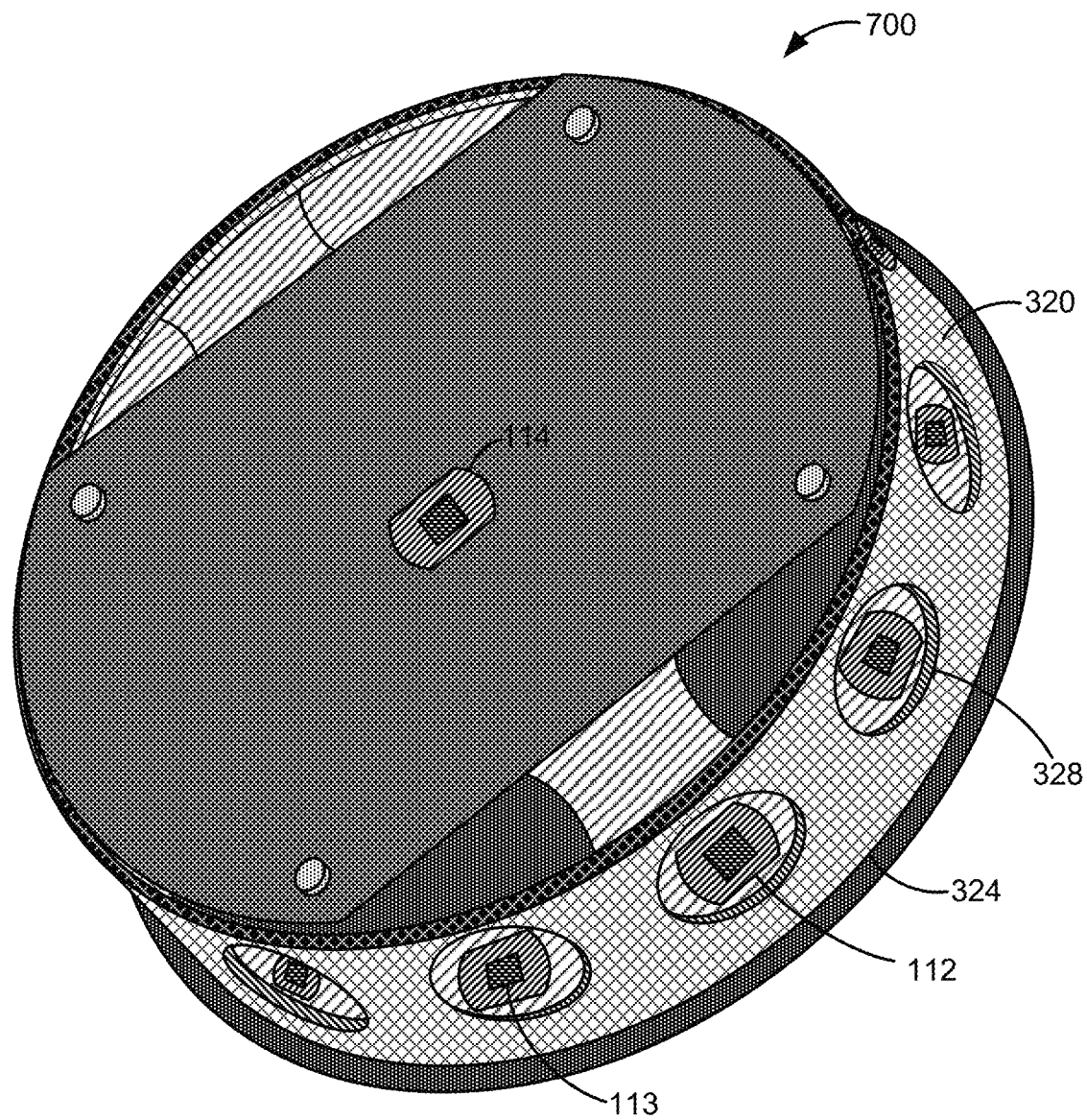
FIG. 7A shows a diagrammatic representation of an assembly of the components of FIGS. 3, 5 and 6 according to some implementations.
Figure 7B:
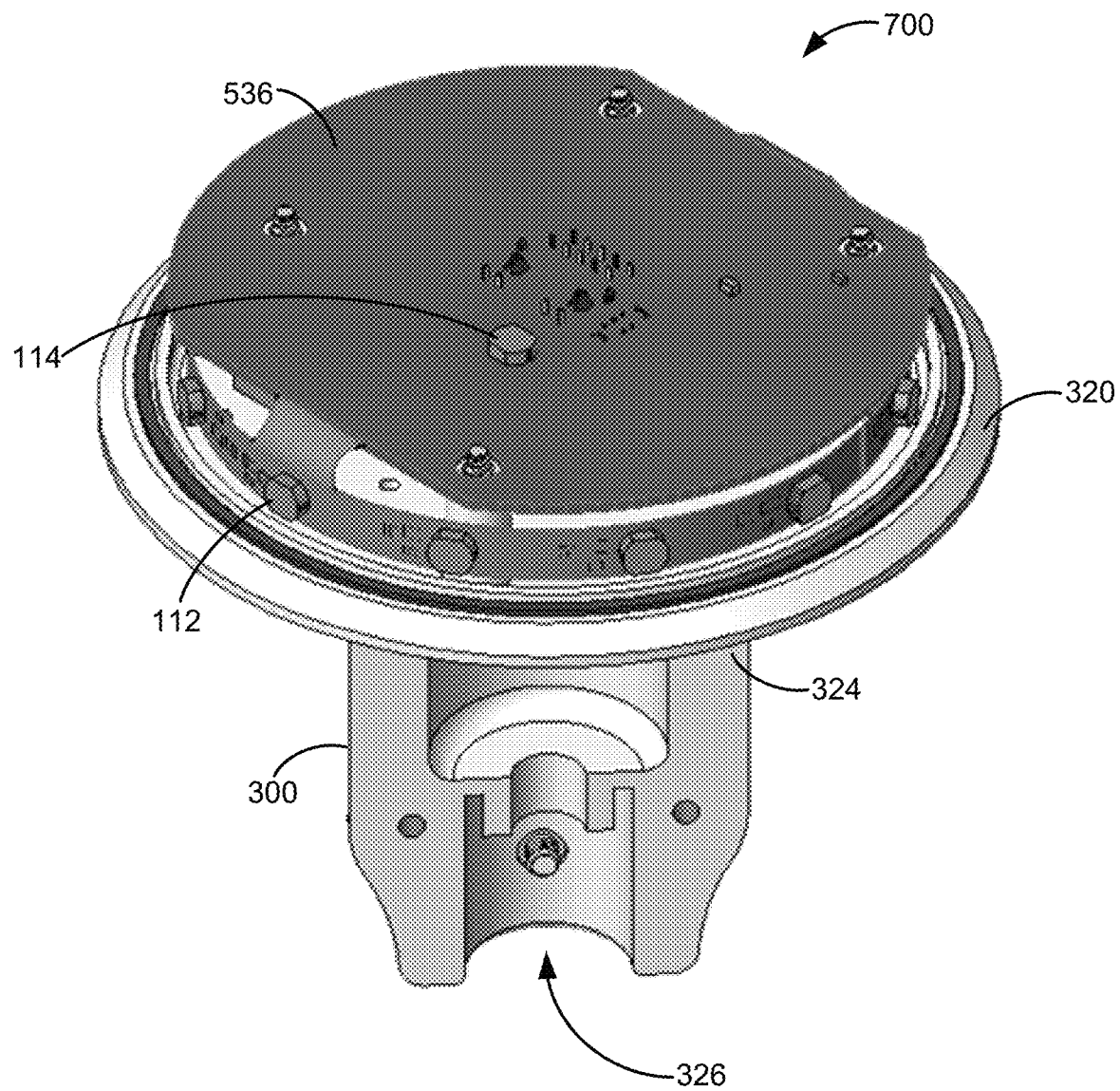
FIG. 7B shows a second diagrammatic representation of an assembly of the components of FIGS. 3, 5 and 6 according to some implementations.
Figure 7C:
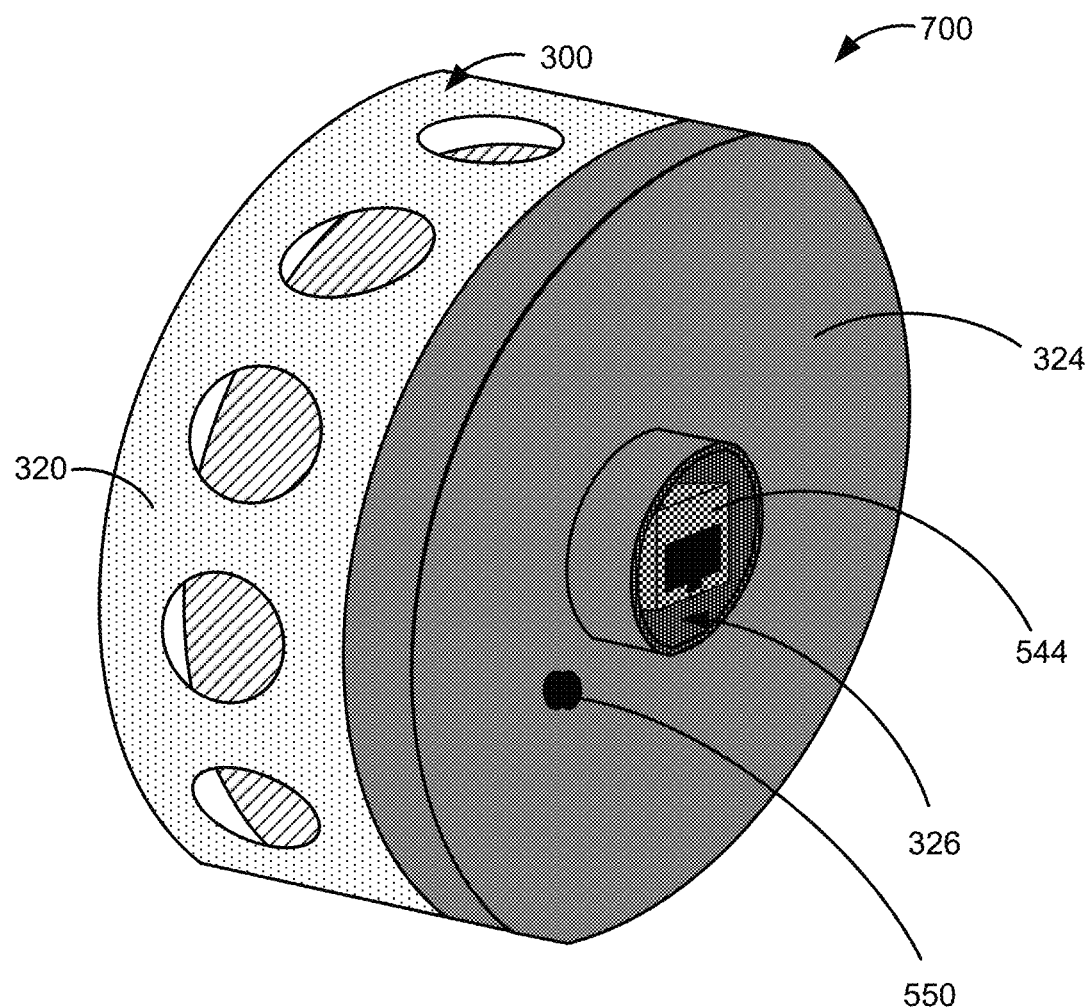
FIG. 7C shows a third diagrammatic representation of an assembly of the components of FIGS. 3, 5 and 6 according to some implementations.
Figure 8:
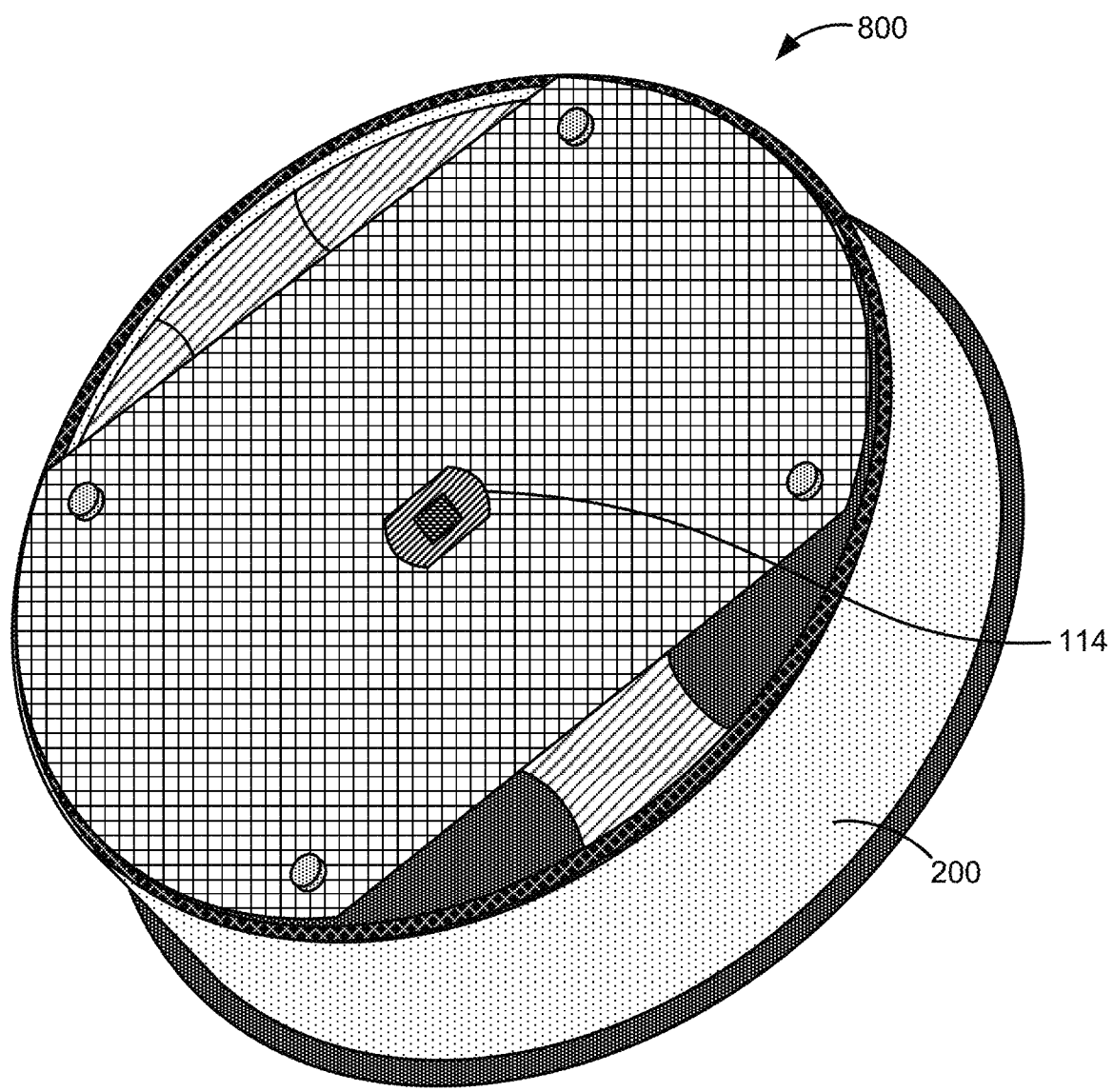
FIG. 8 shows a diagrammatic representation of the assembly of FIG. 7A with the addition of the diffuser of FIG. 2 according to some implementations.
Figure 9:
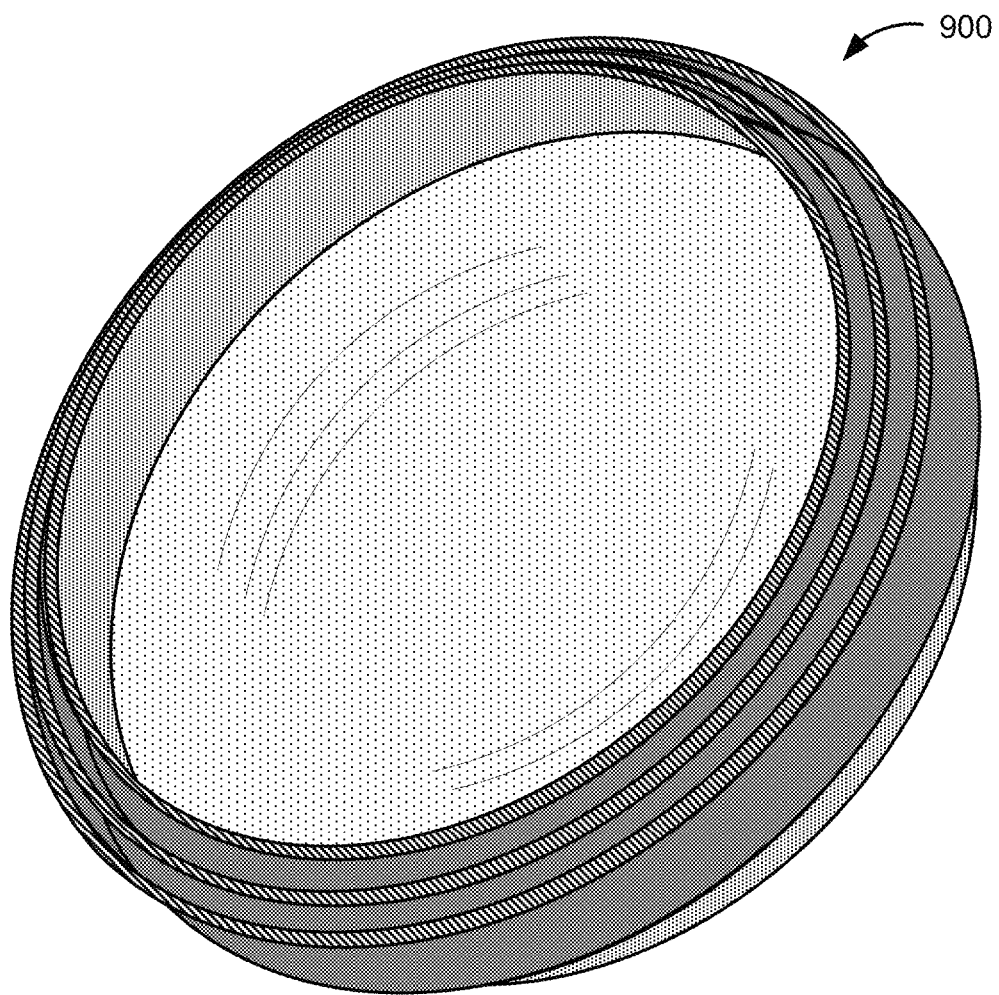
FIG. 9 shows a diagrammatic representation of an example housing cover capable of use in the multi-sensor device of FIG. 1 according to some implementations.

FIG. 7A shows a diagrammatic representation of an assembly of the components of FIGS. 3, 5 and 6 according to some implementations. FIG. 7B shows a second diagrammatic representation of an assembly of the components of FIGS. 3, 5 and 6 according to some implementations. FIG. 7C shows a third diagrammatic representation of an assembly of the components of FIGS. 3, 5 and 6 according to some implementations. For example, FIG. 7C shows a view of the conduit 326 through the base portion 324 of the housing 300. Also shown is the network interface 544 mounted to the electrical substrate 500. FIG. 8 shows a diagrammatic representation of an assembly 800 that includes the assembly 700 of FIG. 7 with the addition of the diffuser 200 of FIG. 2 according to some implementations. The view in FIG. 7C also shows that the multi-sensor device 100 further includes a temperature sensor 550 located on the bottom surface of the base portion 324. The temperature sensor 550 measures ambient temperature of the external environment. The temperature sensor 550 is located on the bottom surface to be shaded from direct solar radiation while be located externally. The temperature sensor 550 may be, for example, a thermistor, a thermocouple, a resistance thermometer, a silicon bandgap temperature sensor, etc. FIG. 9 shows a diagrammatic representation of an example housing cover 900 capable of use in the multi-sensor device of FIG. 1 according to some implementations. In some implementations, the cover 900 is formed from a plastic such as polycarbonate, polyethylene, polypropylene and/or a thermoplastic such as nylon or other polyamide, polyester or other thermoplastic, among other suitable materials. In some implementations, the material can be a weather-resistant plastic. In some other implementations, the cover 900 can be formed from a metallic material such as aluminum, cobalt or titanium, or a semi-metallic material such as alumide. In some implementations, cover 900 can be sloped or convex-shaped to prevent the accumulation of water. Depending on the material, the cover 900 can be 3D-printed, injection molded or formed via other suitable processes. In some implementations, the cover 900 includes one or more apertures or thinned portions (for example, at a region of the cover above the device) for enabling the axially-directed light sensor 114 to sense light incident on the top surface of the cover 900, for enabling the infrared sensors 115A, 115B to measure infrared radiation incident the top surface of the cover 900, and/or for enabling other devices (e.g., a GPS module or a cellular communications circuit) to receive signals proximate the top surface of the cover 900. Additionally or alternatively, some (for example, a central region) or all of the cover 900 can be formed of a light-diffusing material. In some implementations, an outer surface of the cover 900 around the central region may be coated with a reflective layer to, for example, reduce heating of the device 100. In some implementations, the cover 900 can be connected with the housing 300 via an adhesive or with some mechanical coupling mechanism such as through the use of threads and threading or via a pressure gasket or other press-on fitting.

Figures 11A, 11B:
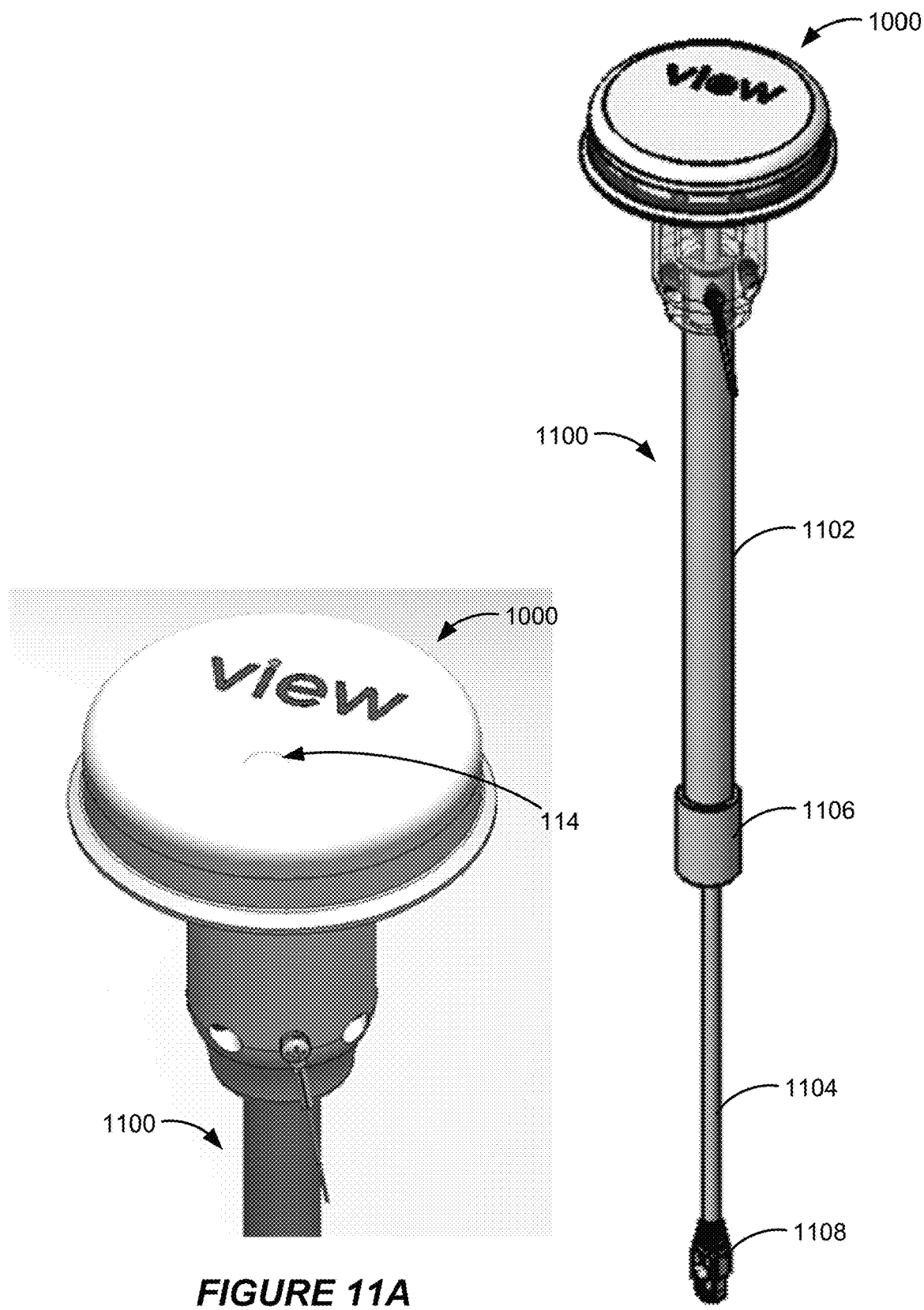
FIGS. 11A and 11B show respective views of the example multi-sensor device of FIGS. 10A-10D coupled with a mast according to some implementations.

FIGS. 10A-10D show various respective views of a diagrammatic representation of an example multi-sensor device 1000 according to some implementations. FIGS. 11A and 11B show respective views of the example multi-sensor device 1000 of FIGS. 10A-10D coupled with a mast 1100 according to some implementations. For example, the mast 1100 can function as a mounting assembly including a first portion 1102 for coupling to the base portion 324 of the housing. In some implementations, the base portion 324 can be fixedly attached or coupled to or with the first portion 1102 of the mast 1200 via mechanical threading or via a rubber gasket press-on. The mast 1100 also can include a second portion 1104 that couples into the first portion 1102 through a mechanical coupler 1106 (which may be a part of the first portion 1102). For example, a height of the mast 1100 can be adjusted via sliding the second portion 1104 further into or out of the first portion 1102. A distal end of the second portion 1104 can include a mounting or attachment mechanism 1108 for mounting or attaching the mast 1100 to a building, such as to a surface of a roof of the building, a wall on the roof, or to another structure on the roof or wall.

Power and communication cables can extend from a building or other structure on which the multi-sensor device 1000 is mounted through an inner lumen of the mast 1100 to and through a conduit of the multi-sensor device 1000 (such as the conduit 326 of the multi-sensor device 100). For example, the cables can include a power cable, a ground cable and one or more communication cables. As described above, in some implementations the multi-sensor device 1000 can include an Ethernet port that can couple the multi-sensor device 1000 to an Ethernet-compatible cable enabling coupling to a network controller of a network system. For example, the network interface 544 can be an RJ-45 connector. For example, the network interface 544 can couple the multi-sensor device 1000 to a suitable cable such as a Cat 5, Cat 5e or Cat 6 cable. In some implementations, the cable can comply with the 100BASE-T Fast Ethernet standard. In some other implementations, the cable can comply with the 1000BASE-T (also known as IEEE 802.3ab) standard enabling Gigabit Ethernet over copper wiring. The multi-sensor device 1000 (or 100) can communicate sensor data from some or all of the light sensors (for example, light sensors 112 and 114), the temperatures sensors and other sensors through the network interface 544 and the cable for communication to a master controller or network controller, as described below with reference to FIGS. 16, 17 and 18. In some implementations, the cable can enable the multi-sensor device 1000 to receive power as well as to communicate. For example, the cable can enable power-over-Ethernet (POE). In this way, a single cable can be all that is needed to couple the multi-sensor device 1000 with a network system such as that described below with reference to FIG. 16. In some other implementations, the multi-sensor device can additionally or alternatively include a wireless network interface enabling wireless communication with one or more external controllers, such as the master and network controllers as described below with reference to FIGS. 16, 17 and 18.

Figure 16:
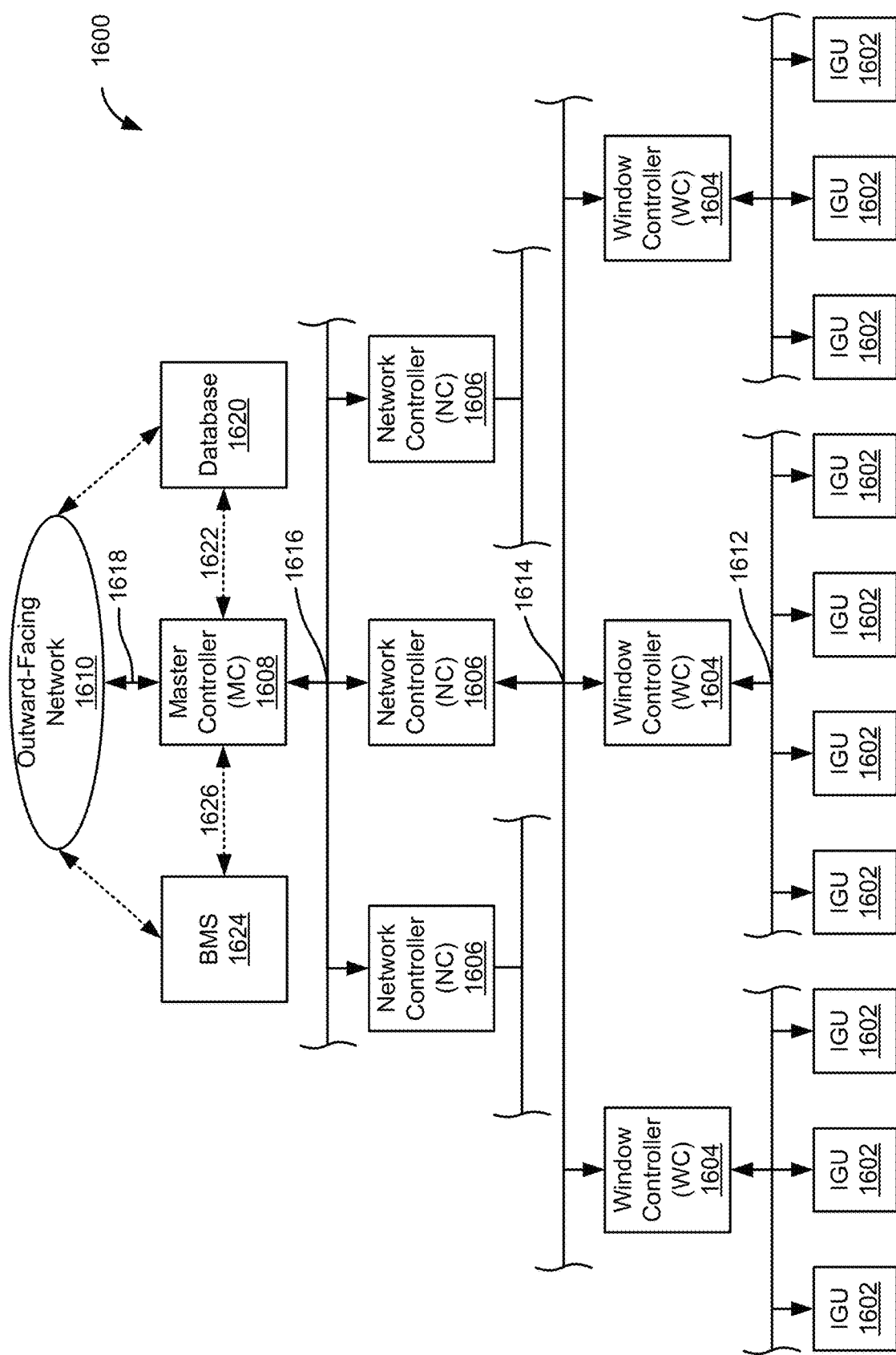
FIG. 16 shows a block diagram of an example network system operable to control a plurality of IGUs in accordance with some implementations.

In some implementations, the sensor data can be processed by a controller such as a master controller or network controller as described below with reference to FIGS. 16, 17 and 18. Such a controller can further analyze the sensor data, filter the sensor data and/or store the sensor data in a database such as the database described below with reference to FIGS. 16, 17 and 18. In some implementations, the controller can provide a web server user interface (UI) to a user at a user computing device, for example, via a web socket (for example, HTML5), and in some instances, over an external facing data link. The web UI can display the sensor data or processed sensor data for each and all of the sensors described above. The web UI also can display configuration and diagnostics (MAC address, IP address, Gateway address, Network mask, DNS, DHCP, Reboot, NTP, Event log, firmware version, firmware upgrade).

In some implementations, multi-sensor device 1000 (or 100) also can include a Universal Serial Bus USB interface for updating/upgrading firmware, for testing or performing diagnostics on the multi-sensor device 1000 (or 100) or for calibrating the light sensors 112 and 114 or other sensors of the device 100.

In some implementations, the multi-sensor device 1000 (or 100) also can include a battery within or coupled with the housing (for example, the housing 300) to power the sensors and electrical components within the device 1000. The battery can provide such power in lieu of or in addition to the power from a power supply (for example, from a building power supply). In some implementations, the multi-sensor device 1000 (or 100) further includes at least one photovoltaic cell, for example, on a surface of the housing. In some other implementations, the multi-sensor device 1000 can be coupled with a photovoltaic cell physically connected to the mast 1100. In some other implementations, the multi-sensor device 100 can be coupled with a photovoltaic cell on a roof of the building. As described above, in some other implementations, the multi-sensor device 1000 additionally or alternatively include a wireless network interface enabling wireless communication with one or more external controllers. In such wireless implementations in which the multi-sensor device 1000 includes a battery and/or includes or is coupled with a photovoltaic cell, there may be no need to perforate the building envelope.

Figure 13:
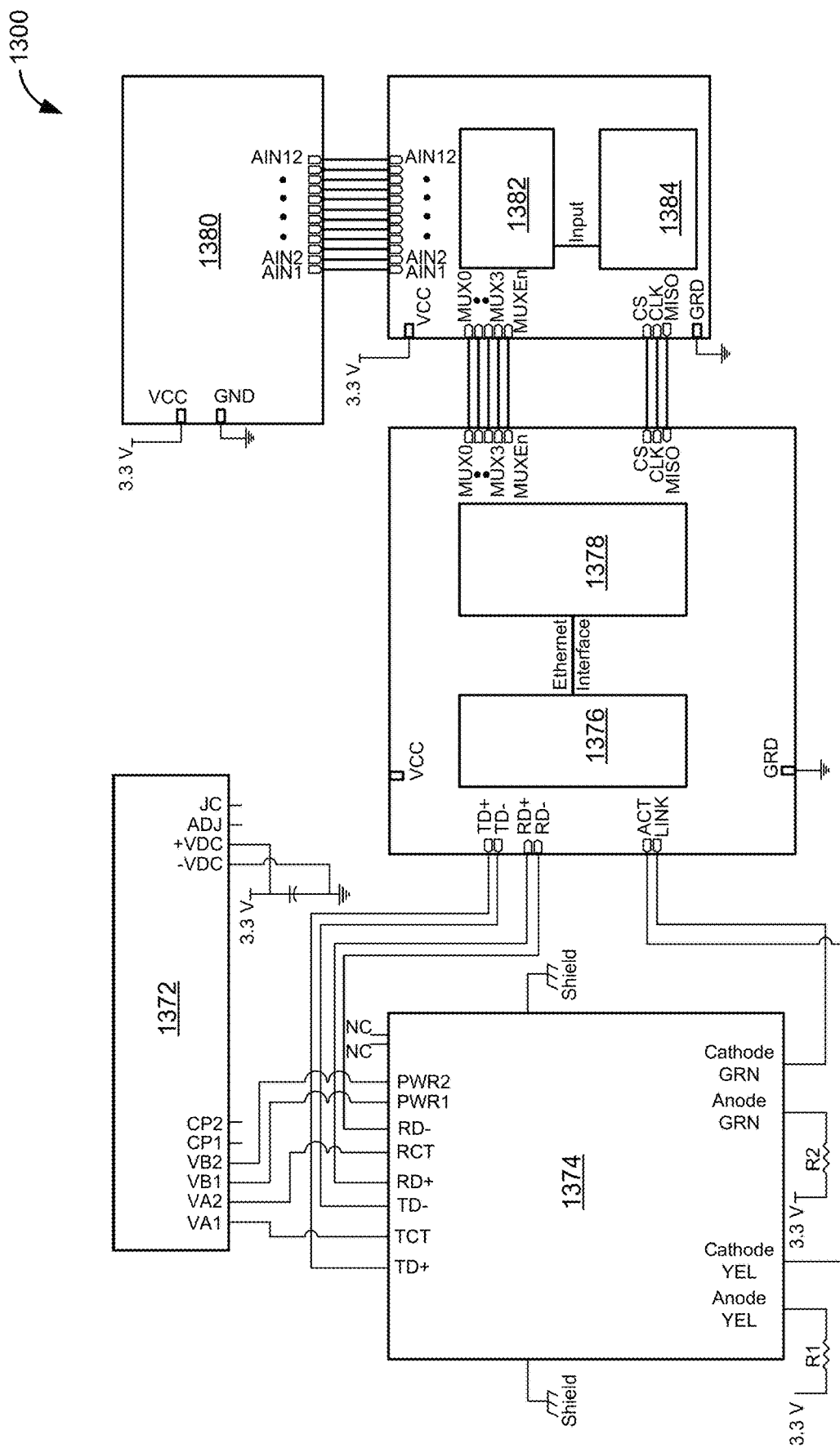
FIG. 13 shows a circuit schematic of an example circuit capable of receiving sensor data, processing sensor data, and communicating with an external system.

FIG. 13 shows a circuit schematic of an example circuit 1300 capable of receiving sensor data, processing sensor data, and communicating with an external system. For example, the electrical components on the center portion 536 of the electrical substrate 500 described with reference to FIG. 5 can include the circuit 1300. In some implementations, the circuit 1300 can include a power over ethernet (PoE) module 1372 (for example, the AG9703-FL provided by SILVERTEL), a network interface 1374 (for example, an RJ-45 PoE jack such as the 7499210123 provided by WURTH ELECTRONICS, INC.), an Ethernet board 1376 (for example, the DP83848 Ethernet Board provided by WAVESHARE), a microcontroller 1378 (for example, the PIC32MX795 provided by MICROCHIP), a receiving and amplification circuit 1380 (for example, including one or more operational amplifiers (Op amps) and/or differential amplifiers) for receiving sensor data from the light sensors 112 and 114 as well as other sensors, a multiplexer (MUX) 1382 (for example, the ADG1606 provided by ANALOG DEVICES), an analog-to-digital converter (ADC) 1384 (for example, the AD7680B provided an ANALOG DEVICES), as well as various other components such as one or more digital or analog filters or other communication interfaces.

In some implementations, the light sensors 112 and 114 can be calibrated via the circuit 1300. In some such implementations, the circuit 1300 is configured to automatically calibrate the light sensors 112 and 114, for example, on a periodic basis (e.g., daily, weekly, monthly) or in response to instructions from a controller. In some implementations, calibrating the light sensors 112 and 114 can include adjusting the offset voltages of the light sensors to adjust the gain of the light sensors or adjusting the dynamic range of the light sensors. In some implementations, the circuit 1300 also can be configured to calibrate the temperature sensors. In various implementations, a memory within the circuit 1300 can include one or more lookup tables storing calibration data or settings that are retrieved by the microcontroller 540 and applied to the light sensors or to other electrical components within the circuit 1300.

In various implementations, sensor data obtained from the multi-sensor device 100 can be used for determining tint values for optically-switchable devices such as electrochromic windows. In some implementations, the sensor data obtained from the multi-sensor device 100 can be used for shadow modeling (tree or other building or structure position) or reflection modeling of the surrounding environment (such as from windows or other reflective surfaces in or on surrounding building or structures). In various implementations, the plane defined by the axes of orientation of the light sensors 112 can be oriented horizontally, for example, oriented parallel with the building roof, parallel with the ground, or more generally parallel with a plane tangential to a point on a surface of the Earth in line with the axis 110. In some other applications, the plane defined by the axes of orientation of the light sensors 112 can be oriented vertically, for example, oriented orthogonal to the building roof, orthogonal to the ground, or more generally parallel with gravity.

Example Electrochromic Window Architecture

Figure 14:
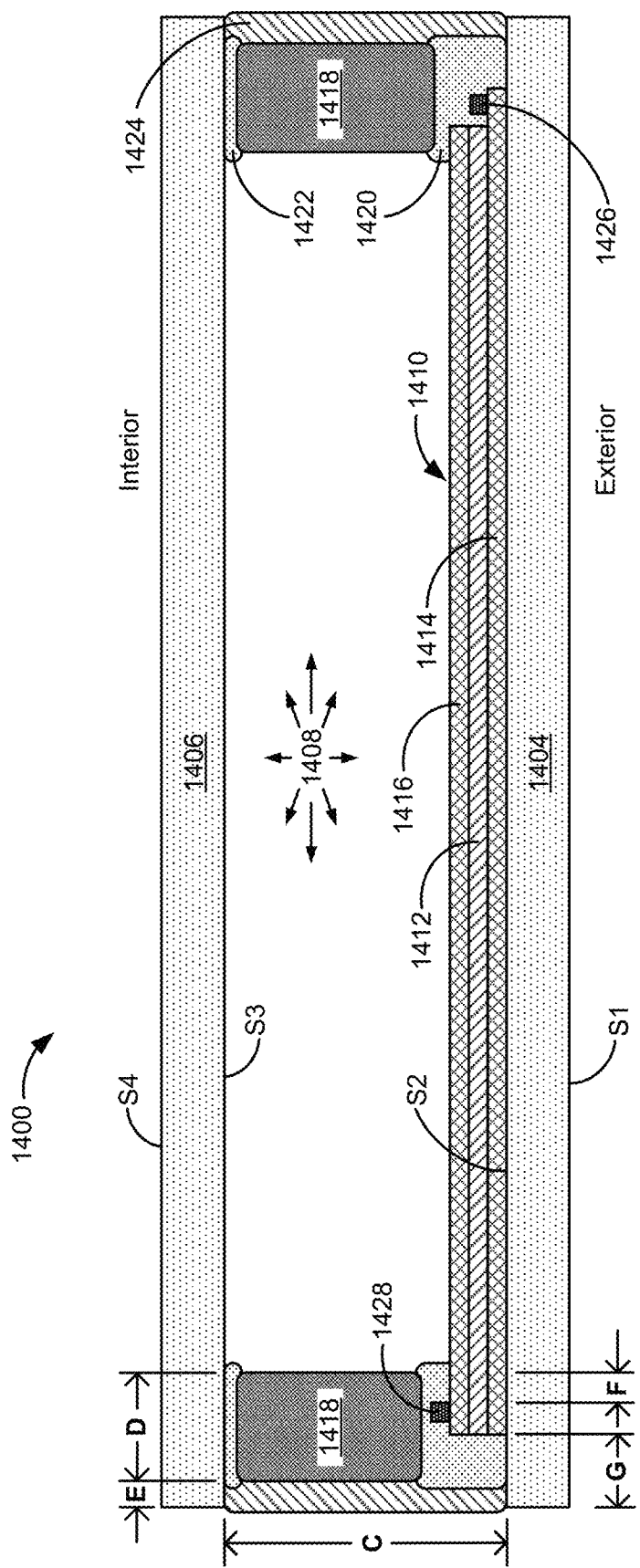
FIG. 14 shows a cross-sectional side view of an example electrochromic window in accordance with some implementations.

FIG. 14 shows a cross-sectional side view of an example electrochromic window 1400 in accordance with some implementations. An electrochromic window is one type of optically-switchable window that includes an electrochromic device (ECD) used to provide tinting or coloring. The example electrochromic window 1400 can be manufactured, configured or otherwise provided as an insulated glass unit (IGU) and will hereinafter also be referred to as IGU 1400. This convention is generally used, for example, because it is common and because it can be desirable to have IGUs serve as the fundamental constructs for holding electrochromic panes (also referred to as "lites") when provided for installation in a building. An IGU lite or pane may be a single substrate or a multi-substrate construct, such as a laminate of two substrates. IGUs, especially those having double- or triple-pane configurations, can provide a number of advantages over single pane configurations; for example, multi-pane configurations can provide enhanced thermal insulation, noise insulation, environmental protection and/or durability when compared with single-pane configurations. A multi-pane configuration also can provide increased protection for an ECD, for example, because the electrochromic films, as well as associated layers and conductive interconnects, can be formed on an interior surface of the multi-pane IGU and be protected by an inert gas fill in the interior volume, 1408, of the IGU.

FIG. 14 more particularly shows an example implementation of an IGU 1400 that includes a first pane 1404 having a first surface Si and a second surface S2. In some implementations, the first surface Si of the first pane 1404 faces an exterior environment, such as an outdoors or outside environment. The IGU 1400 also includes a second pane 1406 having a first surface S3 and a second surface S4. In some implementations, the second surface S4 of the second pane 1406 faces an interior environment, such as an inside environment of a home, building or vehicle, or a room or compartment within a home, building or vehicle.

In some implementations, each of the first and the second panes 1404 and 1406 are transparent or translucent—at least to light in the visible spectrum. For example, each of the panes 1404 and 1406 can be formed of a glass material and especially an architectural glass or other shatter-resistant glass material such as, for example, a silicon oxide ($SO_x$)-based glass material. As a more specific example, each of the first and the second panes 1404 and 1406 can be a soda-lime glass substrate or float glass substrate. Such glass substrates can be composed of, for example, approximately 75% silica ($SiO_2$) as well as $Na_2O$, CaO, and several minor additives. However, each of the first and the second panes 1404 and 1406 can be formed of any material having suitable optical, electrical, thermal, and mechanical properties. For example, other suitable substrates that can be used as one or both of the first and the second panes 1404 and 1406 can include other glass materials as well as plastic, semi-plastic and thermoplastic materials (for example, poly(methyl methacrylate), polystyrene, polycarbonate, allyl diglycol carbonate, SAN (styrene acrylonitrile copolymer), poly(4-methyl- 1-pentene), polyester, polyamide), or mirror materials. In some implementations, each of the first and the second panes 1404 and 1406 can be strengthened, for example, by tempering, heating, or chemically strengthening.

Generally, each of the first and the second panes 1404 and 1406, as well as the IGU 1400 as a whole, is a rectangular solid. However, in some other implementations other shapes are possible and may be desired (for example, circular, elliptical, triangular, curvilinear, convex or concave shapes). In some specific implementations, a length "L" of each of the first and the second panes 1404 and 1406 can be in the range of approximately 20 inches (in.) to approximately 10 feet (ft.), a width "W" of each of the first and the second panes 1404 and 1406 can be in the range of approximately 20 in. to approximately 10 ft., and a thickness "T" of each of the first and the second panes 1404 and 1406 can be in the range of approximately 0.3 millimeter (mm) to approximately 10 mm (although other lengths, widths or thicknesses, both smaller and larger, are possible and may be desirable based on the needs of a particular user, manager, administrator, builder, architect or owner). In examples where thickness T of substrate 1404 is less than 3 mm, typically the substrate is laminated to an additional substrate which is thicker and thus protects the thin substrate 1404. Additionally, while the IGU 1400 includes two panes (1404 and 1406), in some other implementations, an IGU can include three or more panes. Furthermore, in some implementations, one or more of the panes can itself be a laminate structure of two, three, or more layers or sub-panes.

The first and second panes 1404 and 1406 are spaced apart from one another by a spacer 1418, which is typically a frame structure, to form an interior volume 1408. In some implementations, the interior volume is filled with Argon (Ar), although in some other implementations, the interior volume 1408 can be filled with another gas, such as another noble gas (for example, krypton (Kr) or xenon (Xn)), another (non-noble) gas, or a mixture of gases (for example, air). Filling the interior volume 1408 with a gas such as Ar, Kr, or Xn can reduce conductive heat transfer through the IGU 1400 because of the low thermal conductivity of these gases as well as improve acoustic insulation due to their increased atomic weights. In some other implementations, the interior volume 1408 can be evacuated of air or other gas. Spacer 1418 generally determines the height "C" of the interior volume 1408; that is, the spacing between the first and the second panes 1404 and 1406. In FIG. 14, the thickness of the ECD, sealant 1420/1422 and bus bars 1426/1428 is not to scale; these components are generally very thin but are exaggerated here for clarity only. In some implementations, the spacing "C" between the first and the second panes 1404 and 1406 is in the range of approximately 6 mm to approximately 30 mm. The width "D" of spacer 1418 can be in the range of approximately 5 mm to approximately 15 mm (although other widths are possible and may be desirable).

Although not shown in the cross-sectional view, spacer 1418 is generally a frame structure formed around all sides of the IGU 1400 (for example, top, bottom, left and right sides of the IGU 1400). For example, spacer 1418 can be formed of a foam or plastic material. However, in some other implementations, spacers can be formed of metal or other conductive material, for example, a metal tube or channel structure having at least 3 sides, two sides for sealing to each of the substrates and one side to support and separate the lites and as a surface on which to apply a sealant, 1424. A first primary seal 1420 adheres and hermetically seals spacer 1418 and the second surface S2 of the first pane 1404. A second primary seal 1422 adheres and hermetically seals spacer 1418 and the first surface S3 of the second pane 1406. In some implementations, each of the primary seals 1420 and 1422 can be formed of an adhesive sealant such as, for example, polyisobutylene (PIB). In some implementations, IGU 1400 further includes secondary seal 1424 that hermetically seals a border around the entire IGU 1400 outside of spacer 1418. To this end, spacer 1418 can be inset from the edges of the first and the second panes 1404 and 1406 by a distance "E." The distance "E" can be in the range of approximately 4 mm to approximately 8 mm (although other distances are possible and may be desirable). In some implementations, secondary seal 1424 can be formed of an adhesive sealant such as, for example, a polymeric material that resists water and that adds structural support to the assembly, such as silicone, polyurethane and similar structural sealants that form a water tight seal.

In the particular configuration and form factor depicted in FIG. 14, the ECD coating on surface S2 of substrate 1404 extends about its entire perimeter to and under spacer 1418. This configuration is functionally desirable as it protects the edge of the ECD within the primary sealant 1420 and aesthetically desirable because within the inner perimeter of spacer 1418 there is a monolithic ECD without any bus bars or scribe lines. Such configurations are described in more detail in U.S. patent application Ser. No. 12/941,882 (now U.S. Pat. No. 8,164,818 issued on Apr. 24, 2012) filed on Nov. 8, 2010 and titled "ELECTROCHROMIC WINDOW FABRICATION METHODS," U.S. patent application Ser. No. 13/456,056, filed on Apr. 25, 2012 and titled "ELECTROCHROMIC WINDOW FABRICATION METHODS," PCT International Patent Application No. PCT/US2012/068817, filed on Dec. 10, 2012 and titled "THIN-FILM DEVICES AND FABRICATION," U.S. patent application Ser. No. 14/362,863, filed on filed on Jun. 4, 2014 and titled "THIN-FILM DEVICES AND FABRICATION," and in PCT International Patent Application No. PCT/US2014/073081, filed on Dec. 13, 2014 and titled "THIN-FILM DEVICES AND FABRICATION," all of which are hereby incorporated by reference herein in their entireties.

In the implementation shown in FIG. 14, an ECD 1410 is formed on the second surface S2 of the first pane 1404. In some other implementations, ECD 1410 can be formed on another suitable surface, for example, the first surface S1 of the first pane 1404, the first surface S3 of the second pane 1406 or the second surface S4 of the second pane 1406. The ECD 1410 includes an electrochromic ("EC") stack 1412, which itself may include one or more layers. For example, the EC stack 1412 can include an electrochromic layer, an ion-conducting layer, and a counter electrode layer. In some implementations, the electrochromic layer is formed of one or more inorganic solid materials. The electrochromic layer can include or be formed of one or more of a number of electrochromic materials, including electrochemically-cathodic or electrochemically-anodic materials. For example, metal oxides suitable for use as the electrochromic layer can include tungsten oxide ($WO_3$) and doped formulations thereof. In some implementations, the electrochromic layer can have a thickness in the range of approximately 0.05 µm to approximately 1 µm.

In some implementations, the counter electrode layer is formed of an inorganic solid material. The counter electrode layer can generally include one or more of a number of materials or material layers that can serve as a reservoir of ions when the EC device 1410 is in, for example, the transparent state. In certain implementations, the counter electrode not only serves as an ion storage layer but also colors anodically. For example, suitable materials for the counter electrode layer include nickel oxide (NiO) and nickel tungsten oxide (NiWO), as well as doped forms thereof, such as nickel tungsten tantalum oxide, nickel tungsten tin oxide, nickel vanadium oxide, nickel chromium oxide, nickel aluminum oxide, nickel manganese oxide, nickel magnesium oxide, nickel tantalum oxide, nickel tin oxide as non-limiting examples. In some implementations, the counter electrode layer can have a thickness in the range of approximately 0.05 µm to approximately 1 µm.

The ion-conducting layer serves as a medium through which ions are transported (for example, in the manner of an electrolyte) when the EC stack 1412 transitions between optical states. In some implementations, the ion-conducting layer is highly conductive to the relevant ions for the electrochromic and the counter electrode layers, but also has sufficiently low electron conductivity such that negligible electron transfer (electrical shorting) occurs during normal operation. A thin ion-conducting layer with high ionic conductivity enables fast ion conduction and consequently fast switching for high performance EC devices 1410. In some implementations, the ion-conducting layer can have a thickness in the range of approximately 1 nm to approximately 500 nm, more generally in the range of about 5 nm to about 100 nm thick. In some implementations, the ion-conducting layer also is an inorganic solid. For example, the ion-conducting layer can be formed from one or more silicates, silicon oxides (including silicon-aluminum-oxide), tungsten oxides (including lithium tungstate), tantalum oxides, niobium oxides, lithium oxide and borates. These materials also can be doped with different dopants, including lithium; for example, lithium-doped silicon oxides include lithium silicon-aluminum-oxide, lithium phosphorous oxynitride (LiPON) and the like.

In some other implementations, the electrochromic layer and the counter electrode layer are formed immediately adjacent one another, sometimes in direct contact, without an ion-conducting layer in between and then an ion conductor material formed in situ between the electrochromic and counter electrode layers. A further description of suitable devices is found in U.S. Pat. No. 8,764,950, issued on Jul. 1, 2014 and titled "ELECTROCHROMIC DEVICES," and U.S. patent application Ser. No. 13/462,725, filed on May 2, 2012 and titled "ELECTROCHROMIC DEVICES;" each of which is incorporated herein by reference in its entirety. In some implementations, the EC stack 1412 also can include one or more additional layers such as one or more passive layers. For example, passive layers can be used to improve certain optical properties, to provide moisture or to provide scratch resistance. These or other passive layers also can serve to hermetically seal the EC stack 1412. Additionally, various layers, including conducting layers (such as the first and the second TCO layers 1414 and 1416 described below), can be treated with anti-reflective or protective oxide or nitride layers.

The selection or design of the electrochromic and counter electrode materials generally governs the possible optical transitions. During operation, in response to a voltage generated across the thickness of the EC stack 1412 (for example, between the first and the second TCO layers 1414 and 1416), the electrochromic layer transfers or exchanges ions to or from the counter electrode layer to drive the electrochromic layer to the desired optical state. In some implementations, to cause the EC stack 1412 to transition to a transparent state, a positive voltage is applied across the EC stack 1412 (for example, such that the electrochromic layer is more positive than the counter electrode layer). In some such implementations, in response to the application of the positive voltage, the available ions in the stack reside primarily in the counter electrode layer. When the magnitude of the potential across the EC stack 1412 is reduced or when the polarity of the potential is reversed, ions are transported back across the ion conducting layer to the electrochromic layer causing the electrochromic material to transition to an opaque state (or to a "more tinted," "darker" or "less transparent" state). Conversely, in some other implementations using electrochromic layers having different properties, to cause the EC stack 1412 to transition to an opaque state, a negative voltage can be applied to the electrochromic layer relative to the counter electrode layer. In such implementations, when the magnitude of the potential across the EC stack 1412 is reduced or its polarity reversed, the ions are transported back across the ion conducting layer to the electrochromic layer causing the electrochromic material to transition to a clear or "bleached" state (or to a "less tinted", "lighter" or "more transparent" state).

In some implementations, the transfer or exchange of ions to or from the counter electrode layer also results in an optical transition in the counter electrode layer. For example, in some implementations the electrochromic and counter electrode layers are complementary coloring layers. More specifically, in some such implementations, when or after ions are transferred into the counter electrode layer, the counter electrode layer becomes more transparent, and similarly, when or after the ions are transferred out of the electrochromic layer, the electrochromic layer becomes more transparent. Conversely, when the polarity is switched, or the potential is reduced, and the ions are transferred from the counter electrode layer into the electrochromic layer, both the counter electrode layer and the electrochromic layer become less transparent.

In one more specific example, responsive to the application of an appropriate electric potential across a thickness of EC stack 1412, the counter electrode layer transfers all or a portion of the ions it holds to the electrochromic layer causing the optical transition in the electrochromic layer. In some such implementations, for example, when the counter electrode layer is formed from NiWO, the counter electrode layer also optically transitions with the loss of ions it has transferred to the electrochromic layer. When charge is removed from a counter electrode layer made of NiWO (that is, ions are transported from the counter electrode layer to the electrochromic layer), the counter electrode layer will transition in the opposite direction.

Generally, the transition of the electrochromic layer from one optical state to another optical state can be caused by reversible ion insertion into the electrochromic material (for example, by way of intercalation) and a corresponding injection of charge-balancing electrons. In some instances, some fraction of the ions responsible for the optical transition is irreversibly bound up in the electrochromic material. Some or all of the irreversibly bound ions can be used to compensate for "blind charge" in the material. In some implementations, suitable ions include lithium ions (Li+) and hydrogen ions (H+) (i.e., protons). In some other implementations, other ions can be suitable. Intercalation of lithium ions, for example, into tungsten oxide ($WO_{3-y}$, ($0<y\leq\sim0.3$)) causes the tungsten oxide to change from a transparent state to a blue state.

The description below generally focuses on tinting transitions. One example of a tinting transition is a transition from a transparent (or "translucent," "bleached" or "least tinted") state to an opaque (or "fully darkened" or "fully tinted") state. Another example of a tinting transition is the reverse—a transition from an opaque state to a transparent state. Other examples of tinting transitions includes transitions to and from various intermediate tint states, for example, a transition from a less tinted, lighter or more transparent state to a more tinted, darker or less transparent state, and vice versa. Each of such tint states, and the tinting transitions between them, may be characterized or described in terms of percent transmission. For example, a tinting transition can be described as being from a current percent transmission (% T) to a target % T. Conversely, in some other instances, each of the tint states and the tinting transitions between them may be characterized or described in terms of percent tinting; for example, a transition from a current percent tinting to a target percent tinting.

However, although the following description generally focuses on tint states and tinting transitions between tint states, other optical states and optical transitions also are achievable in various implementations. As such, where appropriate and unless otherwise indicated, references to tint states or tinting transitions also are intended to encompass other optical states and optical transitions. In other words, optical states and optical state transitions also will be referred to herein as tint states and tint state transitions, respectively, but this is not intended to limit the optical states and state transitions achievable by the IGUs 1602. For example, such other optical states and state transitions can include states and state transitions associated with various colors, intensities of color (for example, from lighter blue to darker blue and vice versa), reflectivity (for example, from less reflective to more reflective and vice versa), polarization (for example, from less polarization to more polarization and vice versa), and scattering density (for example, from less scattering to more scattering and vice versa), among others. Similarly, references to devices, control algorithms or processes for controlling tint states, including causing tinting transitions and maintaining tint states, also are intended to encompass such other optical transitions and optical states. Additionally, controlling the voltage, current or other electrical characteristics provided to an optically-switchable device, and the functions or operations associated with such controlling, also may be described hereinafter as "driving" the device or the respective IGU, whether or not the driving involves a tint state transition or the maintaining of a current tint state.

The ECD 1410 generally includes first and second conducting (or "conductive") layers. For example, the ECD 1410 can includes a first transparent conductive oxide (TCO) layer 1414 adjacent a first surface of the EC stack 1412 and a second TCO layer 1416 adjacent a second surface of the EC stack 1412. In some implementations, the first TCO layer 1414 can be formed on the second surface S2, the EC stack 1412 can be formed on the first TCO layer 1414, and the second TCO layer 1416 can be formed on the EC stack 1412. In some implementations, the first and the second TCO layers 1414 and 1416 can each be formed of one or more metal oxides including metal oxides doped with one or more metals. For example, some suitable metal oxides and doped metal oxides can include indium oxide, indium tin oxide (ITO), doped indium oxide, tin oxide, doped tin oxide, fluorinated tin oxide, zinc oxide, aluminum zinc oxide, doped zinc oxide, ruthenium oxide and doped ruthenium oxide, among others. While such materials are referred to as TCOs in this document, the term encompasses non-oxides as well as oxides that are transparent and electrically conductive such as certain thin film metals and certain non-metallic materials such as conductive metal nitrides and composite conductors, among other suitable materials. In some implementations, the first and the second TCO layers 1414 and 1416 are substantially transparent at least in the range of wavelengths where electrochromism is exhibited by the EC stack 1412. In some implementations, the first and the second TCO layers 1414 and 1416 can each be deposited by physical vapor deposition (PVD) processes including, for example, sputtering. In some implementations, the first and the second TCO layers 1414 and 1416 can each have a thickness in the range of approximately 0.01 microns (μm) to approximately 1 μm. A transparent conductive material typically has an electronic conductivity significantly greater than that of the electrochromic material or the counter electrode material.

The first and the second TCO layers 1414 and 1416 serve to distribute electrical charge across respective first and second surfaces of the EC stack 1412 to apply an electrical potential (voltage) across the thickness of the EC stack 1412. For example, a first applied voltage can be applied to a first one of the TCO layers and a second applied voltage can be applied to a second one of the TCO layers. In some implementations, a first busbar 1426 distributes the first applied voltage to the first TCO layer 1414 and a second busbar 1428 distributes the second applied voltage to the second TCO layer 1416. In some other implementations, one of the first and the second busbars 1426 and 1428 can ground the respective one of the first and the second TCO layers 1414 and 1416. In other implementations the load can be floated with respect to the two TCO layers. In various implementations, to modify one or more optical properties of the EC stack 1412, and thus cause an optical transition, a controller can alter one or both of the first and second applied voltages to bring about a change in one or both of the magnitude and the polarity of the effective voltage applied across the EC stack 1412. Desirably, the first and the second TCO layers 1414 and 1416 serve to uniformly distribute electrical charge over respective surfaces of the EC stack 1412 with relatively little Ohmic potential drop from the outer regions of the respective surfaces to the inner regions of the surfaces. As such, it is generally desirable to minimize the sheet resistance of the first and the second TCO layers 1414 and 1416. In other words, it is generally desirable that each of the first and the second TCO layers 1414 and 1416 behaves as a substantially equipotential layer across all portions of the respective layer. In this way, the first and the second TCO layers 1414 and 1416 can uniformly apply an electric potential across a thickness of the EC stack 1412 to effect a uniform optical transition of the EC stack 1412.

In some implementations, each of the first and the second busbars 1426 and 1428 is printed, patterned, or otherwise formed such that it is oriented along a length of the first pane 1404 along at least one border of the EC stack 1412. For example, each of the first and the second busbars 1426 and 1428 can be formed by depositing a conductive ink, such as a silver ink, in the form of a line. In some implementations, each of the first and the second busbars 1426 and 1428 extends along the entire length (or nearly the entire length) of the first pane 1404, and in some implementations, along more than one edge of the EC stack 1412.

In some implementations, the first TCO layer 1414, the EC stack 1412 and the second TCO layer 1416 do not extend to the edges of the first pane 1404. For example, a laser edge delete (LED) or other operation can be used to remove portions of the first TCO layer 1414, the EC stack 1412 and the second TCO layer 1416 such that these layers are separated or inset from the respective edges of the first pane 1404 by a distance "G," which can be in the range of approximately 8 mm to approximately 10 mm (although other distances are possible and may be desirable). Additionally, in some implementations, an edge portion of the EC stack 1412 and the second TCO layer 1416 along one side of the first pane 1404 is removed to enable the first busbar 1426 to be formed on the first TCO layer 1414 to enable conductive coupling between the first busbar 1426 and the first TCO layer 1414. The second busbar 1428 is formed on the second TCO layer 1416 to enable conductive coupling between the second busbar 1428 and the second TCO layer 1416. In some implementations, the first and the second busbars 1426 and 1428 are formed in a region between spacer 1418 and the first pane 1404 as shown in FIG. 14. For example, each of the first and the second busbars 1426 and 1428 can be inset from an inner edge of spacer 1418 by at least a distance "F," which can be in the range of approximately 2 mm to approximately 3 mm (although other distances are possible and may be desirable). This arrangement can be advantageous for a number of reasons including, for example, to hide the busbars from view.

As noted above, the usage of the IGU convention is for convenience only. Indeed, in some implementations the basic unit of an electrochromic window can be defined as a pane or substrate of transparent material, upon which an ECD is formed or otherwise arranged, and to which associated electrical connections are coupled (to drive the ECD). As such, references to an IGU in the following description do not necessarily include all of the components described with reference to the IGU 1400 of FIG. 14.

Example Control Profile for Driving Optical Transitions

Figure 15:
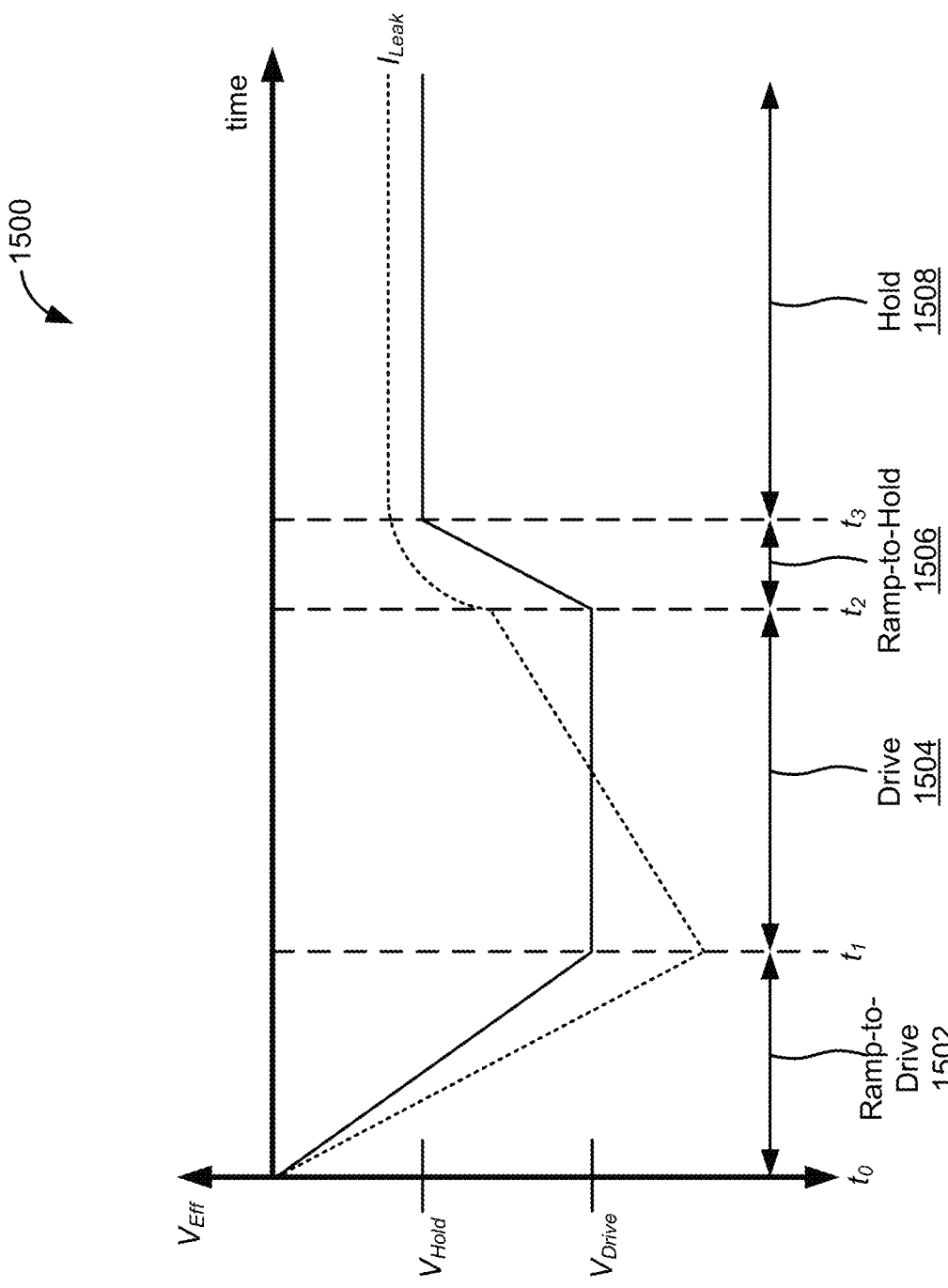
FIG. 15 illustrates an example control profile in accordance with some implementations.

FIG. 15 illustrates an example control profile 1500 in accordance with some implementations. The control profile 1500 can be used to drive a transition in an optically-switchable device, such as the ECD 1410 described above. In some implementations, a window controller can be used to generate and apply the control profile 1500 to drive an ECD from a first optical state (for example, a transparent state or a first intermediate state) to a second optical state (for example, a fully tinted state or a more tinted intermediate state). To drive the ECD in the reverse direction—from a more tinted state to a less tinted state—the window controller can apply a similar but inverted profile. For example, the control profile for driving the ECD from the second optical state to the first optical state can be a mirror image of the voltage control profile depicted in FIG. 15. In some other implementations, the control profiles for tinting and lightening can be asymmetric. For example, transitioning from a first more tinted state to a second less tinted state can in some instances require more time than the reverse; that is, transitioning from the second less tinted state to the first more tinted state. In some other instances, the reverse may be true; that is, transitioning from the second less tinted state to the first more tinted state can require more time. In other words, by virtue of the device architecture and materials, bleaching or lightening is not necessarily simply the reverse of coloring or tinting. Indeed, ECDs often behave differently for each transition due to differences in driving forces for ion intercalation and deintercalation to and from the electrochromic materials.

In some implementations, the control profile 1500 is a voltage control profile implemented by varying a voltage provided to the ECD. For example, the solid line in FIG. 15 represents an effective voltage $V_{Eff}$ applied across the ECD over the course of a tinting transition and a subsequent maintenance period. In other words, the solid line can represent the relative difference in the electrical voltages $V_{App1}$ and $V_{App2}$ applied to the two conducting layers of the ECD (for example, the first and the second TCO layers 1414 and 1416 of the ECD 1410). The dashed line in FIG. 15 represents a corresponding current density (I) through the device. In the illustrated example, the voltage control profile 1500 includes four stages: a ramp-to-drive stage 1502 that initiates the transition, a drive stage that continues to drive the transition, a ramp-to-hold stage, and subsequent hold stage.

The ramp-to-drive stage 1502 is characterized by the application of a voltage ramp that increases in magnitude from an initial value at time $t_0$ to a maximum driving value of $V_{Drive}$ at time $t_1$. In some implementations, the ramp-to-drive stage 1502 can be defined by three drive parameters known or set by the window controller: the initial voltage at $t_0$ (the current voltage across the ECD at the start of the transition), the magnitude of $V_{Drive}$ (governing the ending optical state), and the time duration during which the ramp is applied (dictating the speed of the transition). Additionally or alternatively, the window controller also can set a target ramp rate, a maximum ramp rate or a type of ramp (for example, a linear ramp, a second degree ramp or an $n^{th}$-degree ramp). In some applications, the ramp rate can be limited to avoid damaging the ECD.

The drive stage 1504 is characterized by the application of a constant voltage $V_{Drive}$ starting at time $t_1$ and ending at time $t_2$, at which point the ending optical state is reached (or approximately reached). The ramp-to-hold stage 1506 is characterized by the application of a voltage ramp that decreases in magnitude from the drive value $V_{Drive}$ at time $t_2$ to a minimum holding value of $V_{Hold}$ at time $t_3$. In some implementations, the ramp-to-hold stage 1506 can be defined by three drive parameters known or set by the window controller: the drive voltage $V_{Drive}$, the holding voltage $V_{Hold}$, and the time duration during which the ramp is applied. Additionally or alternatively, the window controller also can set a ramp rate or a type of ramp (for example, a linear ramp, a second degree ramp or an $n^{th}$-degree ramp).

The hold stage 1508 is characterized by the application of a constant voltage $V_{Hold}$ starting at time $t_3$. The holding voltage $V_{Hold}$ is used to maintain the ECD at the ending optical state. As such, the duration of the application of the holding voltage $V_{hold}$ may be concomitant with the duration of time that the ECD is to be held in the ending optical state. For example, because of non-idealities associated with the ECD, a leakage current $I_{Leak}$ can result in the slow drainage of electrical charge from the ECD. This drainage of electrical charge results in a corresponding reversal of ions across the ECD, and consequently, a slow reversal of the optical transition. In such applications, the holding voltage $V_{Hold}$ can be continuously applied to counter or prevent the leakage current. In some other implementations, the holding voltage $V_{Hold}$ can be applied periodically to "refresh" the desired optical state, or in other words, to bring the ECD back to the desired optical state.

The voltage control profile 1500 illustrated and described with reference to FIG. 15 is only one example of a voltage control profile suitable for some implementations. However, many other profiles may be desirable or suitable in such implementations or in various other implementations or applications. These other profiles also can readily be achieved using the controllers and optically-switchable devices disclosed herein. For example, in some implementations, a current profile can be applied instead of a voltage profile. In some such instances, a current control profile similar to that of the current density shown in FIG. 15 can be applied. In some other implementations, a control profile can have more than four stages. For example, a voltage control profile can include one or more overdrive stages. In one example implementation, the voltage ramp applied during the first stage 1502 can increase in magnitude beyond the drive voltage $V_{Drive}$ to an overdrive voltage $V_{OD}$. In some such implementations, the first stage 1502 can be followed by a ramp stage 1503 during which the applied voltage decreases from the overdrive voltage $V_{OD}$ to the drive voltage $V_{Drive}$. In some other such implementations, the overdrive voltage $V_{OD}$ can be applied for a relatively short time duration before the ramp back down to the drive voltage $V_{Drive}$.

Additionally, in some implementations, the applied voltage or current profiles can be interrupted for relatively short durations of time to provide open circuit conditions across the device. While such open circuit conditions are in effect, an actual voltage or other electrical characteristics can be measured, detected or otherwise determined to monitor how far along an optical transition has progressed, and in some instances, to determine whether changes in the profile are desirable. Such open circuit conditions also can be provided during a hold stage to determine whether a holding voltage $V_{Hold}$ should be applied or whether a magnitude of the holding voltage $V_{Hold}$ should be changed. Additional information related to driving and monitoring an optical transition is provided in PCT Patent Application No. PCT/US14/43514 filed 20 Jun. 2014 and titled CONTROLLING TRANSITIONS IN OPTICALLY SWITCHABLE DEVICES, which is hereby incorporated by reference herein in its entirety.

Example Controller Network Architecture

In many instances, optically-switchable windows can form or occupy substantial portions of a building envelope. For example, the optically-switchable windows can form substantial portions of the walls, facades and even roofs of a corporate office building, other commercial building or a residential building. In various implementations, a distributed network of controllers can be used to control the optically-switchable windows. FIG. 16 shows a block diagram of an example network system, 1600, operable to control a plurality of IGUs 1602 in accordance with some implementations. For example, each of the IGUs 1602 can be the same or similar to the IGU 1400 described above with reference to FIG. 14. One primary function of the network system 1600 is controlling the optical states of the ECDs (or other optically-switchable devices) within the IGUs 1602. In various implementations, the network system 1600 is operable to control the electrical characteristics of the power signals provided to the IGUs 1602. For example, the network system 1600 can generate and communicate tinting instructions (also referred to herein as "tint commands") to control voltages applied to the ECDs within the IGUs 1602.

In some implementations, another function of the network system 1600 is to acquire status information from the IGUs 1602 (hereinafter "information" is used interchangeably with "data"). For example, the status information for a given IGU can include an identification of, or information about, a current tint state of the ECD(s) within the IGU. The network system 1600 also can be operable to acquire data from various sensors, such as photosensors (also referred to herein as photodetectors, light sensors or light detectors), temperature sensors, humidity sensors, air flow sensors, or occupancy sensors, whether integrated on or within the IGUs 1602 or located at various other positions in, on or around the building.

The network system 1600 can include any suitable number of distributed controllers having various capabilities or functions. In some implementations, the functions and arrangements of the various controllers are defined hierarchically. For example, the network system 1600 includes a plurality of distributed window controllers (WCs) 304, a plurality of network controllers (NCs) 306, and a master controller (MC) 308. In some implementations, the MC 1608 can communicate with and control tens or hundreds of NCs 1606. In various implementations, the MC 1608 issues high level instructions to the NCs 1606 over one or more wired or wireless links 1616 (hereinafter collectively referred to as "link 1616"). The instructions can include, for example, tint commands for causing transitions in the optical states of the IGUs 1602 controlled by the respective NCs 1606. Each NC 1606 can, in turn, communicate with and control a number of WCs 1604 over one or more wired or wireless links 1614 (hereinafter collectively referred to as "link 1614"). For example, each NC 1606 can control tens or hundreds of the WCs 1604. Each WC 1604 can, in turn, communicate with, drive or otherwise control one or more respective IGUs 1602 over one or more wired or wireless links 1612 (hereinafter collectively referred to as "link 1612").

The MC 1608 can issue communications including tint commands, status request commands, data (for example, sensor data) request commands or other instructions. In some implementations, the MC 1608 can issue such communications periodically, at certain predefined times of day (which may change based on the day of week or year), or based on the detection of particular events, conditions or combinations of events or conditions (for example, as determined by acquired sensor data or based on the receipt of a request initiated by a user or by an application). In some implementations, when the MC 1608 determines to cause a tint state change in a set of one or more IGUs 1602, the MC 1608 generates or selects a tint value corresponding to the desired tint state. In some implementations, the set of IGUs 1602 is associated with a first protocol identifier (ID) (for example, a BACnet ID). The MC 1608 then generates and transmits a communication—referred to herein as a "primary tint command"—including the tint value and the first protocol ID over the link 1616 via a first communication protocol (for example, a BACnet compatible protocol). In some implementations, the MC 1608 addresses the primary tint command to the particular NC 1606 that controls the particular one or more WCs 1604 that, in turn, control the set of IGUs 1602 to be transitioned.

In some implementations, the NC 1606 receives the primary tint command including the tint value and the first protocol ID and maps the first protocol ID to one or more second protocol IDs. In some implementations, each of the second protocol IDs identifies a corresponding one of the WCs 1604. The NC 1606 subsequently transmits a secondary tint command including the tint value to each of the identified WCs 1604 over the link 1614 via a second communication protocol. In some implementations, each of the WCs 1604 that receives the secondary tint command then selects a voltage or current profile from an internal memory based on the tint value to drive its respectively connected IGUs 1602 to a tint state consistent with the tint value. Each of the WCs 1604 then generates and provides voltage or current signals over the link 1612 to its respectively connected IGUs 1602 to apply the voltage or current profile.

In some implementations, the various IGUs 1602 can be advantageously grouped into zones of EC windows, each of which zones includes a subset of the IGUs 1602. In some implementations, each zone of IGUs 1602 is controlled by one or more respective NCs 1606 and one or more respective WCs 1604 controlled by these NCs 1606. In some more specific implementations, each zone can be controlled by a single NC 1606 and two or more WCs 1604 controlled by the single NC 1606. Said another way, a zone can represent a logical grouping of the IGUs 1602. For example, each zone may correspond to a set of IGUs 1602 in a specific location or area of the building that are driven together based on their location. As a more specific example, consider a building having four faces or sides: a North face, a South face, an East Face and a West Face. Consider also that the building has ten floors. In such a didactic example, each zone can correspond to the set of electrochromic windows 1400 on a particular floor and on a particular one of the four faces. Additionally or alternatively, each zone may correspond to a set of IGUs 1602 that share one or more physical characteristics (for example, device parameters such as size or age). In some other implementations, a zone of IGUs 1602 can be grouped based on one or more non-physical characteristics such as, for example, a security designation or a business hierarchy.

In some such implementations of zones of IGUs, each NC 1606 can address all of the IGUs 1602 in each of one or more respective zones. For example, the MC 1608 can issue a primary tint command to the NC 1606 that controls a target zone. The primary tint command can include an abstract identification of the target zone (hereinafter also referred to as a "zone ID"). In some such implementations, the zone ID can be a first protocol ID such as that just described in the example above. In such cases, the NC 1606 receives the primary tint command including the tint value and the zone ID and maps the zone ID to the second protocol IDs associated with the WCs 1604. In some other implementations, the zone ID can be a higher level abstraction than the first protocol IDs. In such cases, the NC 1606 can first map the zone ID to one or more first protocol IDs, and subsequently map the first protocol IDs to the second protocol IDs.

In some implementations, the MC 1608 is coupled to one or more outward-facing networks, 1610, (hereinafter collectively referred to as "the outward-facing network 1610") via one or more wired or wireless links 1618 (hereinafter "link 1618"). In some such implementations, the MC 1608 can communicate acquired status information or sensor data to remote computers, mobile devices, servers, databases in or accessible by the outward-facing network 1610. In some implementations, various applications, including third party applications or cloud-based applications, executing within such remote devices can access data from or provide data to the MC 1608. In some implementations, authorized users or applications can communicate requests to modify the tint states of various IGUs 1602 to the MC 1608 via the network 1610. In some implementations, the MC 1608 can first determine whether to grant the request (for example, based on power considerations or based on whether the user has the appropriate authorization) prior to issuing a tint command. The MC 1608 can then calculate, determine, select or otherwise generate a tint value and transmit the tint value in a primary tint command to cause the tint state transitions in the adjoining IGUs 1602.

For example, a user can submit such a request from a computing device, such as a desktop computer, laptop computer, tablet computer or mobile device (for example, a smartphone). In some such implementations, the user's computing device can execute a client-side application that is capable of communicating with the MC 1608, and in some instances, with a master controller application executing within the MC 1608. In some other implementations, the client-side application can communicate with a separate application, in the same or a different physical device or system as the MC 1608, which then communicates with the master controller application to effect the desired tint state modifications. In some implementations, the master application or other separate application can be used to authenticate the user to authorize requests submitted by the user. In some implementations, the user can select the IGUs 1602 to be tinted, and inform the MC 1608 of the selections, by entering a room number via the client-side application.

Additionally or alternatively, in some implementations, a user's mobile device or other computing device can communicate wirelessly with various WCs 1604. For example, a client-side application executing within a user's mobile device can transmit wireless communications including tint state control signals to a WC 1604 to control the tint states of the respective IGUs 1602 connected to the WC 1604. For example, the user can use the client-side application to maintain or modify the tint states of the IGUs 1602 adjoining a room occupied by the user (or to be occupied by the user or others at a future time). Such wireless communications can be generated, formatted or transmitted using various wireless network topologies and protocols (described in more detail below with reference to the WC 1900 of FIG. 19).

In some such implementations, the control signals sent to the respective WC 1604 from the user's mobile device (or other computing device) can override a tint value previously received by the WC 1604 from the respective NC 1606. In other words, the WC 1604 can provide the applied voltages to the IGUs 1602 based on the control signals from the user's computing device rather than based on the tint value. For example, a control algorithm or rule set stored in and executed by the WC 1604 can dictate that one or more control signals from an authorized user's computing device take precedence over a tint value received from the NC 1606. In some other instances, such as in high demand cases, control signals such as a tint value from the NC 1606 may take precedence over any control signals received by the WC 1604 from a user's computing device.

In some other implementations, based on the receipt of a control signal from an authorized user's computing device, the MC 1608 can use information about a combination of known parameters to calculate, determine, select or otherwise generate a tint value that provides lighting conditions desirable for a typical user, while in some instances also being mindful of power considerations. In some other implementations, the MC 1608 can determine the tint value based on preset preferences defined by or for the particular user that requested the tint state change via the computing device. For example, the user may be required to enter a password or otherwise login or obtain authorization to request a tint state change. In such instances, the MC 1608 can determine the identity of the user based on a password, a security token or based on an identifier of the particular mobile device or other computing device. After determining the user's identity, the MC 1608 can then retrieve preset preferences for the user, and use the preset preferences alone or in combination with other parameters (such as power considerations or information from various sensors) to generate and transmit a tint value for use in tinting the respective IGUs 1602.

In some implementations, the MC 1608 is coupled to an external database (or "data store" or "data warehouse") 1620. In some implementations, the database 1620 can be a local database coupled with the MC 1608 via a wired hardware link 1622. In some other implementations, the database 1620 can be a remote database or a cloud-based database accessible by the MC 1608 via an internal private network or over the outward-facing network 1610. In some implementations, other computing devices, systems or servers also can have access to read the data stored in the database 1620, for example, over the outward-facing network 1610. Additionally, in some implementations, one or more control applications or third party applications also can have access to read the data stored in the database via the outward-facing network 1610. In some cases, the MC 1608 stores a record of all tint commands including tint values issued by the MC 1608 in the database 1620. The MC 1608 also can collect status and sensor data and store it in the database 1620. In such instances, the WCs 1604 can collect the sensor data and status data from the IGUs 1602 and communicate the sensor data and status data to the respective NCs 1606 over link 1614 for communication to the MC 1608 over link 1616. Additionally or alternatively, the NCs 1606 or the MC 1608 themselves also can be connected to various sensors such as light, temperature or occupancy sensors within the building as well as light or temperature sensors positioned on, around or otherwise external to the building (for example, on a roof of the building). In some implementations the NCs 1606 or the WCs 1604 also can transmit status or sensor data directly to the database 1620 for storage.

In some implementations, the network system 1600 also can be designed to function in conjunction with modern heating, ventilation, and air conditioning (HVAC) systems, interior lighting systems, security systems or power systems as an integrated and efficient energy control system for an entire building or a campus of buildings. Some implementations of the network system 1600 are suited for integration with a building management system (BMS), 1624. A BMS is broadly a computer-based control system that can be installed in a building to monitor and control the building's mechanical and electrical equipment such as HVAC systems (including furnaces or other heaters, air conditioners, blowers and vents), lighting systems, power systems, elevators, fire systems, and security systems. The BMS can include hardware and associated firmware and software for maintaining conditions in the building according to preferences set by the occupants or by a building manager or other administrator. The software can be based on, for example, internet protocols or open standards. A BMS can typically be used in large buildings where it functions to control the environment within the building. For example, the BMS can control lighting, temperature, carbon dioxide levels, and humidity within the building. To control the building environment, the BMS can turn on and off various mechanical and electrical devices according to rules or in response to conditions. Such rules and conditions can be selected or specified by a building manager or administrator, for example. One function of a BMS can be to maintain a comfortable environment for the occupants of a building while minimizing heating and cooling energy losses and costs. In some implementations, the BMS can be configured not only to monitor and control, but also to optimize the synergy between various systems, for example, to conserve energy and lower building operation costs.

Additionally or alternatively, some implementations of the network system 1600 are suited for integration with a smart thermostat service, alert service (for example, fire detection), security service or other appliance automation service. On example of a home automation service is NEST®, made by Nest Labs of Palo Alto, Calif., (NEST® is a registered trademark of Google, Inc. of Mountain View, Calif.). As used herein, references to a BMS can in some implementations also encompass, or be replaced with, such other automation services.

In some implementations, the MC 1608 and a separate automation service, such as a BMS 1624, can communicate via an application programming interface (API). For example, the API can execute in conjunction with a master controller application (or platform) within the MC 1608, or in conjunction with a building management application (or platform) within the BMS 1624. The MC 1608 and the BMS 1624 can communicate over one or more wired links 1626 or via the outward-facing network 1610. In some instances, the BMS 1624 can communicate instructions for controlling the IGUs 1602 to the MC 1608, which then generates and transmits primary tint commands to the appropriate NCs 1606. In some implementations, the NCs 1606 or the WCs 1604 also can communicate directly with the BMS 1624 (whether through a wired/hardware link or wirelessly through a wireless data link). In some implementations, the BMS 1624 also can receive data, such as sensor data, status data and associated timestamp data, collected by one or more of the MC 1608, the NCs 1606 and the WCs 1604. For example, the MC 1608 can publish such data over the network 1610. In some other implementations in which such data is stored in a database 1620, the BMS 1624 can have access to some or all of the data stored in the database 1620.

Example Master Controller

Figure 17:
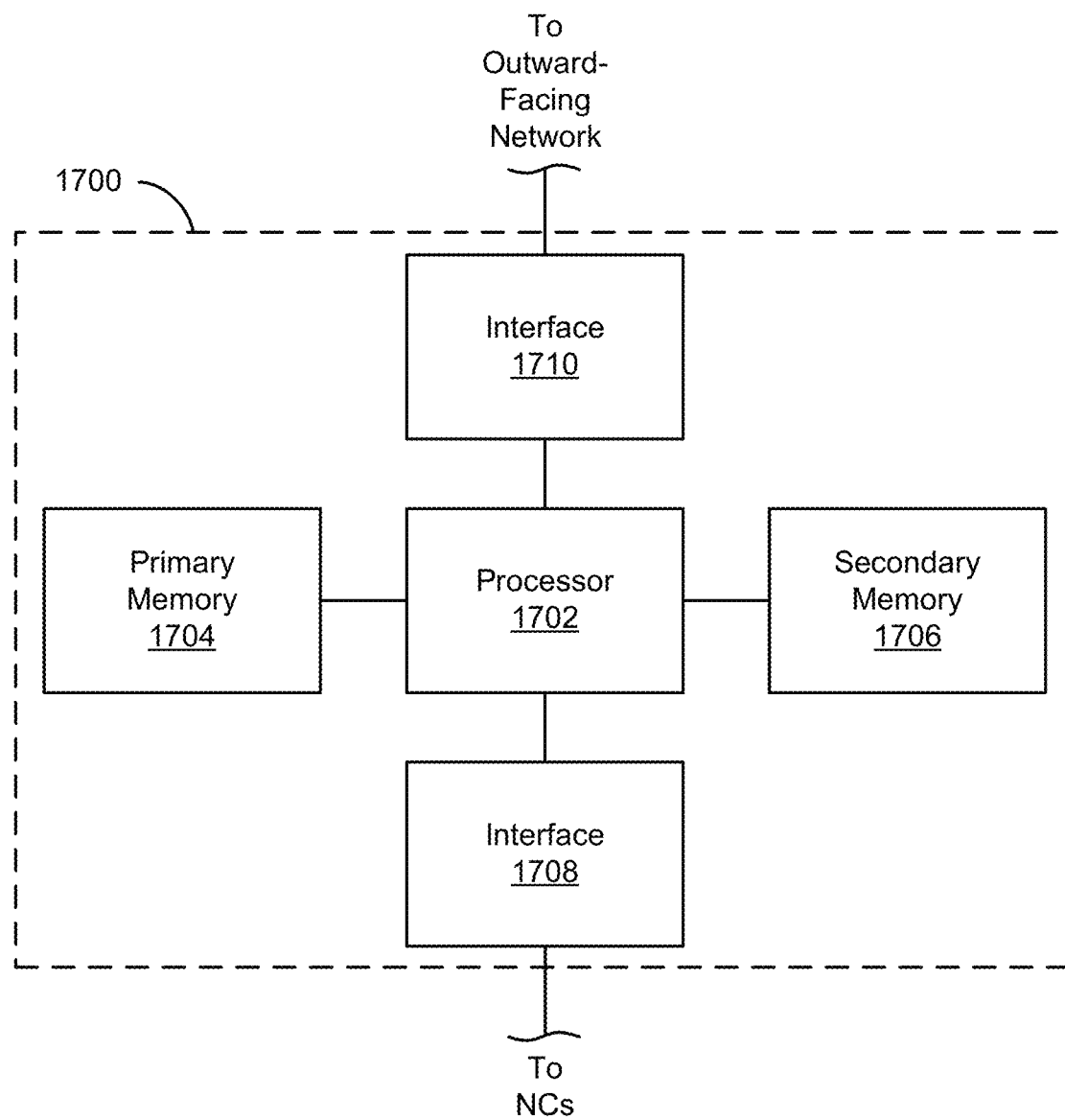
FIG. 17 shows a block diagram of an example master controller (MC) in accordance with some implementations.

FIG. 17 shows a block diagram of an example master controller (MC) 1700 in accordance with some implementations. For example, the MC 1700 of FIG. 17 can be used to implement the MC 1608 described above with reference to the network system 1600 of FIG. 16. As used herein, references to "the MC 1700" also encompass the MC 1608, and vice versa; in other words, the two references may be used interchangeably. The MC 1700 can be implemented in or as one or more computers, computing devices or computer systems (herein used interchangeably where appropriate unless otherwise indicated). Additionally, reference to "the MC 1700" collectively refers to any suitable combination of hardware, firmware and software for implementing the functions, operations, processes or capabilities described. For example, the MC 1700 can refer to a computer that implements a master controller application (also referred to herein as a "program" or a "task").

As shown in FIG. 17, the MC 1700 generally includes one or more processors 1702 (also collectively referred to hereinafter as "the processor 1702"). Processor 1702 can be or can include a central processing unit (CPU), such as a single core or a multi-core processor. The processor 1702 can additionally include a digital signal processor (DSP) or a network processor in some implementations. In some implementations, the processor 1702 also can include one or more application-specific integrated circuits (ASICs). The processor 1702 is coupled with a primary memory 1704, a secondary memory 1706, an inward-facing network interface 1708 and an outward-facing network interface 1710. The primary memory 1704 can include one or more high-speed memory devices such as, for example, one or more random-access memory (RAM) devices including dynamic-RAM (DRAM) devices. Such DRAM devices can include, for example, synchronous DRAM (SDRAM) devices and double data rate SDRAM (DDR SDRAM) devices (including DDR2 SDRAM, DDR3 SDRAM, and DDR4 SDRAM), thyristor RANI (T-RAM), and zero-capacitor (Z-RAM®), among other suitable memory devices.

The secondary memory 1706 can include one or more hard disk drives (HDDs) or one or more solid-state drives (SSDs). In some implementations, the memory 1706 can store processor-executable code (or "programming instructions") for implementing a multi-tasking operating system such as, for example, an operating system based on a Linux® kernel. In some other implementations, the operating system can be a UNIX®- or Unix-like-based operating system, a Microsoft Windows®-based operating system, or another suitable operating system. The memory 1706 also can store code executable by the processor 1702 to implement the master controller application described above, as well as code for implementing other applications or programs. The memory 1706 also can store status information, sensor data or other data collected from network controllers, window controllers and various sensors.

In some implementations, the MC 1700 is a "headless" system; that is, a computer that does not include a display monitor or other user input device. In some such implementations, an administrator or other authorized user can log in to or otherwise access the MC 1700 from a remote computer or mobile computing device over a network (for example, the network 1610) to access and retrieve information stored in the MC 1700, to write or otherwise store data in the MC 1700, and to control various functions, operations, processes or parameters implemented or used by the MC 1700. In some other implementations, the MC 1700 also can include a display monitor and a direct user input device (for example, one or more of a mouse, a keyboard and a touchscreen).

In various implementations, the inward-facing network interface 1708 enables the MC 1700 to communicate with various distributed controllers, and in some implementations, also with various sensors. The inward-facing network interface 1708 can collectively refer to one or more wired network interfaces or one or more wireless network interfaces (including one or more radio transceivers). In the context of the network system 1600 of FIG. 16, the MC 1700 can implement the MC 1608 and the inward-facing network interface 1708 can enable communication with the downstream NCs 1606 over the link 1616.

The outward-facing network interface 1710 enables the MC 1700 to communicate with various computers, mobile devices, servers, databases or cloud-based database systems over one or more networks. The outward-facing network interface 1710 also can collectively refer to one or more wired network interfaces or one or more wireless network interfaces (including one or more radio transceivers). In the context of the network system 1600 of FIG. 16, the outward-facing network interface 1710 can enable communication with various computers, mobile devices, servers, databases or cloud-based database systems accessible via the outward-facing network 1610 over the link 1618. As described above, in some implementations, the various applications, including third party applications or cloud-based applications, executing within such remote devices can access data from or provide data to the MC 1700 or to the database 1620 via the MC 1700. In some implementations, the MC 1700 includes one or more APIs for facilitating communication between the MC 1700 and various third party applications. Some example implementations of APIs that the MC 1700 can enable are described in U.S. Provisional Patent Application Ser. No. 62/088,943, filed on Dec. 8, 2014 and titled "MULTIPLE INTERFACING SYSTEMS AT A SITE," which is hereby incorporated by reference herein in its entirety. For example, such third party applications can include various monitoring services including thermostat services, alert services (for example, fire detection), security services or other appliance automation services. Additional examples of monitoring services and systems can be found in PCT Patent Application PCT/US2015/019031, filed on Mar. 5, 2015 and titled "MONITORING SITES CONTAINING SWITCHABLE OPTICAL DEVICES AND CONTROLLERS," which is hereby incorporated by reference herein in its entirety.

The MC 1700 can calculate, determine, select or otherwise generate a tint value for one or more IGUs 1602 based on a combination of parameters. For example, the combination of parameters can include time or calendar information such as the time of day, day of year or time of season. Additionally or alternatively, the combination of parameters can include solar calendar information such as, for example, the direction of the sun relative to the IGUs 1602. In some instances, the direction of the sun relative to the IGUs 1602 can be determined by the MC 1700 based on time and calendar information together with information known about the geographical location of the building on the Earth and the direction that the IGUs face (for example, in a North-East-Down coordinate system). The combination of parameters also can include the outside temperature (external to the building), the inside temperature (within a room adjoining the target IGUs 1602), or the temperature within the interior volume of the IGUs 1602. The combination of parameters also can include information about the weather (for example, whether it is clear, sunny, overcast, cloudy, raining or snowing). Parameters such as the time of day, day of year, or direction of the sun can be programmed into and tracked by the MC 1608. Parameters such as the outside temperature, inside temperature or IGU temperature can be obtained from sensors in, on or around the building or sensors integrated on or within the IGUs 1602. Some information about the weather also can be obtained from such sensors. Additionally or alternatively, parameters such as the time of day, time of year, direction of the sun, or weather can be provided by, or determined based on information provided by, various applications including third party applications over the network 1610. Additional examples of algorithms, routines, modules, or other means for generating tint values are described in commonly assigned U.S. patent application Ser. No. 13/722,969, filed on Feb. 21, 2013 and titled "CONTROL METHOD FOR TINTABLE WINDOWS," and in PCT Patent Application No. PCT/2015/029675, filed on May 7, 2015 and titled "CONTROL METHOD FOR TINTABLE WINDOWS," both of which are hereby incorporated by reference herein in their entireties.

Example Network Controller

Figure 18:
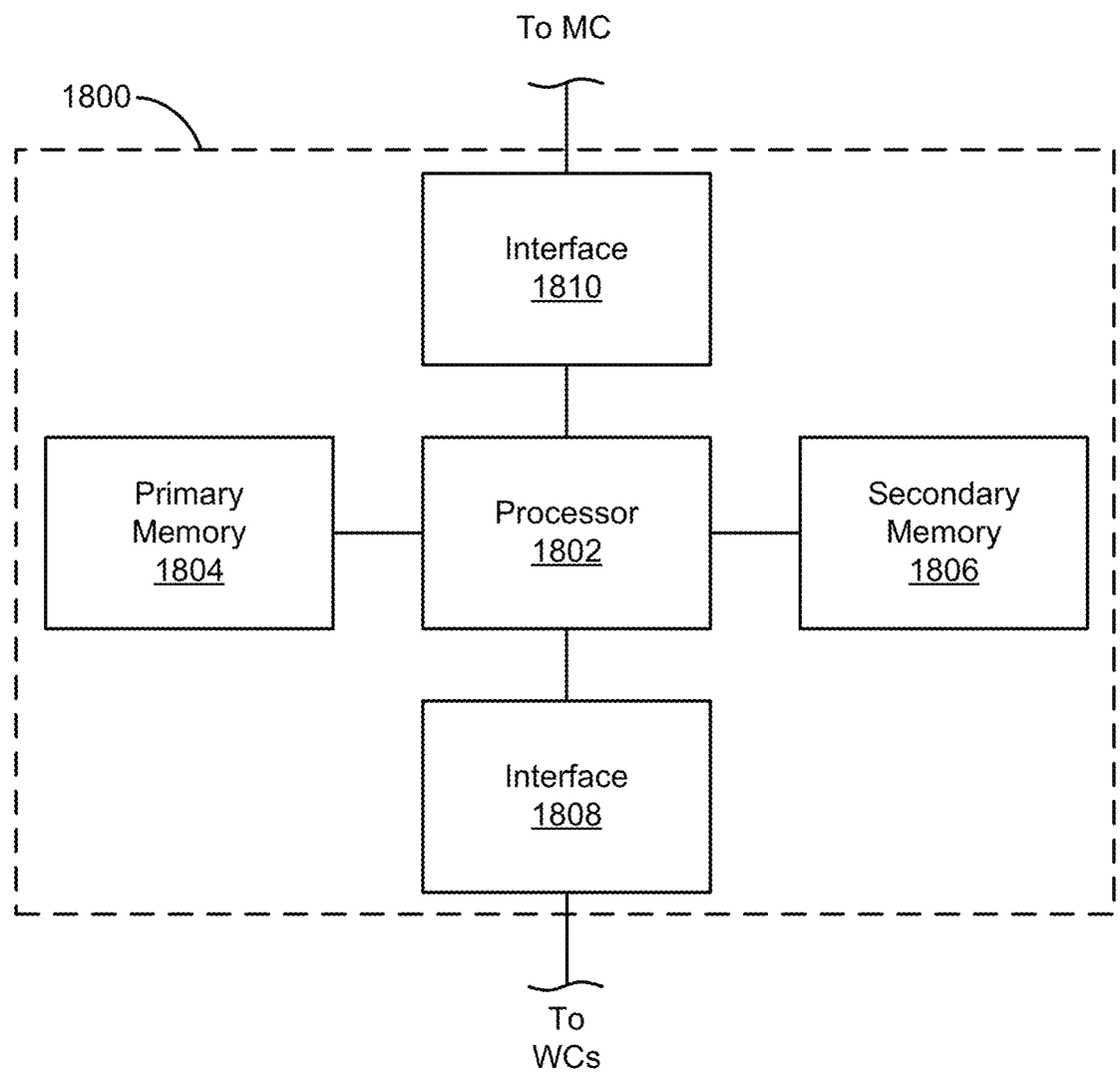
FIG. 18 shows a block diagram of an example network controller (NC) in accordance with some implementations.

FIG. 18 shows a block diagram of an example network controller (NC) 1800 in accordance with some implementations. For example, the NC 1800 of FIG. 18 can be used to implement the NC 1606 described above with reference to the network system 1600 of FIG. 16. As used herein, references to "the NC 1800" also encompass the NC 1606, and vice versa; in other words, the two references may be used interchangeably. The NC 1800 can be implemented in or as one or more network components, networking devices, computers, computing devices or computer systems (herein used interchangeably where appropriate unless otherwise indicated). Additionally, reference to "the NC 1800" collectively refers to any suitable combination of hardware, firmware and software for implementing the functions, operations, processes or capabilities described. For example, the NC 1800 can refer to a computer that implements a network controller application (also referred to herein as a "program" or a "task").

As shown in FIG. 18, the NC 1800 generally includes one or more processors 1802 (also collectively referred to hereinafter as "the processor 1802"). In some implementations, the processor 1802 can be implemented as a microcontroller or as one or more logic devices including one or more application-specific integrated circuits (ASICs) or programmable logic devices (PLDs), such as field-programmable gate arrays (FPGAs) or complex programmable logic devices (CPLDs). If implemented in a PLD, the processor can be programmed into the PLD as an intellectual property (IP) block or permanently formed in the PLD as an embedded processor core. In some other implementations, the processor 1802 can be or can include a central processing unit (CPU), such as a single core or a multi-core processor. The processor 1802 is coupled with a primary memory 1804, a secondary memory 1806, a downstream network interface 1808 and an upstream network interface 1810. In some implementations, the primary memory 1804 can be integrated with the processor 1802, for example, as a system-on-chip (SOC) package, or in an embedded memory within a PLD itself. In some other implementations, the NC 1800 alternatively or additionally can include one or more high-speed memory devices such as, for example, one or more RAM devices.

The secondary memory 1806 can include one or more solid-state drives (SSDs) storing one or more lookup tables or arrays of values. In some implementations, the secondary memory 1806 can store a lookup table that maps first protocol IDs (for example, BACnet IDs) received from the MC 1700 to second protocol IDs (for example, CAN IDs) each identifying a respective one of the WCs 1604, and vice versa. In some implementations, the secondary memory 1806 can additionally or alternatively store one or more arrays or tables. In some implementations, such arrays or tables can be stored as comma-separated values (CSV) files or via another table-structured file format. For example, each row of the file can be identified by a timestamp corresponding to a transaction with a WC 1604. Each row can include a tint value (C) for the IGUs 1602 controlled by the WC 1604 (for example, as set by the MC 1700 in the primary tint command); a status value (S) for the IGUs 1602 controlled by the WC 1604; a set point voltage (for example, the effective applied voltage $V_{Eff}$) an actual voltage level $V_{Act}$ measured, detected or otherwise determined across the ECDs within the IGUs 1602; an actual current level $I_{Act}$ measured, detected or otherwise determined through the ECDs within the IGUs 1602; and various sensor data. In some implementations, each row of the CSV file can include such status information for each and all of the WCs 1604 controlled by the NC 1800. In some such implementations, each row also includes the CAN IDs or other IDs associated with each of the respective WC 1604.

In some implementations in which the NC 1800 is implemented in a computer that executes a network controller application, the secondary memory 1806 also can store processor-executable code (or "programming instructions") for implementing a multi-tasking operating system such as, for example, an operating system based on a Linux® kernel. In some other implementations, the operating system can be a UNIX®- or Unix-like-based operating system, a Microsoft Windows®-based operating system, or another suitable operating system. The memory 1806 also can store code executable by the processor 1802 to implement the network controller application described above, as well as code for implementing other applications or programs.

In various implementations, the downstream network interface 1808 enables the NC 1800 to communicate with distributed WCs 1604, and in some implementations, also with various sensors. In the context of the network system 1600 of FIG. 16, the NC 1800 can implement the NC 1606 and the downstream network interface 1808 can enable communication with the WCs 1604 over the link 1614. The downstream network interface 1808 can collectively refer to one or more wired network interfaces or one or more wireless network interfaces (including one or more radio transceivers). In some implementations, the downstream interface 1808 can include a CANbus interface enabling the NC 1800 to distribute commands, requests or other instructions to various WCs 1604, and to receive responses including status information from the WCs 1604, according to a CANBus protocol (for example, via the CANopen communication protocol). In some implementations, a single CANbus interface can enable communication between the NC 1800 and tens, hundreds or thousands of WCs 1604. Additionally or alternatively, the downstream interface 1808 can include one or more Universal Serial Bus (USB) interfaces (or "ports"). In some such implementations, to enable communication via a CANbus communication protocol, a USB-to-CAN adapter can be used to couple the USB port of the downstream interface 1808 with CANbus-compatible cables. In some such implementations, to enable the NC 1800 to control even more WCs 1604, a USB hub (for example, having 2, 3, 4, 5, 10 or more hub ports) can be plugged into the USB port of the downstream interface 508. A USB-to-CAN adapter can then be plugged into each hub port of the USB hub.

The upstream network interface 1810 enables the NC 1800 to communicate with the MC 1700, and in some implementations, also with various other computers, servers or databases (including the database 1620). The upstream network interface 1810 also can collectively refer to one or more wired network interfaces or one or more wireless network interfaces (including one or more radio transceivers). In the context of the network system 1600 of FIG. 16, the upstream network interface 1810 can enable communication with the MC 1608 over the link 1618. In some implementations, the upstream network interface 1810 also can be coupled to communicate with applications, including third party applications and cloud-based applications, over the outward-facing network 1610. For example, in implementations in which the NC 1800 is implemented as a network controller application executing as a task within a computer, the network controller application can communicate directly with the outward-facing network 1610 via the operating system and the upstream network interface 1810.

In some implementations the NC 1800 functions as a server collecting and storing status data, sensor data or other data acquired from the WCs 1604 or the multi-sensor device 100, and publishing this acquired data such that it is accessible to the MC 1700. In some implementations, the NC 1800 also can publish this acquired data over the network 1610 directly; that is, without first passing the data to the MC 1700. The NC 1800 also functions in some respects similar to a router. For example, the NC 1800 can function as a BACnet to CANBus gateway, receiving communications transmitted from the MC 1700 according to the BACnet protocol, converting commands or messages from the BACnet protocol to a CANBus protocol (for example, the CANopen communication protocol), and distributing commands or other instructions to various WCs 1604 according to the CANBus protocol.

As described above with reference to FIG. 17, when the MC 1700 determines to tint one or more IGUs 1602, the MC 1700 can write a specific tint value to the AV in the NC 1800 associated with the one or more respective WCs 1604 that control the target IGUs 1602. In some implementations, to do so, the MC 1700 generates a primary tint command communication including a BACnet ID associated with the WCs 1604 that control the target IGUs 1602. The primary tint command also can include a tint value for the target IGUs 1602. The MC 1700 can direct the transmission of the primary tint command to the NC 1800 using a network address such as, for example, an IP address or a MAC address. Responsive to receiving such a primary tint command from the MC 1700 through the upstream interface 1810, the NC 1800 can unpackage the communication, map the BACnet ID (or other first protocol ID) in the primary tint command to one or more CAN IDs (or other second protocol IDs), and write the tint value from the primary tint command to a first one of the respective AVs associated with each of the CAN IDs.

In some implementations, the NC 1800 then generates a secondary tint command for each of the WCs 1604 identified by the CAN IDs. Each secondary tint command can be addressed to a respective one of the WCs 1604 by way of the respective CAN ID. Each secondary tint command also can include the tint value extracted from the primary tint command. The NC 1800 transmits the secondary tint commands to the target WCs 1604 through the downstream interface 1808 via a second communication protocol (for example, via the CANOpen protocol). In some implementations, when a WC 1604 receives such a secondary tint command, the WC 1604 transmits a status value back to the NC 1800 indicating a status of the WC 1604. For example, the tint status value can represent a "tinting status" or "transition status" indicating that the WC is in the process of tinting the target IGUs 1602, an "active" or "completed" status indicating that the target IGUs 1602 are at the target tint state or that the transition has been finished, or an "error status" indicating an error. After the status value has been stored in the NC 1800, the NC 1800 can publish the status information or otherwise make the status information accessible to the MC 1700 or to various other authorized computers or applications. In some other implementations, the MC 1700 can request status information for a particular WC 1604 from the NC 1800 based on intelligence, a scheduling policy, or a user override. For example, the intelligence can be within the MC 1700 or within a BMS. A scheduling policy can be stored in the MC 1700, another storage location within the network system 1600, or within a cloud-based system.

Example Window Controller

Figure 19:
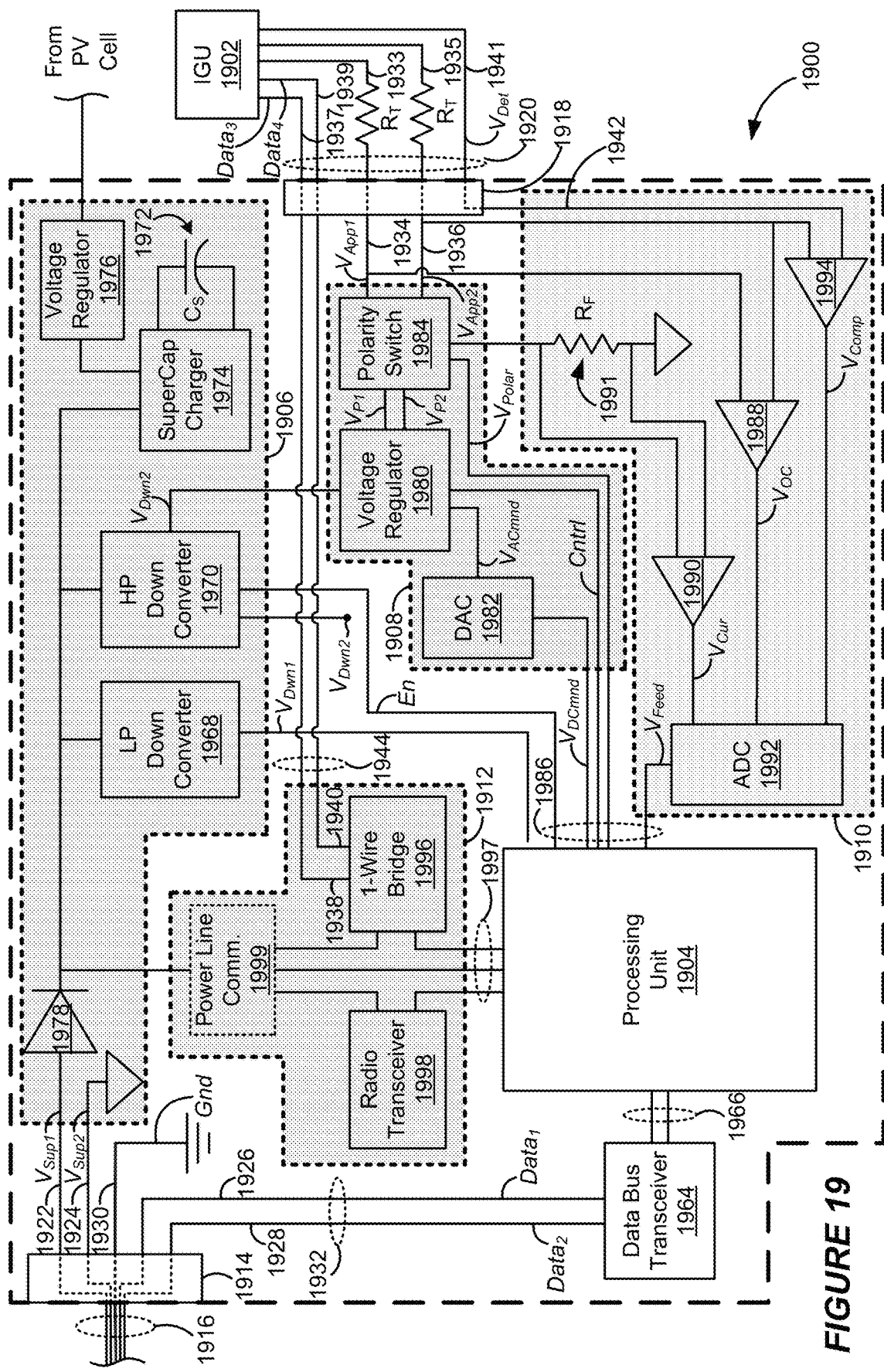
FIG. 19 shows a circuit schematic diagram of an example window controller (WC) in accordance with some implementations.

FIG. 19 shows a circuit schematic diagram of an example window controller (WC) 1900 in accordance with some implementations. For example, the WC 1900 of FIG. 19 can be used to implement each one of the WCs 1604 described above with reference to the network system 1600 of FIG. 16. As used herein, references to "the WC 1900" also encompass the WC 1604, and vice versa; in other words, the two references may be used interchangeably. As described above, the WC 1900 is generally operable and adapted to drive optical state transitions in, or to maintain the optical states of, one or more coupled optically-switchable devices such as the ECDs 1410 described above with reference to FIG. 14. In some implementations, the one or more ECDs coupled with the WC 1900 are configured within respective IGUs 1902 (such as the IGU 1400 described above with reference to FIG. 14). The WC 1900 also is operable to communicate with the coupled IGUs 1902, for example, to read data from or to transfer data to the IGUs 1902.

The WC 1900 broadly includes a processing unit 1904, a power circuit 1906, a drive circuit 1908 and a feedback circuit 1910 (each of which are delineated with a heavy dashed line and gray shading). In the illustrated implementation, the WC 1900 additionally includes a communications circuit 1912. Each of the driver circuit 1906, the power circuit 1906, the feedback circuit 1910 and the communications circuit 1912 can include a number of individual circuit components including integrated circuits (ICs). Each of the various components described in more detail below may be described as being "a part of" a respective one of the aforementioned circuits 1906, 1908, 1910 and 1912. However, the groupings of components into respective ones of the circuits 1906, 1908, 1910 and 1912 are in name only and for purposes of convenience in facilitating the disclosure of the described implementations. As such, the functions, capabilities and limitations of the various described components are not intended to be defined by the respective grouping; rather, the functions, abilities and limitations of each of the individual components are defined only by those of the components themselves, and by their integration with other components to which they are electrically connected or coupled.

In some implementations, the WC 1900 includes a first upstream interface (or set of interfaces) 1914 for coupling to an upstream set of cables 1916. For example, the upstream set of cables 1916 can implement the link 1614 described above with reference to the network system 1600 of FIG. 16. In some implementations, the upstream set of cables 1916 includes at least four lines: two power distribution lines and two communication lines. In some five-line implementations, the upstream set of cables 1916 additionally includes a system ground line, such as a building ground or Earth ground (for practical purposes an absolute ground from which all other voltages in the building can be measured). The upstream interface 1914 can include a corresponding number of pins (not shown)—one pin to couple each of the lines in the upstream set of cables 1916 into the WC 1900. For example, a first one of the pins can couple a first one of the power distribution lines from the upstream set of cables 1916 to a first power supply line 1922 within the WC 1900. A second one of the pins can couple a second one of the power distribution lines (for example, a power supply return) from the upstream set of cables 1916 to a second power supply line 1924 within the WC 1900. A third one of the pins can couple a first one of the communication lines from the upstream set of cables 1916 to a first communication line 1926 within the WC 1900. A fourth one of the pins can couple a second one of the communication lines from the upstream set of cables 1916 to a second communication line 1928 within the WC 1900. In implementations that include a system ground line, a fifth one of the pins can couple the system ground line from the upstream set of cables 1916 to a system ground line 1930 within the WC 1900.

The two power distribution lines in the upstream set of cables 1916 can be implemented as two separate cables or configured together as, for example, a twisted pair cable. A first one of the power lines carries a first supply voltage $V_{Sup1}$ and a second one of the power lines is a power supply return. In some implementations, the first supply voltage $V_{Sup1}$ is a DC voltage having a value in the range of approximately 5 Volts (V) to 42 V, and in one example application, a value of 24 V (although higher voltages may be desirable and are possible in other implementations). In some other implementations, the first supply voltage $V_{Sup1}$ can be pulsed voltage power signal. The second one of the power lines can be a power supply return, also referred to as a signal ground (or "common ground"). In other words, the voltage $V_{Sup2}$ on the second one of the power lines can be a reference voltage, for example, a floating ground. In such implementations, it is the voltage difference between the first supply voltage $V_{Sup1}$ and the second supply voltage $V_{Sup2}$ that is the voltage of interest, as opposed to the actual values of the individual voltages $V_{Sup1}$ and $V_{Sup2}$ relative to the system ground. For example, the value of the difference between $V_{Sup1}$ and $V_{Sup2}$ can be in the range of approximately 5 V to 42 V, and in one example application, 24 V. In implementations that include a system ground line, the system ground line can be implemented as a single cable or configured with the two power distribution lines described above as a 3-wire cable.

The two communication lines in the upstream set of cables 1916 also can be implemented as two separate cables or configured together as a twisted pair cable. In some other implementations, the two communication lines can be bundled with the two power distribution lines just described as a 4-wire cable, or bundled with the two power distribution lines and the system ground line as a 5-wire cable. As described above, pins or other interconnects within the upstream interface 1914 electrically connect the first and the second communication lines in the upstream set of cables 1916 with the first and the second communication lines 1926 and 1928 in the WC 1900. The first and the second communication lines 1926 and 1928, also referred to herein collectively as a communication bus 1932, can carry first and second data signals $Data_1$ and $Data_2$, respectively.

At different times or stages throughout a transition cycle or at other times, the data signals $Data_1$ and $Data_2$ can be communicating information to the WC 1900 from an upstream network controller (such as the NC 1606 or NC 400) or communicating information to the network controller from the WC 1900. As an example of a downstream communication, the data signals $Data_1$ and $Data_2$ can include a tint command or other instructions (for example, such as the secondary tint command described above) sent from a network controller to the WC 1900. As an example of an upstream communication, the data signals $Data_1$ and $Data_2$ can include status information (such as a current tint status) or sensor data to be sent to the network controller. In some implementations, the $Data_1$ and $Data_2$ signals are complementary signals, for example, forming a differential pair of signals (also referred to herein collectively as a differential signal).

In some implementations, the communication bus 1932 is designed, deployed and otherwise configured in accordance with the Controller Area Network (CAN) vehicle bus standard. In terms of the Open Systems Interconnection (OSI) model, the physical (PHY) layer can be implemented according to the ISO 11898-2 CAN standard, and the data link layer can be implemented according to the ISO 11898-1 CAN standard. In some such implementations, the first data signal $Data_1$ can refer to the high CAN signal (the "CANH signal" as it is typically referred to in the CAN protocol), while the second data signal $Data_2$ can refer to the low CAN signal (the "CANL signal"). In some implementations, the WC 1900 communicates with the upstream network controller over the communication bus 1932 (and the coupled communication lines in the upstream set of cables 1916) according to the CANopen communication protocol. In terms of the OSI model, the CANopen communication protocol implements the network layer and other layers above the network layer (for example, the transport layer, the session layer, the presentation layer and the application layer). According to the CAN protocol, it is the difference between the CANH and CANL signal values that determines the value of the bit being communicated by the differential pair.

In some implementations, the upstream set of cables 1916 is directly connected with the upstream network controller. In some other implementations, the upstream set of cables 1916 includes a set of droplines connected to (for example, tapped off of) a trunk line that contains corresponding power distribution and communication lines. In some such latter implementations, each of a plurality of WCs 1900 can be connected to the same trunk line via a corresponding set of droplines. In some such implementations, each of the plurality of WCs 1900 coupled to the same trunk line can be in communication with the same network controller via the communication lines within the trunk line. In some implementations, the power distribution lines that power the WCs 1900 also can be coupled to the same network controller to power the network controller. In some other implementations, a different set of power distribution lines can power the network controller. In either case, the power distribution lines that power the WCs 1900 can terminate at a power control panel or other power insertion point.

The WC 1900 also includes a second downstream interface (or set of interfaces) 1918 for coupling to a downstream set of cables 1920. For example, the downstream set of cables 1920 can implement the link 1612 described above with reference to the network system 1600 of FIG. 16. In some implementations, the downstream set of cables 1920 also includes at least four lines: two power distribution lines and two communication lines. The downstream interface 1918 also can include a corresponding number of pins (not shown)—one pin to couple each of the lines in the downstream set of cables 1920 into the WC 1900. For example, a first one of the pins can couple a first one of the power distribution lines 1933 from the downstream set of cables 1920 to a first power drive line 1934 within the WC 1900. A second one of the pins can couple a second one of the power distribution lines 1935 from the downstream set of cables 1920 to a second power drive line 1936 within the WC 1900. A third one of the pins can couple a first one of the communication lines 1937 from the downstream set of cables 1920 to a first communication line 1938 within the WC 1900. A fourth one of the pins can couple a second one of the communication lines 1939 from the downstream set of cables 1920 to a second communication line 1940 within the WC 1900. In implementations that include a fifth line, a fifth one of the pins can couple the fifth line 1941 from the downstream set of cables 1920 to a fifth line 1942 within the WC 1900.

The two power distribution lines 1933 and 1935 in the downstream set of cables 1920 can be implemented as two separate cables or configured together as, for example, a twisted pair cable. In some implementations, the first power distribution line 1933 carries a first applied voltage $V_{App1}$ and the second power distribution line 1935 carries a second applied voltage $V_{App2}$. In some implementations, the first and the second applied voltages $V_{App1}$ and $V_{App2}$ are, for all intents and purposes, DC voltage signals. In some other implementations, the first and the second applied voltages $V_{App1}$ and $V_{App2}$ can be pulsed voltage signals (for example, pulse-width modulated (PWM) signals). In some implementations, the first applied voltage $V_{App1}$ can have a value in the range of approximately 0 V to 10 V, and in some specific applications, in the range of approximately 0 V to 5 V. In some implementations, the second applied voltage $V_{App2}$ can have a value in the range of approximately 0 V to −10 V, and in some specific applications, in the range of approximately 0 V to −5 V. In some other implementations, the second power distribution line 1935 in the downstream set of cables 1920 can be a power supply return, also referred to as a signal ground or common ground. In other words, the voltage $V_{App2}$ on the second power distribution line can be a reference voltage, for example, a floating ground.

The first and the second power distribution lines 1933 and 1935 in the downstream set of cables 1920 are provided to each of the one or more IGUs 1902 controlled by the WC 1900. More specifically, the first and the second power distribution lines 1933 and 1935 are electrically connected to (or coupled with) the busbars and conductive layers that power the electrochromic states and state transitions of the respective ECDs (such as, for example, the first and second busbars 1426 and 1428 and the first and second TCO layers 1414 and 1416 in the IGU 1400 of FIG. 14). In some implementations, it is the voltage difference between the first applied voltage $V_{App1}$ and the second applied voltage $V_{App2}$ that is the voltage of interest, as opposed to the actual values of the individual voltages $V_{App1}$ and $V_{App2}$ relative to a system ground. For example, the value of the difference between $V_{App1}$ and $V_{App2}$—referred to herein as the "effective applied voltage" $V_{Eff}$ or simply as the applied voltage $V_{Eff}$—can be in the range of approximately −10 V to 10 V in some applications, and in some specific applications in the range of approximately −5 V to 5 V, depending on various device parameters and drive parameters.

The two communication lines 1937 and 1939 in the downstream set of cables 1920 also can be implemented as two separate cables or configured together as a twisted pair cable. In some other implementations, the two communication lines 1937 and 1939 can be bundled with the two power distribution lines 1933 and 1935 just described as a 4-wire cable, or bundled with the two power distribution lines and the fifth line as a 5-wire cable. As described above, pins or other interconnects within the downstream interface 1918 electrically connect the first and the second communication lines 1937 and 1939 in the downstream set of cables 1920 with the first and the second communication lines 1938 and 1940 within the WC 1900. The first and the second communication lines 1938 and 1940, also referred to herein collectively as a communication bus 1944, can carry data signals Data$_3$ and Data$_4$, respectively.

At different times or stages throughout a transition cycle or at other times, the data signals Data$_3$ and Data$_4$ can be communicating information to one or more connected IGUs 1902 from the WC 1900 or communicating information to the WC 1900 from one or more of the IGUs 1902. As an example of a downstream communication, the data signals Data$_3$ and Data$_4$ can include a status request command or other instructions to be sent to one or more of the IGUs 1902. As an example of an upstream communication, the data signals Data$_3$ and Data$_4$ can include status information (such as a current tint status) or sensor data sent from one or more of the IGUs 1902 to the WC 1900. In some implementations, the communication bus 1944 is designed, deployed and otherwise configured in accordance with the 1-Wire device communications bus system protocol. In such 1-Wire implementations, the communication line 1938 is a data line and the data signal Data$_3$ conveys the data to be communicated, while the communication line 1940 is a signal ground line and the data signal Data$_4$ provides a reference voltage, such as a signal ground, relative to which the data signal Data$_3$ is measured or compared to recover the data of interest.

In some implementations, responsive to receiving a tint command, the processing unit 1904 initiates a tinting transition in one or more of the IGUs 1902 controlled by the WC 1900. In some implementations, the processing unit 1904 calculates, selects, determines or otherwise generates the command signal $V_{DCmnd}$ based on drive parameters including the current tint state of an IGU 1902 to be transitioned and the target tint state of the IGU 1902 (based on the tint value in the tint command). The processing unit 1904 also can generate the command signal $V_{DCmnd}$ based on other drive parameters, for example, a ramp-to-drive rate, a drive voltage, a drive voltage duration, a ramp-to-hold rate and a holding voltage for each possible combination of current tint state and target tint state. Other drive parameters can include parameters based on current or recent sensor data, for example, an indoor temperature, an outdoor temperature, a temperature within the interior volume of the IGU 1902 (or of one or more of the panes), a light intensity in a room adjacent the IGU 1902 and a light intensity outside of the IGU 1902, among other suitable or desirable parameters. In some implementations, such sensor data can be provided to the WC 1900 via the upstream network controller over communication lines 1926 and 1928. Additionally or alternatively, the sensor data can be received from sensors located within or on various portions of the IGU 1902. In some such implementations, the sensors can be within or otherwise coupled with a communication module within the IGU 1902 (such as the communication module 756). For example, multiple sensors including photosensors, temperature sensors or transmissivity sensors can be coupled via the same communication lines 739 and 741 shown in FIG. 7 according to the 1-Wire communication protocol.

In some implementations, the processing unit 1904 generates the command signal $V_{DCmnd}$ based on a voltage control profile, for example, such as that described above with reference to FIG. 15. For example, the processing unit 1904 can use the drive parameters and device parameters to select a voltage control profile from a predefined set of voltage control profiles stored in a memory within or accessible by the processing unit 1904. In some implementations, each set of voltage control profiles is defined for a particular set of device parameters. In some implementations, each voltage control profile in a given set of voltage control profiles is defined for a particular combination of drive parameters. The processing unit 1904 generates the command signal $V_{DCmnd}$ such that the drive circuit 1908 implements the selected voltage control profile. For example, the processing unit 1904 adjusts the command signal $V_{DCmnd}$ to cause the drive circuit 1908 to, in turn, adjust the applied voltage signals $V_{App1}$ and $V_{App2}$. More specifically, the drive circuit 1908 adjusts the applied voltage signals $V_{App1}$ and $V_{App2}$ such that the effective voltage $V_{Eff}$ applied across the ECD tracks the voltage levels indicated by the voltage control profile throughout the progression through the profile.

In some implementations, the processing unit 1904 also can modify the command signal $V_{DCmnd}$ dynamically (whether during a transition or during a holding period after a transition) based on sensor data. As described above, such sensor data can be received from various sensors within or otherwise integrated with the connected IGUs 1902 or from other external sensors. In some such implementations, the processing unit 1904 can include intelligence (for example, in the form of programming instructions including rules or algorithms), that enable the processing unit 1904 to determine how to modify the command signal $V_{DCmnd}$ based on the sensor data. In some other implementations, the sensor data received by the WC 1900 from such sensors can be communicated to the network controller, and in some instances from the network controller to the master controller. In such implementations, the network controller or the master controller can revise the tint value for the IGUs 1902 based on the sensor data and transmit a revised tint command to the WC 1900. Additionally or alternatively, the network controller or the master controller can receive sensor data from one or more other sensors external to the building, for example, one or more light sensors positioned on a roof top or a facade of the building. In some such implementations, the master controller or the network controller can generate or revise the tint value based on such sensor data.

Generally, the processing unit 1904 can be implemented with any suitable processor or logic device, including combinations of such devices, capable of performing the functions or processes described herein. In some implementations, the processing unit 1904 is a microcontroller (also referred to as a microcontroller unit (MCU)). In some more specific applications, the processing unit 1904 can be a microcontroller particularly designed for embedded applications. In some implementations, the processing unit 1904 includes a processor core (for example, a 200 MHz processor core or other suitable processor core) as well as a program memory (for example, a 2018 KB or other suitable non-volatile memory), a random-access memory (RAM) (for example, a 512 KB or other suitable RAM), and various I/O interfaces. The program memory can include, for example, code executable by the processor core to implement the functions, operations or processes of the processing unit 1904.

In some implementations, the RAM can store status information for the IGUs 1902 controlled by the WC 1900. The RAM also can store the device parameters for the ECDs within the IGUs 1902. In some other implementations, the processing unit 1904 can store such status information or device parameters in another memory device (for example, a Flash memory device) external to the processing unit 1904 but also within the WC 1900. In some specific implementations, the I/O interfaces of the processing unit 1904 include one or more CAN interfaces, one or more synchronous serial interfaces (for example, 4-wire Serial Peripheral Interface (SPI) interfaces), and one or more Inter-Integrated Circuit (I²C) interfaces. One example of such a controller suitable for use in some implementations is the PIC32MZ2048ECH064 controller provided by Microchip Technology Inc. of Chandler, Ariz.

In the implementation illustrated in FIG. 19, the WC 1900 additionally includes a data bus transceiver 1964. The data bus transceiver 1964 is coupled with the upstream interface 1914 via the communication bus 1932. The data bus transceiver 1964 also is coupled with the processing unit 1904 via a communication bus 1966. As described above, in some implementations, the communication bus 1932 is designed, deployed and otherwise configured in accordance with the CAN bus standard, which is a differential bus standard. In some implementations, the communication bus 1966 also conforms to the CAN bus standard and includes a differential pair of lines for transferring a differential pair of signals. As such, the data bus transceiver 1964 can include two sets of differential ports; a first set for coupling with the communication bus 1932 and a second set for coupling with the communication bus 1966, which in turn is coupled with a CAN interface of the processing unit 1904.

In various implementations, the data bus transceiver 1928 is configured to receive data from a network controller (such as the NC 1800) via the communication bus 1932, process the data, and transmit the processed data to the processing unit 1904 via the communication bus 1966. Similarly, the data bus transceiver 1964 is configured to receive data from the processing unit 1904 via the communication bus 1966, process the data, and transmit the processed data over the communication bus 1932 to the interface 1914 and ultimately over the upstream set of cables 1916 to the network controller. In some such implementations, processing the data includes converting or translating the data from a first protocol to a second protocol (for example, from a CAN protocol (such as CANopen) to a protocol readable by the processing unit 1904 and vice versa). One example of such a data bus transceiver suitable for use in some implementations is the SN65HVD1050 data bus transceiver provided by Texas Instruments Inc. of Dallas, Tex. In some other implementations, the processing unit 1904 can include an integrated data bus transceiver or otherwise include functionalities of the data bus transceiver 1964 rendering the inclusion of the external data bus transceiver 1964 unnecessary.

Power Circuit

At a high level, the power circuit 1906 is operable to receive power from the power supply lines 1922 and 1924 and to provide power to various components of the WC 1900 including the processing unit 1904, the drive circuit 1908, the feedback circuit 1910 and the communications circuit 1912. As described above, the first power supply line 1922 receives a supply voltage $V_{Sup1}$, for example, a DC voltage having a value in the range of approximately 5 V to 42 V (relative to the supply voltage $V_{Sup2}$), and in one example application, a value of 24 V (although higher voltages may be desirable and are possible in other implementations). As is also described above, the second power supply line 1924 can be a power supply return. For example, the voltage $V_{Sup2}$ on the second power supply line 1924 can be a reference voltage, for example, a floating ground.

The power circuit 1906 includes at least one down converter (also referred to herein as a "buck converter") for stepping down the supply voltage $V_{Sup1}$. In the illustrated implementation, the power circuit 1906 includes two down converters: a first relatively low power (LP) down converter 1968 and a second relatively high power (HP) down converter 1970. The LP down converter 1968 functions to step down the supply voltage $V_{Sup1}$ to a first down-converted voltage $V_{Dwn1}$. In some implementations, the down-converted voltage $V_{Dwn1}$ can have a value in the range of approximately 0 to 5 V, and in one example application, a value of approximately 3.3 V. The down-converted voltage $V_{Dwn1}$ is provided to the processing unit 1904 for powering the processing unit 1904. One example of an LP down converter suitable for use in some implementations is the TPS54240 2.5 Ampere (Amp) DC-DC step-down converter provided by Texas Instruments Inc. of Dallas, Tex.

The HP down converter 1970 functions to step down the supply voltage $V_{Sup1}$ to a second down-converted voltage $V_{Dwn2}$. One example of an HP down converter suitable for use in some implementations is the TPS54561 5 Amp DC-DC step-down converter provided by Texas Instruments Inc. of Dallas, Tex. In some implementations, the down-converted voltage $V_{Dwn2}$ can have a value in the range of approximately 0 V to 6 V, and in one example application, a value of approximately 3.3 V. The down-converted voltage $V_{Dwn2}$ is provided to the voltage regulator 1980, described below with reference to the drive circuit 1908. In some implementations, the down-converted voltage $V_{Dwn2}$ also is provided to the rest of the components within the WC 1900 that require power to perform their respective functions (although these connections are not shown in order to avoid over complicating the illustration and to avoid obscuring the other components and connections).

In some implementations, the HP down converter 1970 provides the down-converted voltage $V_{Dwn2}$ only when enabled (or instructed) to do so, for example, when or while the processing unit 1904 asserts an enable signal En. In some implementations, the enable signal En is provided to the HP down converter 1970 via a Serial Peripheral Interface (SPI) interface bus 1986. Although the SPI interface bus 1986 may be described herein in the singular form, the SPI bus 1986 may collectively refer to two or more SPI buses, each of which can be used to communicate with a respective component of the WC 1900. In some implementations, the processing unit asserts the enable signal En only when the WC 1900 is in an "active mode," as opposed to a "sleep mode."

In some implementations, the power circuit 1906 further includes or is coupled with an energy storage device (or "energy well") 1972 such as, for example, a capacitive storage device such as a rechargeable battery (or set of batteries) or a supercapacitor. For example, one example of a supercapacitor suitable for use in some implementations can have a capacitance $C_S$ of at least 400 Farads at 0.4 watt hours (Wh). In some implementations, the energy storage device 1972 can be charged by a charger 1974. In some such implementations, the charger 1974 can be powered by the supply voltage $V_{Sup1}$. One example of such a charger suitable for use in some implementations is the LT3741 constant-current, constant-voltage, step-down controller provided by Linear Technology Corp. of Milpitas, Calif. In some implementations, the charger 1974 also is configured to provide power stored in the energy storage device 1972 to the power supply line 1922.

In some implementations, the charger 1974 can alternatively or additionally be powered by one or more photovoltaic (or "solar") cells. For example, such photovoltaic (PV) cells can be integrated onto or into the IGUs 1902, such as on one or more panes of the IGUs, controlled by the WC 1900. In some such implementations, the power received via the PV cell can be regulated by a voltage regulator 1976 prior to being provided to the charger 1974 and ultimately the energy storage device 1972. For example, the voltage regulator 1976 can serve to step up or step down the voltage of the power received from the PV cells. The voltage regulator 1976 also can be used to regulate the power provided by the PV cells as such power fluctuates throughout a day. In some implementations, to prevent back drive (that is, to ensure that power from the energy storage device 1972 or the PV cells does not flow upstream over the upstream set of cables 1916), the power circuit 1906 can additionally include an asymmetric conductor 1978, for example, a low loss semiconductor diode such as a Schottky junction diode or a p-n junction diode. The use of such a diode 1978 can be especially advantageous in implementations in which one or more of the supply voltages $V_{Sup1}$ and $V_{Sup2}$ are pulsed. More examples of the use of integrated PV cells are described in U.S. Provisional Patent Application Ser. No. 62/085,179 filed 26 Nov. 2014 and titled SELF-CONTAINED EC IGU, which is hereby incorporated by reference herein in its entirety.

The integration of energy storage devices can be advantageous for a number of reasons, whether such devices are included within respective WCs 1900 (like the energy storage device 1972) or are otherwise distributed throughout a network system (such as the network system 1600). For example, the power circuit 1906 within each WC 1900 can supplement or augment the power provided by the respective power supply lines 1922 and 1924 with power drawn from the energy storage device 1972. Additionally or alternatively, energy storage devices external to the WCs 1900 can provide power directly to the power distribution lines that distribute power throughout the network system to supply the WCs 1900. Such implementations can be especially advantageous in high demand instances in which many IGUs 1902 are to be transitioned concurrently. In times of lower demand, the normal power supply (for example, the power supply provided by a building source) can recharge the energy storage devices. More examples of the use of energy storage devices are described in U.S. Provisional Patent Application Ser. No. 62/085,179 filed 26 Nov. 2014 and titled SELF-CONTAINED EC IGU; U.S. Provisional Patent Application Ser. No. 62/190,012 filed 8 Jul. 2015 and titled POWER MANAGEMENT FOR ELECTROCHROMIC WINDOW NETWORKS; and U.S. Provisional Patent Application Ser. No. 62/191,975 filed 13 Jul. 2015 and titled POWER MANAGEMENT FOR ELECTROCHROMIC WINDOW NETWORKS, all of which are incorporated by reference herein in their entireties.

Drive Circuit

At a high level, the drive circuit 1908 is generally operable to receive the command signal $V_{DCmnd}$ from the processing unit 1904 and to provide the applied voltage signals $V_{App1}$ and $V_{App2}$ for driving the connected IGUs 1902 based on the command signal $V_{DCmnd}$. The drive circuit 1908 includes a voltage regulator 1980 that receives the down-converted voltage $V_{Dwn2}$ from the HP down converter 1970 in the power circuit 1906. The voltage regulator 1980 regulates, adjusts or otherwise transforms the voltage $V_{Dwn2}$ to provide (or "generate") first and second regulated voltage signals $V_{P1}$ and $V_{P2}$ based on the command signal $V_{DCmnd}$. In some implementations, the voltage regulator 1980 is a buck-boost converter; that is, the voltage regulator 1980 can be capable of functioning as a down converter to step down the voltage $V_{Dwn2}$ as well as as an up converter to step up the input voltage $V_{Dwn2}$. Whether the voltage regulator 1980 behaves as a down converter or as an up converter is dependent on the command signal $V_{DCmnd}$, as is the magnitude of the down conversion or up conversion, respectively. In some more specific implementations, the voltage regulator 1980 is a synchronous buck-boost DC-DC converter. In some such implementations, the regulated voltage signals $V_{P1}$ and $V_{P2}$ are effectively fixed-amplitude DC signals from the perspective of the IGUs 1902, and in particular, the ECDs within the IGUs 1902.

As described in more detail above, the processing unit 1904 can generate the command signal $V_{DCmnd}$ based on a number of different parameters, input values, algorithms or instructions. In some implementations, the processing unit 1904 generates the command signal $V_{DCmnd}$ in the form of a digital voltage signal. In some such implementations, the drive circuit 1908 additionally includes a digital-to-analog converter (DAC) 682 for converting the digital command signal $V_{DCmnd}$ to an analog command voltage signal $V_{ACmnd}$. In such implementations, the voltage regulator 1980 more specifically generates the regulated voltage signals $V_{P1}$ and $V_{P2}$ based on the command voltage signal $V_{ACmnd}$. One example of a DAC suitable for use in some implementations is the AD5683R DAC by Analog Devices Inc. of Norwood, Mass.

In some specific implementations, the regulated voltage signals $V_{P1}$ and $V_{P2}$ are rectangular wave (or "pulsed") DC signals, for example, pulse-width modulated (PWM) voltage signals. In some such implementations, the voltage regulator 1980 includes an H-bridge circuit to generate the regulated voltage signals $V_{P1}$ and $V_{P2}$. In some such implementations, each of the regulated voltage signals $V_{P1}$ and $V_{P2}$ has the same frequency. In other words, the period from the start of a current pulse to the start of the next pulse in each of the regulated voltage signals $V_{P1}$ and $V_{P2}$ has the same time duration. In some implementations, the voltage regulator 1980 is operable to modify the duty cycles of the respective voltage signals $V_{P1}$ and $V_{P2}$ such that the respective duty cycles are not equal. In this way, while the amplitude (or "magnitude") of the pulses (or "on" durations) of the first regulated voltage signal $V_{P1}$ can be equal to the magnitude of the pulses of the second regulated voltage signal $V_{P2}$, each of the first and the second regulated voltage signals $V_{P1}$ and $V_{P2}$ can have a different effective DC voltage magnitude from the perspective of the corresponding busbars and conducting layers of the ECDs in the IGUs 1902. However, in some other implementations, the voltage regulator 1980 can additionally or alternatively modify the respective magnitudes of the pulses of the voltage signals $V_{P1}$ and $V_{P2}$.

For example, consider an application in which each of the pulses of each of the regulated voltage signals $V_{P1}$ and $V_{P2}$ has an amplitude of 5 V, but in which the first voltage signal $V_{P1}$ has a 60% duty cycle while the second voltage signal $V_{P2}$ has a 40% duty cycle. In such an application, the effective DC voltage provided by each of the regulated voltage signals $V_{P1}$ and $V_{P2}$ can be approximated as the product of the respective pulse amplitude and the fraction of the duty cycle occupied the respective pulses. For example, the effective DC voltage provided by the first voltage signal $V_{P1}$ can be approximated as 3 V (the product of 5 V and 0.6) while the effective voltage provided by the second voltage signal $V_{P2}$ can be approximated as 2 V (the product of 5 V and 0.4). In some implementations, the duty cycle of first voltage signal $V_{P1}$ is complementary to the duty cycle of the second voltage signal $V_{P2}$. For example, as in the case of the example just provided, if the first voltage signal $V_{P1}$ has a duty cycle of X %, the duty cycle of the second voltage signal $V_{P2}$ can be Y %, where Y %=100%–X %. In some such implementations, the "on" durations of the first voltage signal $V_{P1}$ can coincide with the "off" durations of the second voltage signal $V_{P2}$, and similarly, the "off" durations of the first voltage signal $V_{P1}$ can coincide with the "on" durations of the second voltage signal $V_{P2}$. In some other implementations, the duty cycles do not necessarily have to be complementary; for example, the first voltage signal $V_{P1}$ can have a duty cycle of 50% while the second voltage signal $V_{P2}$ can have a duty cycle of 15%.

As described above, in some implementations, the regulated voltage signals $V_{P1}$ and $V_{P2}$ are effectively fixed-amplitude DC signals from the perspective of the IGUs 1902, and in particular, the ECDs within the IGUs 1902. To further such implementations, the voltage regulator 1980 also can include one or more electronic filters, and in particular, one or more passive filter components such as one or more inductors. Such filters or filter components can smooth out the regulated voltage signals $V_{P1}$ and $V_{P2}$ prior to their provision to ensure that the regulated voltage signals $V_{P1}$ and $V_{P2}$ are effectively fixed-amplitude DC signals. To further facilitate the smoothing of the regulated voltage signals $V_{P1}$ and $V_{P2}$, the frequency of the pulses in the voltage signals $V_{P1}$ and $V_{P2}$ can be greater than or equal to a suitably high frequency (for example, tens, hundreds or thousands of kilohertz (kHz)) in some implementations. For example, as one of ordinary skill in the art will appreciate, the greater the frequency of the voltage oscillations applied to a conductor, the less able the electric charge in the conductor is able to react to the voltage oscillations. Additionally, the greater the inductance of an inductor, the more smoothing out of the voltage oscillations that are provided through the inductor.

In some implementations, the voltage regulator 1980 can advantageously be capable of operating in a burst mode to reduce the power consumption of the WC 1900 over time. In the burst mode of operation, the voltage regulator 1980 automatically enters and exits the burst mode to minimize the power consumption of the voltage regulator 1980. One example of such a voltage regulator suitable for use in some implementations is the LTC3112 15 V, 2.5 Amp Synchronous Buck-Boost DC/DC Converter provided by Linear Technology Corp. of Milpitas, Calif.

In some implementations, the regulated voltage signals $V_{P1}$ and $V_{P2}$ are the applied voltage signals $V_{App1}$ and $V_{App2}$, respectively. In some such implementations, the difference between the regulated voltage signals $V_{P1}$ and $V_{P2}$ is the effective voltage $V_{Eff}$. In some implementations, to effect a lightening tinting transition, the processing unit 1904 generates the command signal $V_{DCmnd}$ such that the voltage regulator 1980 provides a positive effective voltage $V_{Eff}$, while to effect a darkening tinting transition, the processing unit 1904 generates the command signal $V_{DCmnd}$ such that the voltage regulator 1980 provides a negative effective voltage $V_{Eff}$. Conversely, in some other implementations involving different electrochromic layers or counter electrode layers, a darkening tinting transition is achieved by providing a positive effective voltage $V_{Eff}$ while a lightening tinting transition is achieved by providing a negative effective voltage $V_{Eff}$.

Either way, the voltage regulator 1980 can provide a positive effective voltage $V_{Eff}$ by increasing the duty cycle of the first voltage signal $V_{P1}$ or by decreasing the duty cycle of the second voltage signal $V_{P2}$ such that the duty cycle of the first voltage signal $V_{P1}$ is greater than the duty cycle of the second voltage signal $V_{P2}$, and consequently, the effective DC voltage of the first applied voltage signal $V_{App1}$ is greater than the effective DC voltage of the second applied voltage signal $V_{App2}$. Similarly, the voltage regulator 1980 can provide a negative effective voltage $V_{Eff}$ by decreasing the duty cycle of the first voltage signal $V_{P1}$ or by increasing the duty cycle of the second voltage signal $V_{P2}$ such that the duty cycle of the first voltage signal $V_{P1}$ is less than the duty cycle of the second voltage signal $V_{P2}$, and consequently, the effective DC voltage of the first applied voltage signal $V_{App1}$ is less than the effective DC voltage of the second applied voltage signal $V_{App2}$.

In some other implementations, including that illustrated in FIG. 6, the drive circuit 1908 additionally includes a polarity switch 1984. The polarity switch 1984 receives the two regulated voltage signals $V_{P1}$ and $V_{P2}$ from the voltage regulator 1980 and outputs the applied voltage signals $V_{App1}$ and $V_{App2}$ that are provided to the power lines 1934 and 1936, respectively. The polarity switch 1984 can be used to switch the polarity of the effective voltage $V_{Eff}$ from positive to negative, and vice versa. Again, in some implementations, the voltage regulator 1980 can increase the magnitude of $V_{P1}$ relative to $V_{P2}$, and thus increase the magnitude of $V_{Eff}$, by increasing the duty cycle of the first voltage signal $V_{P1}$ or by decreasing the duty cycle of the second voltage signal $V_{P2}$. Similarly, the voltage regulator 1980 can decrease the magnitude of $V_{P1}$ relative to $V_{P2}$, and thus decrease the magnitude of $V_{Eff}$, by decreasing the duty cycle of the first voltage signal $V_{P1}$ or by increasing the duty cycle of the second voltage signal $V_{P2}$.

In some other implementations, the second voltage $V_{P2}$ can be a signal ground. In such implementations, the second voltage $V_{P2}$ can remain fixed or floating during transitions as well as during times between transitions. In such implementations, the voltage regulator 1980 can increase or decrease the magnitude of $V_{P1}$, and thus the magnitude of $V_{Eff}$, by increasing or decreasing the duty cycle of the first voltage signal $V_{P1}$. In some other such implementations, the voltage regulator 1980 can increase or decrease the magnitude of $V_{P1}$, and thus the magnitude of $V_{Eff}$, by directly increasing or decreasing the amplitude of the first voltage signal $V_{P1}$ with or without also adjusting the duty cycle of the first voltage signal $V_{P1}$. Indeed, in such latter implementations, the first voltage signal $V_{P1}$ can be an actual fixed DC signal rather than a pulsed signal.

In implementations that include a polarity switch 1984, the second voltage signal $V_{P2}$ can be a signal ground and the first voltage signal $V_{P1}$ can always be a positive voltage relative to the second voltage signal $V_{P2}$. In such implementations, the polarity switch 1984 can include two configurations (for example, two electrical configurations or two mechanical configurations). The processing unit 1904 can control which of the configurations the polarity switch 1984 is in via a control signal $V_{Polar}$ provided, for example, over the SPI bus 1986. For example, the processing unit 1904 can select the first configuration when implementing a lightening transition and the second configuration when implementing a darkening transition. For example, while the polarity switch 1984 is in the first configuration, the polarity switch can output a positive first applied voltage signal $V_{App1}$ relative to the second applied voltage signal $V_{App2}$. Conversely, while the polarity switch 1984 is in the second configuration, the polarity switch can output a negative first applied voltage signal $V_{App1}$ relative to the second applied voltage signal $V_{App2}$.

In some implementations, while in the first configuration, the polarity switch 1984 passes the first voltage signal $V_{P1}$ (or a buffered version thereof) as the first applied voltage signal $V_{App1}$ and passes the second voltage signal $V_{P2}$ (or a grounded version thereof) as the second applied voltage signal $V_{App2}$, resulting in a positive effective voltage $V_{Eff}$. In some implementations, while in the second configuration, the polarity switch 1984 passes the first voltage signal $V_{P1}$ (or a buffered version thereof) as the second applied voltage signal $V_{App2}$ and passes the second voltage signal $V_{P2}$ (or a grounded version thereof) as the first applied voltage signal $V_{App2}$, resulting in a negative effective voltage $V_{Eff}$. In some implementations, the polarity switch 1984 can include an H-bridge circuit. Depending on the value of $V_{Polar}$, the H-bridge circuit can function in the first configuration or the second configuration. One example of a polarity switch suitable for use in some implementations is the IRF7301 HEXFET Power MOSFET provided by International Rectifier Corp. of San Jose, Calif.

In some implementations, when switching from a positive voltage $V_{Eff}$ to a negative voltage $V_{Eff}$, or vice versa, the polarity switch 1984 can be configured to switch from a first conducting mode, to a high impedance mode and then to a second conducting mode, or vice versa. For didactic purposes, consider an example in which the first regulated voltage $V_{P1}$ is at a positive hold value and in which the polarity switch 1984 is in the first configuration. As described above, in some implementations the polarity switch 1984 passes $V_{P1}$ (or a buffered version thereof) as the first applied voltage $V_{App1}$ resulting in a first applied voltage $V_{App1}$ that also is at the positive hold value. To simplify the illustration, also assume that $V_{P2}$ and $V_{App2}$ are both signal grounds. The result would be an effective applied voltage $V_{Eff}$ at the positive hold value. Now consider that the processing unit 1904 is initiating a tinting transition that will result in an end state in which the effective applied voltage $V_{Eff}$ is at a negative hold value. In some implementations, to effect the tinting transition, the processing unit 1904 adjusts the command signal $V_{DCmnd}$ to cause the voltage regulator 1980 to lower the magnitude of the voltage $V_{P1}$ based on a negative ramp-to-drive profile. In some implementations, as the magnitude of the voltage $V_{P1}$ reaches a threshold value close to zero (for example, 10 millivolts (mV)), the processing unit 1904 changes the polarity switching signal $V_{Polar}$ from a first value to a second value to cause the polarity switch 1984 to switch from a positive conducting mode (the first configuration described above) to a high impedance mode.

While in the high impedance mode the polarity switch 1984 does not pass $V_{P1}$. Instead, the polarity switch 1984 can output values of $V_{App1}$ (or $V_{App2}$) based on predefined calculations or estimations. Meanwhile, the voltage regulator 1980 continues to decrease the magnitude of $V_{P1}$ to zero. When the magnitude of $V_{P1}$ reaches zero, the voltage regulator 1980 begins increasing the magnitude of $V_{P1}$ up to the magnitude of the negative drive value. When the magnitude of $V_{P1}$ reaches a threshold value (for example, 10 mV), the processing unit 1904 then changes the polarity switching signal $V_{Polar}$ from the second value to a third value to cause the polarity switch 1984 to switch from the high impedance mode to a negative conducting mode (the second configuration described above). As described above, in some such implementations, the polarity switch 1984 passes $V_{P1}$ as the second applied voltage $V_{App2}$, while the first applied voltage $V_{App1}$ is a signal ground. To summarize, while the magnitude of $V_{P1}$ is greater than or equal to a threshold voltage (for example, 10 mV) the polarity switch 1984 passes the regulated voltage $V_{P1}$ as either the first applied voltage $V_{App1}$ or the second applied voltage $V_{App2}$, depending on whether the polarity switch 1984 is in the positive conducting mode (first configuration) or the negative conducting mode (second configuration), respectively. As such, the effective applied voltage $V_{Eff}$ is dictated by the magnitude of $V_{P1}$ and the polarity configuration of the polarity switch 1984 while the value of $V_{Eff}$ is less than or equal to $-10$ mV or greater than or equal to $+10$ mV. But while the polarity switch 1984 is in the high impedance mode, in the range when $-10$ mV$<V_{Eff}<10$ mV, the value of $V_{Eff}$, and more generally the values of $V_{App1}$ and $V_{App2}$, are determined based on predefined calculations or estimations.

Feedback Circuit

As described above, in some implementations the processing unit 1904 can modify the command signal $V_{DCmnd}$ during operation (for example, during a tinting transition or during times between tinting transitions) based on one or more feedback signals $V_{Feed}$. In some implementations, a feedback signal $V_{Feed}$ is based on one or more voltage feedback signals $V_{OC}$, which are in turn based on actual voltage levels detected across the ECDs of the connected IGUs. Such voltage feedback signals $V_{OC}$ can be measured during periodic open circuit conditions (during or in between transitions) while the applied voltages $V_{App1}$ and $V_{App2}$ are turned off for brief durations of time. For example, an open-circuit voltage feedback signal $V_{OC}$ can be measured using a differential amplifier 1988 having a first input connected with power line 1934, a second input connected with power line 1936, and an output connected with an analog-to-digital converter (ADC) 1992. One example of a differential amplifier suitable for use in some implementations is the low power, adjustable gain, precision LT1991 provided by Linear Technology Corp. of Milpitas, Calif.

Additionally or alternatively, a second feedback signal $V_{Feed}$ can be based on one or more current feedback signals $V_{Cur}$, which are in turn based on actual current levels detected through the ECDs. Such current feedback signals $V_{Cur}$ can be measured using an operational amplifier 1990 having a first input connected with a first input terminal of a resistor 691, which is also connected to an output of the polarity switch 1984. A second input of the operational amplifier 1990 can be connected with a second terminal of the resistor 691, which is also connected to a node at the second supply voltage $V_{Sup2}$. The output of the operational amplifier 1990 can be connected with the ADC 1992. One example of an operational amplifier suitable for use in some implementations is the low noise, CMOS, precision AD8605 provided by Analog Devices Inc. of Norwood, Mass. Because the resistance $R_F$ of the resistor 691 is known, the actual current flowing out of the polarity switch 1984 can be determined by processing unit 1904 based on the voltage difference signal $V_{Cur}$.

In some implementations, the processing unit 1904 also is configured to compensate for transmission losses resulting from the passage of the voltage signals $V_{App1}$ and $V_{App2}$ through the conducting power distribution lines 1933 and 1935. More specifically, the actual voltages provided to the busbars of a given IGU 1902 can be less than the voltages $V_{App1}$ and $V_{App2}$ at the output of the WC 1900. As such, the actual voltage $V_{Act}$ applied across the ECD within the IGU 402 can be less than the difference between the voltages $V_{App1}$ and $V_{App2}$ at the output of the WC 1900. For example, the resistances of the power distribution lines 1934 and 1936—diagrammatically represented as resistors each having resistance $R_T$—can result in significant voltage drops along the power distribution lines 1934 and 1936. The resistance of each power distribution line is, of course, directly proportional to the length of the power distribution line and inversely proportional to the cross-sectional area of the power distribution line. An expected voltage drop can thus be calculated based on knowledge of the length of the power distribution lines. However, this length information is not necessarily available. For example, installers may not record such length information during installation of the IGUs or may not record such information accurately, precisely or correctly. Additionally, in some legacy installations where existing wires are utilized, such length information may not be available.

Additionally or alternatively, a third feedback signal $V_{Feed}$ can be based on one or more voltage compensation feedback signals $V_{Comp}$, which are in turn based on an actual voltage drop detected along at least one of the power distribution lines. For example, such feedback signals $V_{Comp}$ can be measured using a differential amplifier 1994 having a first input connected with a one of the power distribution lines 1934 or 1934 in the WC 1900, a second input connected with the fifth line 1942 in the WC 1900, and an output connected with the ADC 1992.

Each of the open-circuit voltage feedback signal $V_{OC}$, the current feedback signal $V_{Cur}$ and the voltage compensation feedback signal $V_{Comp}$ can be digitized by the ADC 1992 and provided to the processing unit 1904 as a feedback signal $V_{Feed}$. One example of an ADC suitable for use in some implementations is the low power AD7902 by Analog Devices Inc. of Norwood, Mass. In some instances above, while the feedback signal $V_{Feed}$ is referenced in the singular form, the feedback signal $V_{Feed}$ can collectively refer to three (or more or less) individual feedback signals: a first one for the digitized open-circuit voltage signal $V_{OC}$, a second one for the digitized current signal $V_{Cur}$ and a third one for the digitized voltage compensation signal $V_{Comp}$. The feedback signal $V_{Feed}$ can be provided to the processing unit 1904 via the SPI bus 1986. The processing unit 1904 can then use the feedback signal $V_{Feed}$ to dynamically modify the command signal $V_{DCmnd}$ such that the actual value $V_{Act}$ of the voltage applied across the ECD stack of the IGU 1902 is approximately equal to the desired effective voltage $V_{Eff}$, and thus, such that the target tint state is reached.

For example, as the outside environment becomes brighter, the WC 1900 can receive a tint command from the NC 1800 to darken an IGU 1902. However, in some implementations or instances, as the respective ECD becomes increasingly more tinted, the temperature of the ECD can rise significantly as a result of the increased photon absorption. Because the tinting of the ECD can be dependent on the temperature of the ECD, the tint state can change if the command signal $V_{DCmnd}$ is not adjusted to compensate for the temperature change. In some implementations, rather than detecting the temperature fluctuation directly, the processing unit 1904 can adjust the command signal $V_{DCmnd}$ based on the actual voltage detected across the ECD or the actual current detected through the ECD, as determined via the feedback signals $V_{OC}$ and $V_{Cur}$.

Communications Circuit

The communications circuit 1912 is generally configured to enable communication between the processing unit 1904 and various other components within or outside of the WC 1900. For example, the communications circuit 1912 can include a bridge device 1996. In some implementations, the bridge device 1996 enables the processing unit 1996 to communicate and receive data signals $Data_3$ and $Data_4$ over communication lines 1938 and 1940 (collectively referred to as data bus 1944), and corresponding communication lines 637 and 639. In some implementations, the bridge device 1996 can be a 1-Wire bridge device configured to communicate according to the 1-Wire communications protocol. In some such implementations, the communication lines 639 and 1940 can be signal grounds, while the communication lines 637 and 639, which carry the data signal $Data_3$, can provide both data and power to the chip 756 as well as to any number of 1-Wire-compatible sensors within the IGU 1902. In some implementations, the chip 756 within the IGU 1902 can be an intermediary for communications of data between the processing unit 1904 and the sensors within the IGU 1902. For example, the sensors can be connected to communication lines 739 and 741, which connect to the chip 756. In some other implementations, the sensors can be directly coupled with the communication lines 637 and 639 via the interface 754 and the communication lines 738 and 740. At other times, the data signal $Data_3$ can communicate sensor data back to the processing unit 1904.

The bridge device 1996 is configured to manage the communications to, from and among the 1-Wire devices. The processing unit 1904 can communicate instructions to the bridge device 1996, or receive data from the bridge device, via an I²C bus 1997. Although the I²C bus 1997 may be described herein in the singular form, the I²C bus 1997 may collectively refer to two or more I²C buses, each of which can be used to communicate with a respective component of the WC 1900. Thus, in some implementations, the bridge device 1996 functions as an I²C to 1-Wire bridge that interfaces directly to an I²C host port of the I²C master (the processing unit 1904) to perform bidirectional protocol conversion between the processing unit 1904 and the downstream 1-Wire slave devices including the chip 756 and any sensors on or within the IGU 1902. One such bridge device suitable for use in some implementations is the DS2482 1-Wire Master device provided by Maxim Integrated Products, Inc. of San Jose, Calif. In some other implementations, the functions of the bridge device 1996 can be integrated into the processing unit 1904.

In some implementations, the communications circuit 1912 also includes a radio transceiver 1998. For example, the radio transceiver 1998 can communicate with the processing unit 1904 via the I²C bus 1997. The radio transceiver 1998 can enable wireless communication between the processing unit 1904 and other devices having such radio transceivers including, for example, other WCs 1900, the NC 1800, the IGUs 1902 as well as mobile devices or other computing devices. While referred to herein in the singular form, the radio transceiver 1998 can collectively refer to one or more radio transceivers each configured for wireless communication according to a different respective protocol. For example, some wireless network protocols suitable for use in some implementations can be based on the IEEE 802.11 standard, such as Wi-Fi (or "WiFi"). Additionally or alternatively, the radio transceiver 1998 can be configured to communicate based on the IEEE 802.15.4 standard, which defines the physical layer and media access control for low-rate wireless personal area networks (LR-WPANs). For example, higher level protocols compatible with the IEEE 802.15.4 standard can be based on the ZigBee, 6LoWPAN, ISA100.11a, WirelessHART or MiWi specifications and standards. Additionally or alternatively, the radio transceiver 1998 can be configured to communicate based on the Bluetooth standard (including the Classic Bluetooth, Bluetooth high speed and Bluetooth low energy protocols and including the Bluetooth v4.0, v4.1 and v4.2 versions). Additionally or alternatively, the radio transceiver 1998 can be configured to communicate based on the EnOcean standard (ISO/IEC 14543-3-10).

As described above, wireless communication can take the place of communication over physical cables between the WC 1900 and the NC 1800. Furthermore, in some implementations, the distributed WCs 1900 can form a mesh network for communicating various information to one another or to the MC 1700, the NC 1800 or to other devices, rendering physical communication lines between the various controllers of a network system such as network system 1600 unnecessary. As also noted above, the WC 1900 can communicate wirelessly with the IGUs 1902 it controls. For example, the communication module 756 within each IGU 1902 also can include a radio transceiver for communicating with the radio transceiver 1998 and the processing unit 1904 of the WC 1900. In some implementations, wireless communication can take the place of communication over physical cables between the WC 1900 and the IGU 1902. For example, wireless communication can take the place of the 1-Wire communication bus 1944, the communication lines 637 and 639, and the communication lines 738 and 740. Such wireless implementations can facilitate the manufacture and installation of self-contained IGUs, for example, IGUs that don't require the attachment of physical cables. In some such self-contained implementations, each IGU can include an energy storage device and an integrated photovoltaic cell for charging the energy storage device. The energy storage device, in turn, can power the tint states and tint state transitions of the ECD within the IGU.

In some implementations, the communications circuit 1912 can additionally or alternatively include a power line communications module 1999. The power line communications module 1999 can be used in implementations or instances in which data is communicated via the power supply voltage signal $V_{Sup1}$ (and in some cases, also $V_{Sup2}$) rather than, or in addition to, over communications lines 1922 and 1924 or wirelessly. As shown, the power line communications module 1999 also can communicate with the processing unit 1904 via the I²C bus 1997.

Smart Network Controller

In some implementations, the NC 1800 described with reference to FIG. 18 can take over some of the functions, processes or operations that are described above as being responsibilities of the MC 1700 of FIG. 17. Additionally or alternatively, the NC 1800 can include additional functionalities or capabilities not described with reference to the MC 1700.

In some implementations, the NC 1800 periodically requests status information from the WCs 1900 it controls. For example, the NC 1800 can communicate a status request to each of the WCs 1900 it controls every few seconds, every few tens of seconds, every minute, every few minutes or after any desirable period of time. In some implementations, each status request is directed to a respective one of the WCs 1900 using the CAN ID or other identifier of the respective WC 1900. In some implementations, the NC 1800 proceeds sequentially through all of the WCs 1900 it controls during each round of status acquisition. In other words, the NC 1800 loops through all of the WCs 1900 it controls such that a status request is sent to each of the WCs 1900 sequentially in each round of status acquisition. After a status request has been sent to a given WC 1900, the NC 1800 then waits to receive the status information from the respective WC 1900 before sending a status request to the next one of the WCs in the round of status acquisition.

In some implementations, after status information has been received from all of the WCs 1900 that the NC 1800 controls, the NC 1800 then performs a round of tint command distribution. For example, in some implementations, each round of status acquisition is followed by a round of tint command distribution, which is then followed by a next round of status acquisition and a next round of tint command distribution, and so on. In some implementations, during each round of tint command distribution, the NC 1800 proceeds to send a tint command to each of the WCs 1900 that the NC 1800 controls. In some such implementations, the NC 1800 also proceeds sequentially through all of the WCs 1900 it controls during the round of tint command distribution. In other words, the NC 1800 loops through all of the WCs 1900 it controls such that a tint command is sent to each of the WCs 1900 sequentially in each round of tint command distribution.

In some implementations, each status request includes instructions indicating what status information is being requested from the respective WC 1900. In some implementations, responsive to the receipt of such a request, the respective WC 1900 responds by transmitting the requested status information to the NC 1800 (for example, via the communication lines in the upstream set of cables 1916). In some other implementations, each status request by default causes the WC 1900 to transmit a predefined set of information for the set of IGUs 1902 it controls. Either way, the status information that the WC 1900 communicates to the NC 1800 responsive to each status request can include a tint status value (S) for the IGUs 1902, for example, indicating whether the IGUs 1902 is undergoing a tinting transition or has finished a tinting transition. Additionally or alternatively, the tint status value S or another value can indicate a particular stage in a tinting transition (for example, a particular stage of a voltage control profile). In some implementations, the status value S or another value also can indicate whether the WC 1900 is in a sleep mode. The status information communicated in response to the status request also can include the tint value (C) for the IGUs 1902, for example, as set by the MC 1700 or the NC 1800. The response also can include a set point voltage set by the WC 1900 based on the tint value (for example, the value of the effective applied $V_{Eff}$). In some implementations, the response also can include a near real-time actual voltage level $V_{Act}$ measured, detected or otherwise determined across the ECDs within the IGUs 1902 (for example, via the amplifier 1988 and the feedback circuit 1910). In some implementations, the response also can include a near real-time actual current level $I_{Act}$ measured, detected or otherwise determined through the ECDs within the IGUs 1902 (for example, via the amplifier 1990 and the feedback circuit 1910). The response also can include various near real-time sensor data, for example, collected from photosensors or temperature sensors integrated on or within the IGUs 1902.

Some protocols such as CANOpen limit the size of each frame of data sent from the WC 1900 to the NC 1800 and vice versa. In some instances, the sending of each status request and the receiving of status information responsive to such a request actually includes multiple two-way communications, and thus, multiple frames. For example, each status request described above can include a separate sub-request for each of the status values described above. As a more specific example, each status request from the NC 1800 to a particular WC 1900 can include a first sub-request requesting the status value S. In response to the first sub-request, the WC 1900 can transmit to the NC 1800 an acknowledgement and a frame including the status value S. The NC 1800 can then transmit a second sub-request to the WC 1900 requesting the tint value C. In response to the second sub-request, the WC 1900 can transmit to the NC 1800 an acknowledgement and a frame including the tint value C. The values of $V_{Eff}$, $V_{Act}$ and $I_{Act}$ as well as sensor data can similarly be obtained with separate respective sub-requests and responses.

In some other implementations, rather than polling or sending a status request to each of the WCs 1900 on a sequential basis, the NC 1800 can asynchronously send status requests to particular WCs 1900. For example, it may not be useful to receive status information (including C, S, $V_{Eff}$, $V_{Act}$ and $I_{Act}$) from all of the WCs 1900 periodically. For example, it may be desirable to asynchronously request such information from only particular ones of the WCs 1900 that have recently received or implemented a tint command, that are currently undergoing a tinting transition, that have recently finished a tinting transition, or from which status information has not been collected for a relatively long duration of time.

In some other implementations, rather than polling or sending status requests to each of the WCs 1900 individually, whether on a sequential basis or asynchronously, each of the WCs 1900 can periodically broadcast its status information (including C, S, $V_{Eff}$, $V_{Act}$ and $I_{Act}$). In some such implementations, each of the WCs 1900 can broadcast the status information wirelessly. For example, each WC 1900 can broadcast the status information every few seconds, tens of seconds, minutes or tens of minutes. In some implementations, the WCs 1900 can be synchronized to broadcast their respective status information at certain times to avoid occupying a large amount of collective bandwidth. Additionally, the broadcast period can be different for different sets (such as the zones described above) of WCs 1900 and at different times, for example, based on the positions of the respective IGUs in the building and relative to the sun, or based on whether the rooms adjoining the IGUs are occupied.

In some other implementations, each of the WCs 1900 can broadcast its status information in response to certain conditions, for example, when starting a tinting transition, when finishing a tinting transition, when $V_{Act}$ changes by a threshold, when $I_{Act}$ changes by a threshold, when sensor data (for example, light intensity or temperature) changes by a threshold, when an occupancy sensor indicates the adjoining room is occupied, or when entering or exiting a sleep mode. The NC 1800 can listen for such broadcasted status information, and when it hears it, record the status information. Advantageously, in broadcasting implementations, the time required to receive status information from a set of WCs 1900 is approximately cut in half because there is no need to request the status information from the WCs 1900, and thus, no roundtrip delay associated with each WC 1900. Instead, there is only a one-way latency associated with the time required to transmit the status information from each WC 1900 to the NC 1800.

In some such implementations, rather than sending a tint command to each of the WCs 1900 on a sequential basis, the NC 1800 can asynchronously send a tint command to a particular WC 1900 whether through a wired or wireless connection. For example, it may not be useful to send tint commands to all of the WCs 1900 periodically. For example, it may be desirable to asynchronously sent tint commands to only particular ones of the WCs 1900 that are to be transitioned to a different tint state, for which status information has just been (or has recently been) received, or to which a tint command has not been sent for a relatively long duration of time.

Data Logger

In some implementations, the NC 1800 also includes a data logging module (or "data logger") for recording data associated with the IGUs controlled by the NC 1800. In some implementations, the data logger records the status information included in each of some or all of the responses to the status requests. As described above, the status information that the WC 1900 communicates to the NC 1800 responsive to each status request can include a tint status value (S) for the IGUs 1902, a value indicating a particular stage in a tinting transition (for example, a particular stage of a voltage control profile), a value indicating whether the WC 1900 is in a sleep mode, a tint value (C), a set point voltage set by the WC 1900 based on the tint value (for example, the value of the effective applied $V_{Eff}$), an actual voltage level $V_{Act}$ measured, detected or otherwise determined across the ECDs within the IGUs 1902, an actual current level $I_{Act}$ measured, detected or otherwise determined through the ECDs within the IGUs 1902, and various sensor data, for example, collected from photosensors or temperature sensors integrated on or within the IGUs 1902.

In some implementations, the data logger within the NC 1800 collects and stores the various information received from the WCs 1900 in the form of a comma-separated values (CSV) file or via another table-structured file format. For example, each row of the CSV file can be associated with a respective status request, and can include the values of C, S, $V_{Eff}$, $V_{Act}$ and $I_{Act}$ as well as sensor data (or other data) received in response to the status request. In some implementations, each row is identified by a timestamp corresponding to the respective status request (for example, when the status request was sent by the NC 1800, when the data was collected by the WC 1900, when the response including the data was transmitted by the WC 1900, or when the response was received by the NC 1800). In some implementations, each row also includes the CAN ID or other ID associated with the respective WC 1900.

In some other implementations, each row of the CSV file can include the requested data for all of the WCs 1900 controlled by the NC 1800. As described above, the NC 1800 can sequentially loop through all of the WCs 1900 it controls during each round of status requests. In some such implementations, each row of the CSV file is still identified by a timestamp (for example, in a first column), but the timestamp can be associated with a start of each round of status requests, rather than each individual request. In one specific example, columns 2-6 can respectively include the values C, S, $V_{Eff}$, $V_{Act}$ and $I_{Act}$ for a first one of the WCs 1900 controlled by the NC 1800, columns 7-11 can respectively include the values C, S, $V_{Eff}$, $V_{Act}$ and $I_{Act}$ for a second one of the WCs 1900, columns 12-16 can respectively include the values C, S, $V_{Eff}$, $V_{Act}$ and $I_{Act}$ for a third one of the WCs 1900, and so on and so forth through all of the WCs 1900 controlled by the NC 1800. The subsequent row in the CSV file can include the respective values for the next round of status requests. In some implementations, each row also can include sensor data obtained from photosensors, temperature sensors or other sensors integrated with the respective IGUs controlled by each WC 1900. For example, such sensor data values can be entered into respective columns between the values of C, S, $V_{Eff}$, $V_{Act}$ and $I_{Act}$ for a first one of the WCs 1900 but before the values of C, S, $V_{Eff}$, $V_{Act}$ and $I_{Act}$ for the next one of the WCs 1900 in the row. Additionally or alternatively, each row can include sensor data values from one or more external sensors, for example, the multi-sensor device 100 described above with respect to FIGS. 1-13. In some such implementations, the NC 1800 can send a status request to the external sensors at the end of each round of status requests.

Protocol Conversion Module

As described above, one function of the NC 1800 can be in translating between various upstream and downstream protocols, for example, to enable the distribution of information between WCs 1900 and the MC 1700 or between the WCs and the outward-facing network 1610. In some implementations, a protocol conversion module is responsible for such translation or conversion services. In various implementations, the protocol conversion module can be programmed to perform translation between any of a number of upstream protocols and any of a number of downstream protocols. As described above, such upstream protocols can include UDP protocols such as BACnet, TCP protocols such as oBix, other protocols built over these protocols as well as various wireless protocols. Downstream protocols can include, for example, CANopen, other CAN-compatible protocol, and various wireless protocols including, for example, protocols based on the IEEE 802.11 standard (for example, WiFi), protocols based on the IEEE 802.15.4 standard (for example, ZigBee, 6LoWPAN, ISA100.11a, WirelessHART or MiWi), protocols based on the Bluetooth standard (including the Classic Bluetooth, Bluetooth high speed and Bluetooth low energy protocols and including the Bluetooth v4.0, v4.1 and v4.2 versions), or protocols based on the EnOcean standard (ISO/IEC 14543-3-10).

Integrated Analytics

In some implementations, the NC 1800 uploads the information logged by the data logger (for example, as a CSV file) to the MC 1700 on a periodic basis, for example, every 24 hours. For example, the NC 1800 can transmit a CSV file to the MC 1700 via the File Transfer Protocol (FTP) or another suitable protocol over an Ethernet data link 1616. In some such implementations, the status information can then be stored in the database 1620 or made accessible to applications over the outward-facing network 1610.

In some implementations, the NC 1800 also can include functionality to analyze the information logged by the data logger. For example, an analytics module can receive and analyze the raw information logged by the data logger in real time. In various implementations, the analytics module can be programmed to make decisions based on the raw information from the data logger. In some other implementations, the analytics module can communicate with the database 1620 to analyze the status information logged by the data logger after it is stored in the database 1620. For example, the analytics module can compare raw values of $V_{Eff}$, $V_{Act}$ and $I_{Act}$ with expected values or expected ranges of values and flag special conditions based on the comparison. For example, such flagged conditions can include power spikes indicating a short, an error, or damage to an ECD. In some implementations, the analytics module communicates such data to the tint determination module or to the power management module.

In some implementations, the analytics module also can filter the raw data received from the data logger to more intelligently or efficiently store information in the database 1620. For example, the analytics module can be programmed to pass only "interesting" information to a database manager for storage in the database 1620. For example, interesting information can include anomalous values, or values that otherwise deviate from expected values (such as based on empirical or historical values). More detailed examples of how raw data can be filtered, parsed, temporarily stored, and efficiently stored long term in a database are described in PCT Patent Application No. PCT/2015/029675, filed on May 7, 2015 and titled "CONTROL METHOD FOR TINTABLE WINDOWS," which is hereby incorporated by reference herein in its entirety.

Database Manager

In some implementations, the NC 1800 includes a database manager module (or "database manager") configured to store information logged by the data logger to a database on a periodic basis, for example, every hour, every few hours or every 24 hours. In some implementations, the database can be an external database such as the database 1620 described above. In some other implementations, the database can be internal to the NC 1800. For example, the database can be implemented as a time-series database such as a Graphite database within the secondary memory 1806 of the NC 1800 or within another long term memory within the NC 1800. In some example implementations, the database manager can be implemented as a Graphite Daemon executing as a background process, task, sub-task or application within a multi-tasking operating system of the NC 1800.

In some implementations, the database 1620 can collectively refer to two or more databases, each of which can store some or all of the information obtained by some or all of the NCs 1800 in the network system 1600. For example, it can be desirable to store copies of the information in multiple databases for redundancy purposes. In some implementations, the database 1620 can collectively refer to a multitude of databases, each of which is internal to a respective NC 1800 (such as a Graphite or other times-series database). It also can be desirable to store copies of the information in multiple databases such that requests for information from applications including third party applications can be distributed among the databases and handled more efficiently. In some such implementations, the databases can be periodically or otherwise synchronized to maintain consistency.

In some implementations, the database manager also can filter data received from the analytics module to more intelligently or efficiently store information in an internal or external database. For example, the database manager can additionally or alternatively be programmed to store only "interesting" information to a database. Again, interesting information can include anomalous values, or values that otherwise deviate from expected values (such as based on empirical or historical values). More detailed examples of how raw data can be filtered, parsed, temporarily stored, and efficiently stored long term in a database are described PCT Patent Application No. PCT/2015/029675, filed on May 7, 2015 and titled "CONTROL METHOD FOR TINTABLE WINDOWS," which is hereby incorporated by reference herein in its entirety.

Tint Determination

In some implementations, the NC 1800 includes intelligence for calculating, determining, selecting or otherwise generating tint values for the IGUs 1902. For example, as similarly described above with reference to the MC 1700 of FIG. 17, a tint determination module can execute various algorithms, tasks or subtasks to generate tint values based on a combination of parameters. The combination of parameters can include, for example, the status information collected and stored by the data logger. The combination of parameters also can include time or calendar information such as the time of day, day of year or time of season. Additionally or alternatively, the combination of parameters can include solar calendar information such as, for example, the direction of the sun relative to the IGUs 1902. The combination of parameters also can include the outside temperature (external to the building), the inside temperature (within a room adjoining the target IGUs 1902), or the temperature within the interior volume of the IGUs 1902. The combination of parameters also can include information about the weather (for example, whether it is clear, sunny, overcast, cloudy, raining or snowing). Parameters such as the time of day, day of year, or direction of the sun can be programmed into and tracked by the NC 1800. Parameters such as the outside temperature, inside temperature or IGU temperature can be obtained from sensors in, on or around the building or sensors integrated on or within the IGUs 1902. In some implementations, various parameters can be provided by, or determined based on information provided by, various applications including third party applications that can communicate with the NC 1800 via an API. For example, the network controller application, or the operating system in which it runs, can be programmed to provide the API.

In some implementations, the tint determination module also can determine tint values based on user overrides received via various mobile device applications, wall devices or other devices. In some implementations, the tint determination module also can determine tint values based on commands or instructions received various applications, including third party applications and cloud-based applications. For example, such third party applications can include various monitoring services including thermostat services, alert services (for example, fire detection), security services or other appliance automation services. Additional examples of monitoring services and systems can be found in PCT/US2015/019031 filed on Mar. 5, 2015 and titled MONITORING SITES CONTAINING SWITCHABLE OPTICAL DEVICES AND CONTROLLERS. Such applications can communicate with the tint determination module and other modules within the NC 1800 via one or more APIs. Some examples of APIs that the NC 1800 can enable are described in U.S. Provisional Patent Application Ser. No. 62/088,943 filed 8 Dec. 2014 and titled "MULTIPLE INTERFACING SYSTEMS AT A SITE."

Periphery Light Sensors in Mounting Form or Structure Attached to Circuit Board

Figure 20:
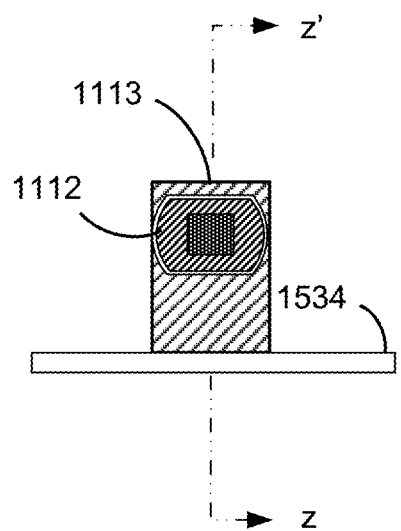
FIG. 20 shows a drawing of a light sensor in a mounting structure attached to a flat circuit board, according to an embodiment.
Figure 20:
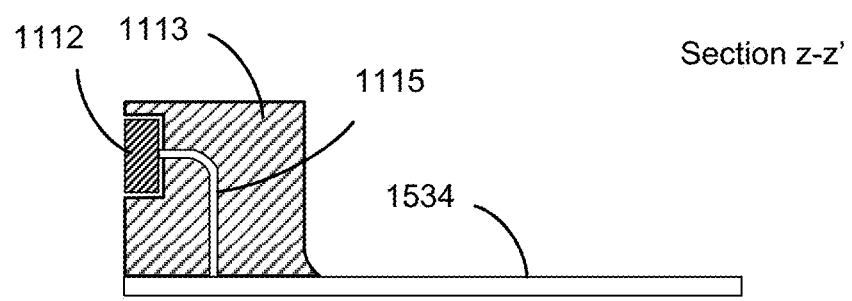

In certain implementations, each light sensor at the periphery of a multi-sensor device 100 (or 1000) is attached to or enclosed in a form or mounting structure and electrical leads from the light sensor are bent around to connect with appropriate contacts on the circuit board face. FIG. 20 shows a front view (top) and sectional view z-z' (bottom) of a drawing of a light sensor 1112 that is enclosed in a mounting structure 1113 attached to a flat circuit board 1534, according to an embodiment. The mounting structure 1113 may be a block of material or material shape formed, for example, of plastic or thermoplastic such as nylon or polyamide, among other suitable materials. In other examples, the mounting structure 1113 may be formed of metallic material such as aluminum, cobalt or titanium, or a semi-metallic material such as alumide. Depending on the material, the mounting structure 1113 can be 3D-printed, injection molded or formed via other suitable processes. The mounting structure 1113 includes an aperture shaped to receive the light sensor 1112 and maintain the light sensor 1112 in a direction parallel to the flat circuit board 1534. The light sensor 1112 may also be adhered or otherwise connected to the inside of the aperture. The leads 1115 from the back of the light sensor 1112 are bent at about 90 degrees to come down to connect with contact on the face of the circuit board 1534. The leads 1115 may go through a conduit or other opening through the mounting structure to connect to the circuit board 1534. A single light sensor 1112 is shown for illustration purposes. It would be understood that multiple light sensors are included in the multiple-sensor device.

In one or more aspects, one or more of the functions described may be implemented in hardware, digital electronic circuitry, analog electronic circuitry, computer software, firmware, including the structures disclosed in this specification and their structural equivalents thereof, or in any combination thereof. Certain implementations of the subject matter described in this document also can be implemented as one or more controllers, computer programs, or physical structures, for example, one or more modules of computer program instructions, encoded on a computer storage media for execution by, or to control the operation of window controllers, network controllers, and/or antenna controllers. Any disclosed implementations presented as or for electrochromic windows can be more generally implemented as or for switchable optical devices (including windows, mirrors, etc.).

Various modifications to the embodiments described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the devices as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this does not necessarily mean that the operations are required to be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A device comprising:
   a ring of first photosensors having a central axis, wherein each of the first photosensors has an angle of view oriented radially outward from the ring;
   a housing having at least one light-diffusing element around at least a periphery of the ring of first photosensors to diffuse light incident on the device prior to the light being sensed by the first photosensors during operation;
   at least one second photosensor oriented in a direction parallel or substantially parallel with the central axis of the ring of first photosensors;
   an infrared sensor configured to measure sky temperature during operation;
   a temperature sensor configured to measure ambient temperature during operation; and
   a circuit board disposed within the housing,
   wherein the device is configured to attach or mount to a building, and wherein a plane with the at least one second photosensor is located further away from the building than the ring of first photosensors.

2. The device of claim 1, wherein the combination of the angles of view of all of the first photosensors provide an aggregate angle of view of about 360 degrees.

3. The device of claim 1, wherein the first photosensors are positioned equidistantly along a circumference of the ring of first photosensors.

4. The device of claim 1, wherein the angle of view of each of the first photosensors overlaps the angle of view of two respective immediately adjacent first photosensors in the ring.

5. The device of claim 1, wherein the at least one light-diffusing element is a ring-shaped diffuser, the ring-shaped diffuser being concentric with the ring of first photosensors.

6. The device of claim 5, wherein the ring-shaped diffuser is an integral portion of the housing.

7. The device of claim 1, wherein the at least one light-diffusing element is formed of a plastic material.

8. The device of claim 1, further comprising another temperature sensor configured to measure an internal temperature within the housing.

9. The device of claim 1, wherein the circuit board includes or is coupled to at least one communication interface.

10. The device of claim 9, wherein the at least one communication interface includes a wireless communication interface.

11. The device of claim 9, wherein the circuit board includes or is coupled to a power interface for receiving power from at least one power supply during operation.

12. The device of claim 11, wherein the communication interface is a power-over-ethernet (PoE) enabled device configured to allow data and power transmission with a single cable.

13. The device of claim 11, further comprising a battery within or coupled with the housing, the at least one power supply including the battery.

14. The device of claim 11, wherein the at least one power supply includes at least one photovoltaic cell.

15. The device of claim 1, further comprising a mast structure coupled to the housing, the mast structure configured to mount the device to the building.

16. The device of claim 1, further comprising a cellular communication circuit.

17. The device of claim 1, further comprising a GPS module.

18. The device of claim 1,
   wherein the housing includes a mounting structure for each of the first photosensors, wherein the mounting structure has an enclosure for receiving a respective first photosensor, and
   wherein when the respective first photosensor is located within the enclosure, the respective first photosensor is maintained in a direction substantially parallel to the circuit board.

19. The device of claim 18, wherein the circuit board is parallel to a bottom surface of the housing of the device.

20. The device of claim 18, wherein the plane with the at least one second photosensor is coincident with the circuit board.

21. The device of claim 1, wherein the circuit board includes one or more processors.

22. The device of claim 21, wherein the one or more processors are configured to execute instructions for determining a weather condition based on readings taken by the infrared sensor.

23. The device of claim 22, wherein the weather condition is a cloud condition.

24. The device of claim 1, further comprising an additional infrared sensor.

25. The device of claim 23, wherein the cloud condition is one of a clear sky condition, an intermittent clouds condition, and an overcast condition.

26. The device of claim 24, wherein the infrared sensors are located in the plane with the at least one second photosensor.

27. The device of claim 1,
wherein the at least one second photosensor and the infrared sensors are directed to a region of sky proximal the building.

28. The device of claim 1, wherein the device is configured to detect a cloud based at least in part on a measurement of sky temperature from the infrared sensor.

\* \* \* \* \*